United States Patent
Wheeler et al.

(10) Patent No.: US 12,477,332 B2
(45) Date of Patent: *Nov. 18, 2025

(54) SYSTEMS AND METHODS FOR VERIFYING CANDIDATE COMMUNICATIONS

(71) Applicant: Wells Fargo Bank, N.A., San Francisco, CA (US)

(72) Inventors: Matthew N. Wheeler, Charlotte, NC (US); John Andrew Chuprevich, Davidson, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 18/595,012

(22) Filed: Mar. 4, 2024

(65) Prior Publication Data
US 2025/0280018 A1    Sep. 4, 2025

Related U.S. Application Data

(63) Continuation of application No. 18/594,610, filed on Mar. 4, 2024.

(51) Int. Cl.
*H04L 9/40*    (2022.01)
(52) U.S. Cl.
CPC ...... *H04L 63/1425* (2013.01); *H04L 63/1416* (2013.01); *H04L 63/20* (2013.01)

(58) Field of Classification Search
CPC .. H04L 63/1425; H04L 63/1416; H04L 63/20
See application file for complete search history.

(56) References Cited

U.S. PATENT DOCUMENTS

| | | | |
|---|---|---|---|
| 10,803,160 B2 | 10/2020 | Tussy | |
| 11,089,478 B2 | 8/2021 | Moshir | |
| 2022/0030006 A1* | 1/2022 | Mciver | H04L 9/0861 |
| 2022/0141263 A1* | 5/2022 | Mauer | G06N 3/045 |
| | | | 709/206 |

* cited by examiner

*Primary Examiner* — Huan V Doan
(74) *Attorney, Agent, or Firm* — K&L Gates LLP

(57) ABSTRACT

Systems, apparatuses, methods, and computer program products are disclosed for verifying candidate communications. An example method includes receiving a communication verification request comprising a candidate communication from a third-party device and determining one or more candidate communication feature values for one or more communication feature types. The example method further includes querying an authentic communication storage repository for an authentic communication record that comprises one or more authentic communication feature values that correspond to the one or more candidate communication features, wherein the authentic communication storage repository comprises a plurality of authentic communication records. The example method further includes determining a communication classification for the candidate communication based on a query result and providing a communication verification response comprising the communication classification to the third-party device.

20 Claims, 30 Drawing Sheets

SYSTEMS AND METHODS FOR VERIFYING CANDIDATE COMMUNICATIONS

CROSS REFERENCE TO RELATED APPLICATIONS

The present application is a continuation application of U.S. patent application Ser. No. 18/594,610, filed Mar. 4, 2024, which is hereby incorporated by reference in its entirety.

BACKGROUND

Customers of an institution may receive numerous communications from the institution. However, customers may also receive communications from fraudsters impersonating the institution. Currently, customers lack the ability to determine whether these communications are fraudulent and instead, are forced to rely on context clues within the communication that commonly associated with fraud.

BRIEF SUMMARY

Institutions may provide their customers with numerous communications over a variety of communication channels. For example, an institution may communicate with a customer using emails, text messages, phone calls, paper mailings, etc. However, fraudsters may attempt to impersonate the institution in a communication in an attempt to scam the user. These fraudulent communications may include phishing attempts, impersonation scams, investment scams, banking scams, and/or the like. Fraudsters may rely on the engendered trust the institution has with the customer to facilitate these scams.

Conventionally, customers may be forced to rely on the context clues provided in a communication to discern whether the communication is authentic or fraudulent. For example, customers may identify typographical errors and/or grammatical errors, unsolicited requests for personal information, a sense of urgency, mismatched email addresses, suspicious links or attachments, and/or the like. In some examples, customers may be provided with a warning cautioning them to be sure the communication is authentic before responding. For example, a customer may receive a warning that he/she does not typically receive an email from an email sender and should proceed with caution. However, these conventional methods place the burden of identifying fraudulent communications on the user and do not provide a definitive answer on whether a communication is authentic or fraudulent. Furthermore, with the advent of artificial intelligence tools becoming more widely available, fraudsters may be better equipped to create more realistic fraudulent communications. Thus, it may become more difficult for a customer to discern authentic communications from fraudulent communications.

In contrast to these conventional techniques for determining fraudulent communications that place the burden on the user, example embodiments described herein allow users to provide a candidate communication that can be analyzed to determine whether a corresponding authentic communication record exists. In an instance in which a corresponding communication record exists, the candidate communication is determined to be an authentic communication. In an instance in which no corresponding communication record exists, the candidate communication is determined to be a fraudulent communication. This determination may be provided to the user such that he/she may be made aware of whether the candidate communication is authentic or fraudulent with certainty. To facilitate this determination, example systems may store and maintain authentic communication records for each authentic communication the institution provides to the user. This allows the system to provide a definitive determination of whether the communication is authentic or fraudulent.

Accordingly, the present disclosure sets forth systems, methods, and apparatuses that may verify a candidate communication for a user. As described above, authentic communication records may be stored and maintained for each authentic communication provided to the user. In some examples, once an authentic communication is provided to a user, such as by an agent device, the authentic communication is also provided to a system device that may determine one or more authentic communication feature values for the authentic communication and use these authentic communication feature values to generate an authentic communication record. In some examples, an authentic communication feature value is an authentic communication identifier, which may uniquely identify the authentic communication. The authentic communication record is then stored in an authentic communication storage repository. In some examples, the authentic communication storage repository may be a database. In other examples, the authentic communication storage repository is a blockchain that includes one or more blocks that contain authentic communication records.

Additionally, in some examples, the authentic communication may be encrypted and stored in an original authentic communication storage repository. The encrypted authentic communication may be associated with a user identifier corresponding to the user who received the authentic communication. Thus, the original authentic communication storage repository may include encrypted authentic communications for a particular user.

In the event a user wishes to verify a received candidate communication, the user may use a mobile application to login into his/her user account and provide a communication verification request that includes a candidate communication to be analyzed. The system device may determine one or more candidate communication feature values for the candidate communication and use these candidate communication feature values to query the authentic communication storage repository. In an instance the query returns a match, this may be indicative that an authentic communication record was found that corresponds to the candidate communication. As such, the candidate communication may be the authentic communication. Alternatively, in an instance the query fails to return a match, this may be indicative that no authentic communication record was found that corresponds to the candidate communication. As such, the candidate communication may not correspond to any authentic communication and may thus be fraudulent. The system device may determine a communication classification based on the query result that is indicative of whether the candidate communication is an authentic communication or a fraudulent communication. A communication verification response that includes the communication classification for the candidate communication may be provided to the mobile application. As such, the user may be provided with a definitive indication of whether the candidate communication is authentic or fraudulent without needing to manually assess the candidate communication. This may allow the user to avoid the various scams discussed above as the user may verify the source of the candidate communication prior to taking further action with the candidate communication.

Thus, implementations described herein enable improved user security by allowing the user to verify received communications in a manner that has not conventionally been available.

In some embodiments, in an instance in which the communication classification is indicative of an authentic communication, the system device may further determine a contextual reason for the candidate communication and/or authentic communication. As described above, institutions may provide various authentic communications to the user. These authentic communications may be provided for various reasons, such as in response to trigger events, such as a user request, a determination of a user eligibility notification, a time-sensitive event, etc. The system device may determine the contextual reason for the authentic communication based on the authentic communication record and may provide the contextual reason in the communication verification response. This may allow a user to review the reason they received the candidate communication. In some embodiments, the system device may receive a communication request denial from the mobile application in an instance the user denies having requested the authentic communication. For example, in an instance a fraudster requested to reset the user's password such that an authentic communication to facilitate the password reset request was provided to a user device of the user, the authentic communication will have an authentic communication record because the password reset request was provided from the institution. Thus, the communication classification for the candidate communication will indicative of an authentic communication. However, the user may interact with the communication verification request to deny the password reset request and the system device may receive a communication request denial. The system device may then update an authentic communication record to indicate the communication request denial. The system device may additionally or alternatively generate a fraudulent communication notification record indicative of the authentic communication record and the communication request denial and store the fraudulent communication notification record in the authentic communication storage repository (e.g., such as when the authentic communication storage repository is a blockchain). Thus, the authentic communication record may be associated with the communication denial request such that it may now be associated with a communication classification of a fraudulent user communication.

In some embodiments, in an instance in which the communication classification is indicative of a fraudulent communication, the system device may further determine one or more susceptible users who share at least one common user account feature as the user associated with the candidate communication. Due to the similarity with the user associated with the candidate communication, these susceptible users may be determined to also be at risk for receiving a candidate communication. Thus, a system device may provide a fraud warning to the susceptible users that proactively warns these users about the candidate communication determined to be fraudulent. The fraud warning may include one or more intermediate candidate communication feature values (e.g., non-hashed/non-tokenized candidate communication feature values) of the candidate communication such that the susceptible users may be made aware of what to look out for.

In some embodiments, in an instance in which the communication classification is indicative of a fraudulent communication, the system device may additionally or alternatively determine one or more third-party entities associated with a communication channel type of the candidate communication. These third-party entities may offer products or services associated with a communication channel type (e.g., an email service, phone line service, etc.) that allows users to send and receive communications. These third-party entities may also have an interest in proactively learning about candidate communications that are fraudulent such that they may take further action to prevent the sender from sending other users fraudulent communications. Thus, a system device may also provide a fraud warning to third-party devices associated with the third-party entities that informs the third-party entities of the fraudulent communication. The fraud warning may include one or more intermediate candidate communication feature values (e.g., non-hashed/non-tokenized candidate communication feature values) of the candidate communication such that the third-party entities may be made aware of the sender and/or other identifiable features of the candidate communication.

In some embodiments, a user may wish to view a list of the authentic correspondences he/she received. The user may use a mobile application to login into his/her user account and provide a communication history request that is indicative of a desired time range for authentic communications. The system device may identify and retrieve one or more encrypted authentic communications that are associated with a user identifier of the user and are stored in the original authentic communication storage repository. The system device may then decrypt the one or more encrypted authentic communications and generate a communication history response. The communication history response may include representations of the authentic communications provided to the user during the requested time frame. As such, the user may be provided with a definitive list of all authentic communications provided to the user during the requested time frame. This may allow the user to avoid the various scams discussed above as the user may view all provided authentic communications. This may also allow a user to confirm whether he/she is receiving all authentic communications or is missing any authentic communications. This may be particularly useful for users who have recently changed communication parameters, such as moving residences, changing phone numbers, switching email addresses, and/or the like.

In the event a third-party institution may wish to verify a candidate communication received from a user prior to providing it to a recipient user to ensure the candidate communication is authentic. A third-party device associated with a third-party institution user may provide a communication verification request that includes a candidate communication to be analyzed. The system device may determine one or more candidate communication feature values for the candidate communication and use these candidate communication feature values to query the authentic communication storage repository. In an instance the query returns a match, this may be indicative that an authentic communication record was found that corresponds to the candidate communication. As such, the candidate communication may be the authentic communication. Alternatively, in an instance the query fails to return a match, this may be indicative that no authentic communication record was found that corresponds to the candidate communication. As such, the candidate communication may not correspond to any authentic communication and may thus be fraudulent. The system device may determine a communication classification based on the query result that is indicative of whether the candidate communication is an authentic communication or a fraudulent communication. A communication verification response that includes the communication classification for the candidate communication may be provided to the third-party device. As such, the third-party device may determine whether to provide the candidate communication to the recipient user. In an instance the communication classification is indicative of an authentic communication, the third-party device may provide the candidate communication to the recipient user and may further include a verification indicia certifying that the candidate communication was analyzed and determined to be an authentic communication. In an instance the communication classification is indicative of a fraudulent communication, the third-party device may reject the candidate communication and not provide it to the recipient user. Thus, in some embodiments a candidate communication may be verified through a third-party entity in a manner that is opaque to the user. This may allow proactively prevent candidate communications determined to be fraudulent communications from reaching a user and thus, may eliminate the risk of exposing a user to scams through these communications. Thus, implementations described herein enable improved user security by proactively verify communications prior to the user receiving said communications in a manner that has not conventionally been available.

Additionally, in some embodiments, the authentic communication storage repository may be configured to store authentic communication records for a variety of third-party institutions, not only the institution that operates the system device. As such, user and/or third-party devices may provide communication verification requests that include a candidate communication associated with third-party institutions outside the institution that operates the system device and the system device may still determine a communication classification and provide the communication verification response. Additionally, in some embodiments, the authentic communication records stored in the authentic communication storage repository do not include any sensitive or personal identifiable information as this sensitive information may be hashed or otherwise protected as the authentic communication feature values of the authentic communication record. This expansive and robust authentic communication record storage allows the system device to determine a communication classification for a variety of candidate communications. Additionally, other third-party institutions that may lack the resources to implement such an infrastructure may additionally benefit by providing their authentic communications to the system device for storage in the authentic communication storage repository.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1A:
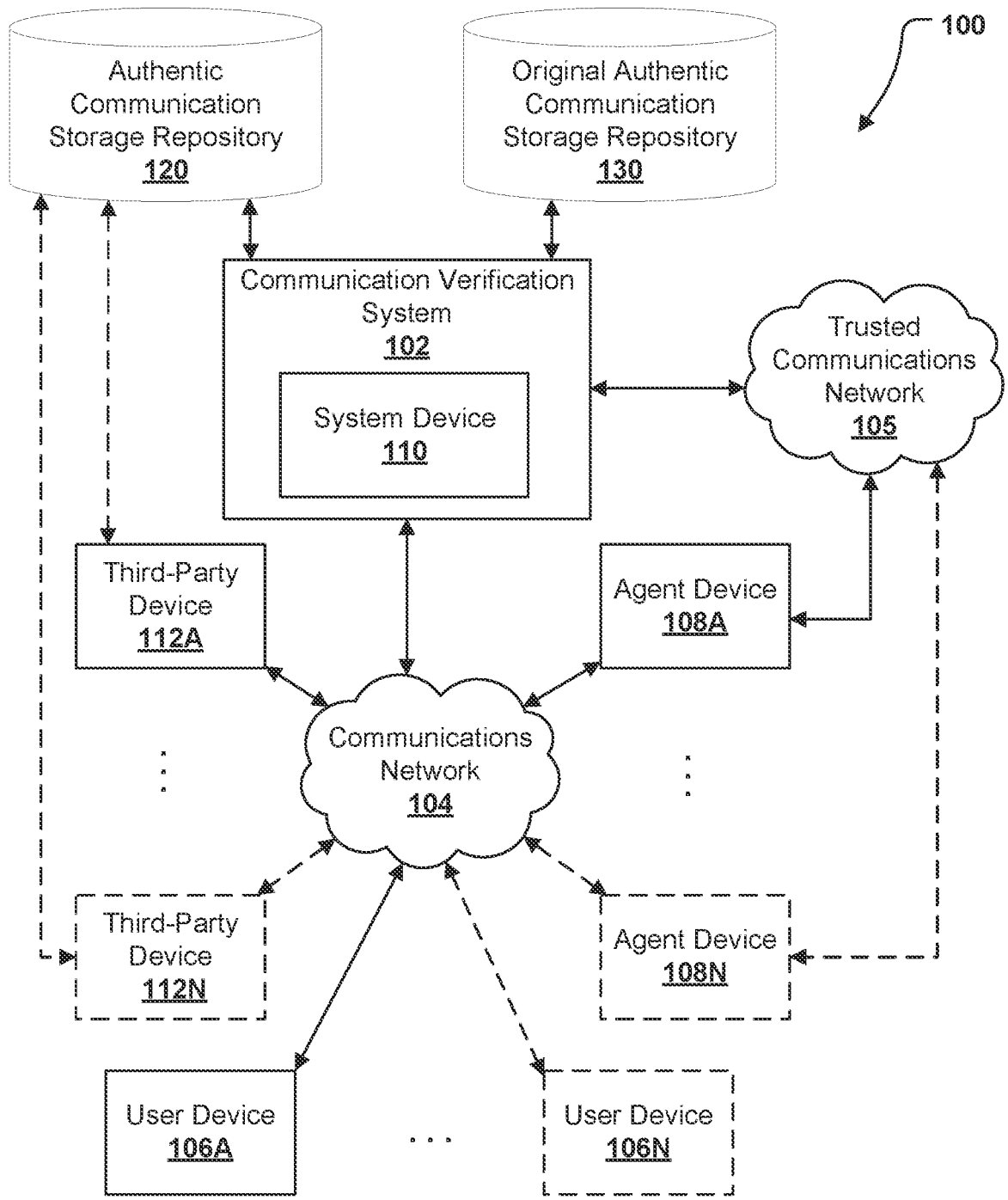
FIGS. 1A-1B each illustrates a system in which some example embodiments may be used to verify received candidate communications.
Figure 1B:
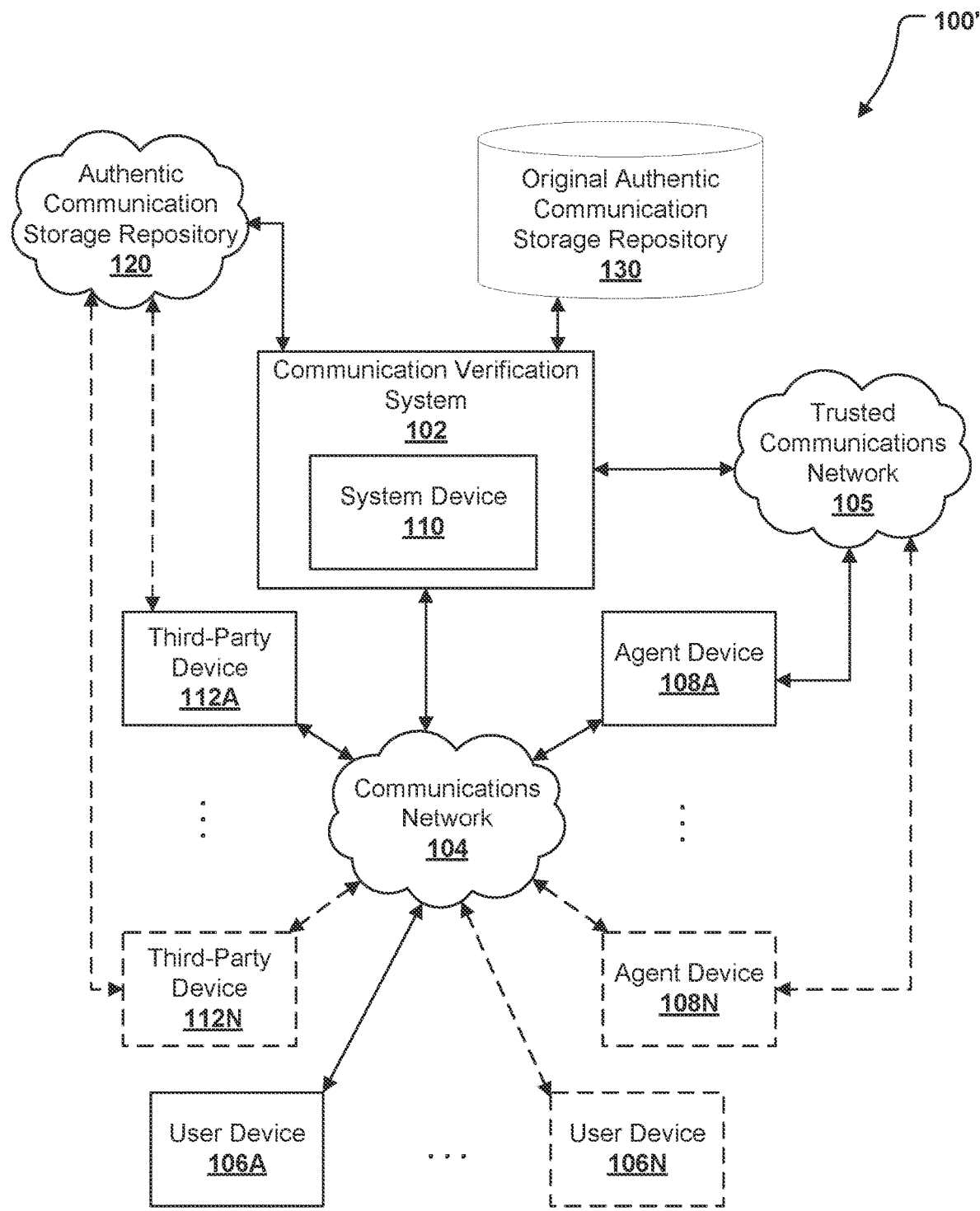

Example embodiments described herein may be implemented using any of a variety of computing devices or servers. To this end, FIGS. 1A-1B illustrates an example environment 100 and 100', respectively, within which various embodiments may operate. As illustrated, a communication verification system 102 may receive and/or transmit information via communications network 104 (e.g., the Internet) with any number of other devices, such as one or more of user devices 106A-106N, agent 108A-108N, and/or one or more third-party devices 112A-112N. Additionally, the communication verification system 102 may receive and/or transmit information via trusted communications network 105 (e.g., an Intranet), which may be a private or restricted communication environment within which only certain, authorized devices may communication. A system device 110 of the communication verification system 102 and one or more agent devices 108A-108N may be authorized devices and may receive and/or transmit information via trusted communications network 105.

The communication verification system 102 may be implemented as one or more computing devices or servers, such as system device 110, which may be composed of a series of components. Particular components of the system device 110 are described in greater detail below with reference to apparatus 200 in connection with FIG. 2.

The one or more user devices 106A-106N, the one or more agent devices 108A-108N, and/or the one or more third-party devices 112A-112N may be embodied by any computing devices known in the art. The one or more user devices 106A-106N, the one or more agent devices 108A-108N, and/or the one or more third-party devices 112A-112N need not themselves be independent devices, but may be peripheral devices communicatively coupled to other computing devices. In some embodiments, a user device (e.g., any one of user devices 106A-106N) may be associated with a user who has a user account maintained by the communication verification system 102 (e.g., a customer). In some embodiments, an agent device (e.g., any one of agent devices 108A-108N) may be associated with an agent who is an authorized user associated with the communication verification system 102 (e.g., an employee of the entity associated with the communication verification system 102). In some embodiments, a third-party device (e.g., any one of third-party devices 112A-112N) may be associated with a third-party entity. In some embodiments, the third-party entity may be associated one or more communication services and further, associated with one or more communication channel types. In some embodiments, the third-party entity may be associated with a consortium in which the entity associated with the communication verification system 102 is also a part of, Although FIGS. 1A-1B illustrate an environment and implementation in which the communication verification system 102 interacts indirectly with a user via one or more of user devices 106A-106N, agent devices 108A-108N, and/or third-party devices 112A-112N, in some embodiments users may directly interact with the communication verification system 102 (e.g., via communications hardware of the communication verification system 102), in which case a separate user devices 106A-106N, agent devices 108A-108N, and/or third-party devices 112A-112N may not be utilized. Whether by way of direct interaction or indirect interaction via another device, a user may communicate with, operate, control, modify, or otherwise interact with the communication verification system 102 to perform the various functions and achieve the various benefits described herein.

In some embodiments, the communication verification system 102 further includes original authentic communication storage repository 130 that may comprise a distinct component from other components of the communication verification system 102. The original authentic communication storage repository 130 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). In some embodiments, original authentic communication storage repository 130 may host the software executed to operate the communication verification system 102. In some embodiments, the original authentic communication storage repository 130 may be hosted on the cloud by a cloud service.

The original authentic communication storage repository 130 may store information relied upon during operation of the communication verification system 102, such as various authentic user profiles and/or encrypted authentication communications that may be used by the system device 110 and/or communication verification system 102, data and documents to be analyzed using the system device 110 and/or communication verification system 102, or the like. In addition, original authentic communication storage repository 130 may store control signals, device characteristics, and access credentials (e.g., user credentials, agent credentials, device identifiers, and/or the like) enabling interaction between the system device and one or more of the user devices 106A-106N, agent devices 108A-108N, and/or third-party devices.

As shown in FIG. 1A, in some embodiments, the communication verification system 102 further includes authentic communication storage repository 120 that may comprise a distinct component from other components of the communication verification system 102. The authentic communication storage repository 120 may be embodied as one or more DAS devices (such as hard drives, solid-state drives, optical disc drives, or the like) or may alternatively comprise one or more NAS devices independently connected to a communications network (e.g., communications network 104). In some embodiments, authentic communication storage repository 120 may host the software executed to operate the communication verification system 102. In some embodiments, the authentic communication storage repository 120 may be hosted on the cloud by a cloud service.

In some embodiments, the authentic communication storage repository 120 may store information relied upon during operation of the communication verification system 102, such as various authentic communication records that may be used by the communication verification system 102 or the like. In addition, authentic communication storage repository 120 may store control signals, device characteristics, and access credentials enabling interaction between the communication verification system 102 and one or more of the user devices 106A-106N, agent devices 108A-108N, and/or third-party device 112A-112N. In some embodiments, the authentic communication storage repository is associated with one or more third-party entities. Thus, one or more third-party devices (e.g., any one of third-party devices 112A-112N) associated with a third-party entity that may access the authentic communication storage repository and may include authentic communication records generated by a third-party institution in the authentic communication storage repository 120.

In some embodiments, as shown in FIG. 1B, the authentic communication storage repository 120 corresponds to a distributed ledger technology (DLT) infrastructure, such as a blockchain. In some embodiments, the authentic communication storage repository 120 may be embodied as a server or collection of servers that may interface with decentralized applications such as a distributed ledger to track or enable certain functionality. In some embodiments, the collection of networked distributed ledger nodes of a blockchain, which may be permissionless (public) or permissioned (private).

For example, in some embodiments, the authentic communication storage repository 120 may comprise a collection of networked distributed ledger nodes of a blockchain or blockchain technology that is capable of creating and exchanging blockchain tokens. In some embodiments, the distributed ledger may allow for Turing-complete scripting of contracts, known also as smart-contracts, distributed applications, or decentralized applications, to be executed on the distributed ledger or blockchain. The distributed ledger may be related to other blockchain networks not pictured here. For example, the distributed ledger may be a sidechain of another blockchain network, or another network (not shown) may form a sidechain of the distributed ledger. The nodes may be embodied by specialized node devices, or may be embodied by any computing devices or server devices known in the art. In some embodiments the system device 110 and/or communication verification system 102 may be a node of the distributed ledger or may be external to the blockchain. In some embodiments, the blockchain is a federated blockchain that is associated with one or more third-party entities. One or more third-party devices (e.g., any one of third-party devices 112A-112N) associated with a third-party entity that is part of the federated blockchain, may be a node of the blockchain. In some embodiments, authentic communication records, generated by the communication verification system 102 or another third-party device (e.g., any one of third-party devices 112A-112N) may be stored within a block on the blockchain of the authentic communication storage repository.

Example Implementing Apparatuses

Figure 2:
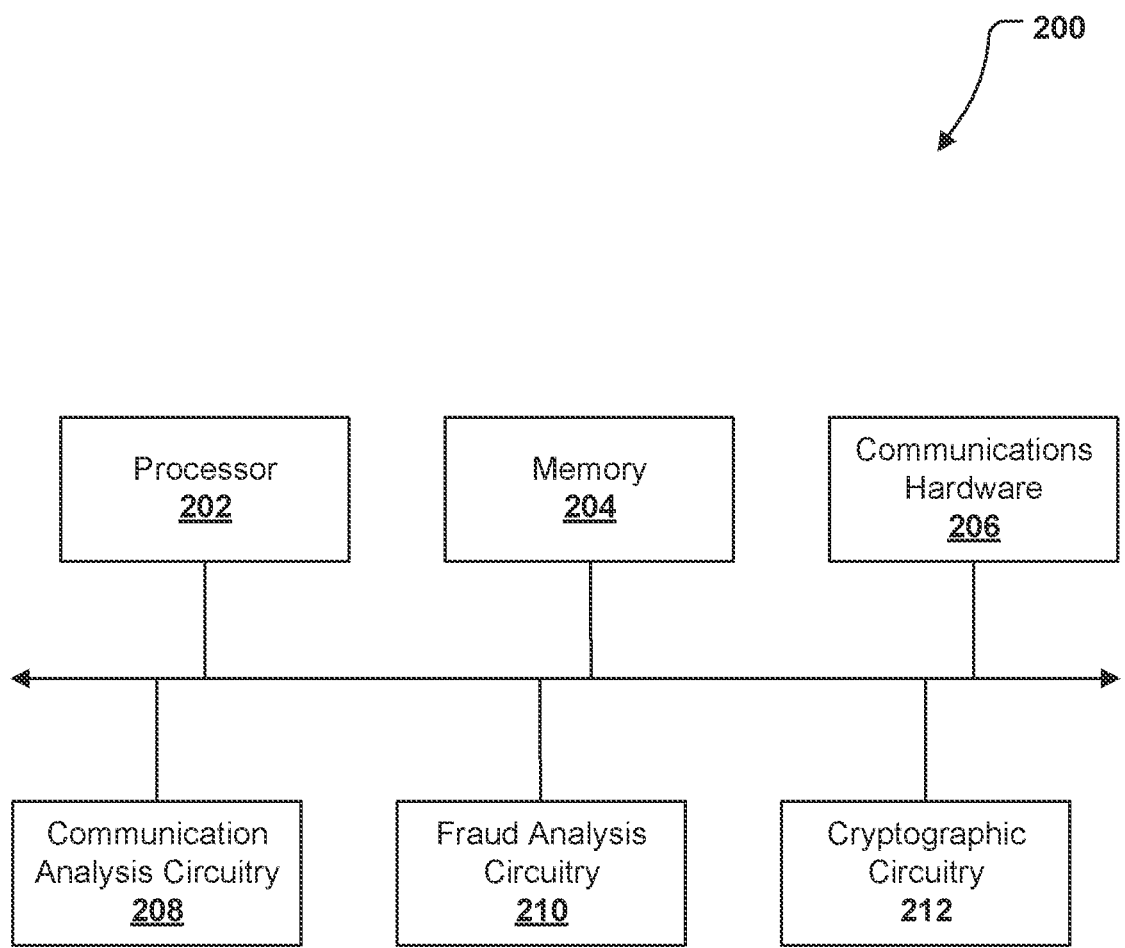
FIG. 2 illustrates a schematic block diagram of example circuitry embodying a system device that may perform various operations in accordance with some example embodiments described herein.

The system device 110 communication verification system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-12. As illustrated in FIG. 2, the apparatus 200 may include processor 202, memory 204, communications hardware 206, communication analysis circuitry 208, fraud analysis circuitry 210, and/or cryptographic circuitry 212, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network. In some embodiments, the communications hardware 206 may be configured to establish an authenticated session with a user device and/or agent device, receive a communication verification request, provide a communication verification response, receive a communication request denial, provide a fraudulent communication notification, provide a fraud warning, store encrypted authentic communications, receive a communication history request, provide a communication history response, and/or the like.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a communication analysis circuitry 208 that may be configured to determine one or more candidate communication feature values, query an authentic communication storage repository, determine a communication classification, determine a contextual reason for a candidate communication/authentic communication, generate a fraudulent communication notification record, generate a candidate communication identifier, generate an authentication communication record, determine a user identifier for a user, retrieve stored encrypted authentic communications, generate a communication history response, and/or the like. The communication analysis circuitry 208 may utilize processor 202, memory 204, or any other hardware component included in the apparatus 200 to perform these operations, as described in connection with FIGS. 3-12 below. The communication analysis circuitry 208 may further utilize communications hardware 206 to gather data from a variety of sources (e.g., any one of user devices 106A-106N, agent devices 108A-108N, third-party devices 112A-112N, authentic communication storage repository 120, and/or original authentic communication storage repository 130, as shown in FIG. 1), and/or exchange data with a user.

In addition, the apparatus 200 further comprises a fraud analysis circuitry 210 that may be configured to determine one or more user account features for a user, determine a susceptible user, identify a communication channel type, determine one or more third-party entities associated with the communication channel type, and/or the like. The fraud analysis circuitry 210 may utilize processor 202, memory 204, or any other hardware component included in the apparatus 200 to perform these operations, as described in connection with FIGS. 3-12 below. The fraud analysis circuitry 210 may further utilize communications hardware 206 to gather data from a variety of sources (e.g., any one of user devices 106A-106N, agent devices 108A-108N, third-party devices 112A-112N, authentic communication storage repository 120, and/or original authentic communication storage repository 130, as shown in FIG. 1), and/or exchange data with a user.

In addition, the apparatus 200 further comprises a cryptographic circuitry 212 that may be configured to encrypt an authentic communication, decrypt an authentic communication, and/or the like. The cryptographic circuitry 212 may utilize processor 202, memory 204, or any other hardware component included in the apparatus 200 to perform these operations, as described in connection with FIGS. 3-12 below. The cryptographic circuitry 212 may further utilize communications hardware 206 to gather data from a variety of sources (e.g., any one of user devices 106A-106N, agent devices 108A-108N, third-party devices 112A-112N, authentic communication storage repository 120, and/or original authentic communication storage repository 130, as shown in FIG. 1), and/or exchange data with a user.

Although components 202-212 are described in part using functional language, it will be understood that the particular implementations necessarily include the use of particular hardware. It should also be understood that certain of these components 202-212 may include similar or common hardware. For example, the communication analysis circuitry 208, fraud analysis circuitry 210, and/or cryptographic circuitry 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the communication analysis circuitry 208, fraud analysis circuitry 210, and/or cryptographic circuitry 212 may leverage processor 202, memory 204, or communications hardware 206 as described above, it will be understood that any of communication analysis circuitry 208, fraud analysis circuitry 210, and/or cryptographic circuitry 212 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that communication analysis circuitry 208, fraud analysis circuitry 210, and/or cryptographic circuitry 212 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of graphical user interfaces and flowcharts.

Example Operations

Turning to FIGS. 3-12, example flowcharts are illustrated that contain example operations implemented by example embodiments described herein. The operations illustrated in FIGS. 3-12 may, for example, be performed by system device 110 of the communication verification system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, communication analysis circuitry 208, fraud analysis circuitry 210, cryptographic circuitry 212, and/or any combination thereof. It will be understood that user interaction with the communication verification system 102 may occur directly via communications hardware 206, or may instead be facilitated by a separate device (e.g., any one of user devices 106A-106N, agent devices 108A-108N, and/or third-party devices 112A-112N), as shown in FIG. 1, and which may have similar or equivalent physical componentry facilitating such user interaction.

Generating and Maintaining Verified Communication Records

Figure 3:
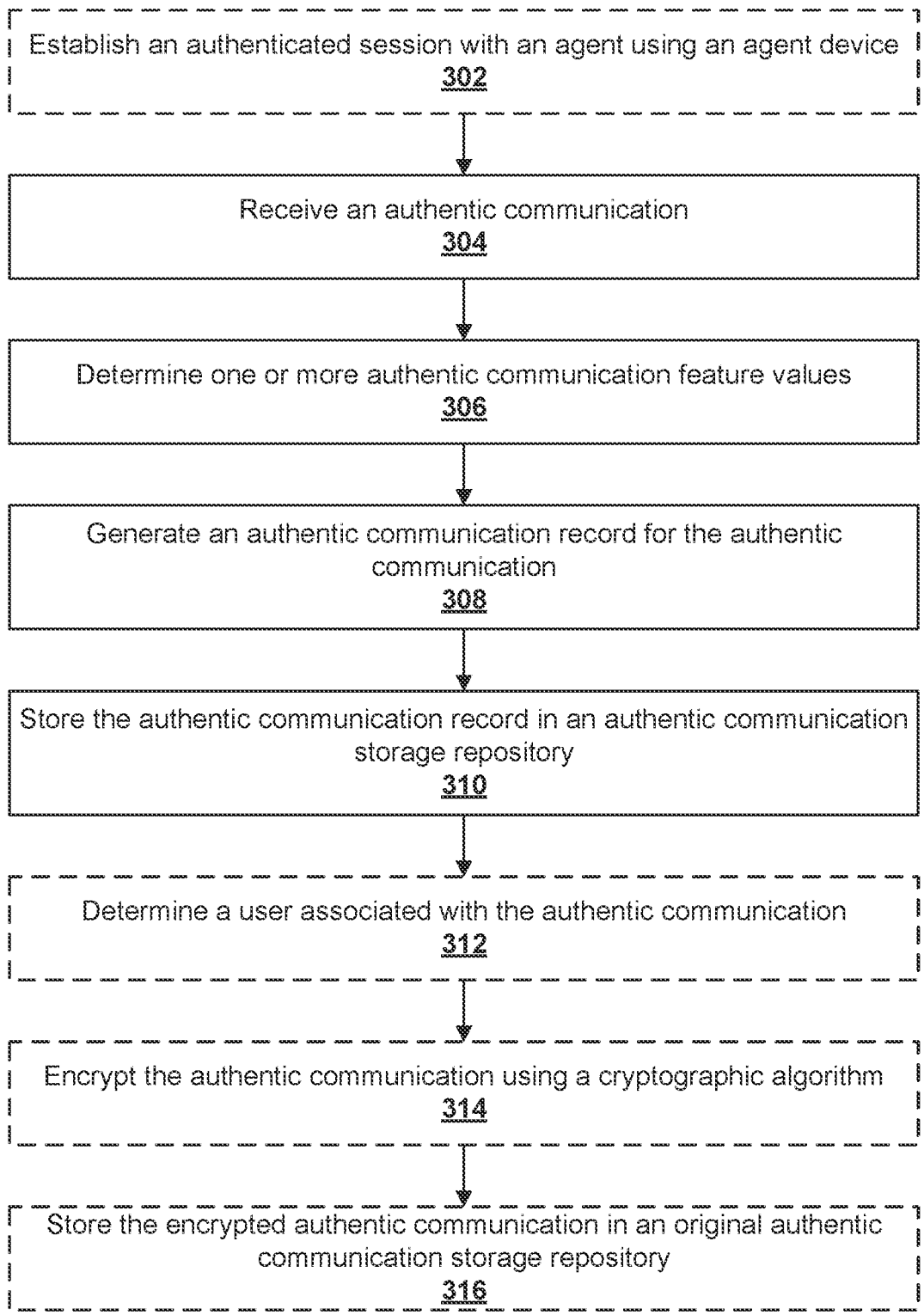
FIG. 3 illustrates an example flowchart for storing authentic communication records in an authentic communication storage repository, in accordance with some example embodiments described herein.

Turning first to FIG. 3, example operations are shown for storing authentic communication records in an authentic communication storage repository. To enable use of the authentic communication storage repository 120 and/or original authentic communication storage repository 130, apparatus 200 must receive indications of authentic communications that were provided to a user. These indications must be received from known and trustworthy sources such that the veracity of the communication is known to be authentic. Apparatus 200 may then generate an authentic communication record for the authentic communication and store the authentic communication record in authentic communication storage repository 120. Additionally, or alternatively, apparatus 200 may store the authentic communication in original authentic communication storage repository 130. These storage repositories may then be used to verify whether a candidate communication received from a user or a third-party entity is authentic.

Optionally, as shown by operation 302, the apparatus 200 includes means, such as processor 202, memory 204, communications hardware 206, communication analysis circuitry 208, or the like, for establishing an authenticated session with an agent using an agent device. In some embodiments, the communications hardware 206 may receive a logon request from an agent device (e.g., any one of agent devices 108A-108N), such as in an instance when an agent attempts to access an associated agent account within an internal account environment. The logon request may include candidate agent credentials for the agent. The communication analysis circuitry 208 may attempt to authenticate the provided candidate agent credentials using stored agent credentials from an agent account. In an instance in which the communication analysis circuitry 208 authenticates the provided agent credentials, the communications hardware 206 may establish an authenticated session with the agent using the agent device (e.g., any one of agent devices 108A-108N). In an instance in which the communication analysis circuitry 208 fails to authenticate the provided agent credentials, the communications hardware 206 may reject an establishing an authenticated session with the agent using the agent device (e.g., any one of agent devices 108A-108N) and may require the agent provide a new logon request that includes updated agent credentials.

In some embodiments, the agent may be an authorized user associated with the communication verification system 102 (e.g., an employee, contractor, or other authorized party). An agent may also be associated with an agent account that may be stored and maintained in an associated memory (e.g., memory 204 or another data repository). The agent account may further be associated with an agent identifier (e.g., a username, email, employee number, and/or the like) and agent credentials (e.g., a password, biometric data, personal identification number, and/or the like). The communication analysis circuitry 208 may identify a particular agent using the agent identifier and authenticate the agent based on the associated agent credentials.

The agent profile may also include a set of permissions that allow the agent to access certain data or information within the communication verification system 102 that other unauthorized users would not be able to access. For example, a set of permissions associated with the agent may allow the agent to use the agent device (e.g., one or more of agent devices 108A-108N) to access user information (e.g., customer information) within an internal account environment, such as via trusted communications network 105. Additionally, the set of permissions may allow the agent to provide certain data (e.g., an authentic communication) to the communications hardware 206 and the apparatus 200 may take further action (e.g., generating an authentic communication record and storing the authentic communication record in the authentic communication storage repository 120 and/or store the authentic communication within the original authentic communication storage repository 130.

In some embodiments, the logon request may be received using a hypertext transfer protocol (HTTP) or HTTP secure (HTTPS) protocol. In some embodiments, the logon request may be a request to access an agent account within an internal account environment. The logon request may include a candidate agent identifier (e.g., a username, email, employee number, and/or the like) and candidate agent credentials (e.g., a password, biometric data, personal identification number, and/or the like). Furthermore, the logon request may be indicative of the agent device (e.g., any one of agent devices 108A-108N), such as by including an agent device identifier (e.g., a serial number, an international mobile equipment identity (IMEI), a media access control (MAC) address, a unique device identifier (UDID), an electronic serial number, a mobile equipment identifier (MEID), a universally unique identifier (UUID), a hardware identifier, an internet protocol (IP) address, and/or the like). The communication analysis circuitry 208 may authenticate the logon request based on the received candidate agent credentials and stored agent credentials associated with the agent account and may determine whether the received candidate agent credentials match stored agent credentials. In an instance the received candidate agent credentials match stored agent credentials, the agent may be authenticated and the communications hardware 206 may provide a response (e.g., an HTTP response) that includes agent account data for the internal account environment to agent device (e.g., any one of agent devices 108A-108N).

Once the agent account data for the internal account environment is provided to the agent using the agent device (e.g., any one of agent devices 108A-108N), the authenticated session may be successfully established. The authenticated sessions may continue until a termination event occurs. A termination event may be the agent logging out of the session. Alternatively, the termination event may be a timeout event, where the agent device (e.g., any one of agent devices 108A-108N) is inactive for a length of time that exceeds an inactivity time threshold (e.g., 10 minutes). In an instance a termination event occurs, the agent may be required to provide another logon request to establish a new authenticated sessions or re-establish the authenticated session.

As shown by operation 304, the apparatus 200 includes means, such as processor 202, memory 204, communications hardware 206, or the like, for receiving an authentic communication from the agent device. Once the authenticated session is established with the agent using the agent device (e.g., any one of agent devices 108A-108N), the communications hardware 206 may receive an authentic communication from the agent device. In some embodiments, the communications hardware 206 may receive the authentic communication from the agent device in an instance the agent device (e.g., any one of agent devices 108A-108N) provides a communication to a user. The agent device may additionally provide the authentic communication to communications hardware to indicate a corresponding communication was provided to the user. In some embodiments, the authentic communication received may be representative of the communication provided to the user. Thus, apparatus 200 may keep a record of the authentic communications provided to users by agent devices with established authenticated sessions, as described in further detail below.

Alternatively, in some embodiments, an authenticated session with an agent device is not required. In some embodiments, an agent device may be a computational device, such as a server, that does not require an agent to login. The agent device (e.g., any one of agent devices 108A-108N) may be configured to periodically or semi-periodically provide users with communications. Thus, in some embodiments, the communications hardware 206 may receive the authentic communication from an agent device without requiring an authenticated session with the user. To ensure the validity of the received authentic communication, the communications hardware 206 may receive the authentic communication over the trusted communications network 105. Additionally, the authentic communication may further include the agent device identifier of the agent device that provided the authentic communication such that the communication analysis circuitry 208 may verify that the agent device identifier corresponds to an agent device identifier associated with communication verification system 102. In some embodiments, a list of each agent device identifier associated with the communication verification system 102 may be stored in an associated memory (e.g., memory 204 or another storage repository) that the communication analysis circuitry 208 may access to determine whether a provided agent device identifier corresponds to an agent device identifier on the list. In an instance the agent device identifier does correspond to an agent device identifier on the list, the communication analysis circuitry 208 may confirm the received authentic communication is authentic and proceed with subsequent operations. In an instance the device identifier fails to correspond to an agent device identifier on the list, the communication analysis circuitry 208 may be unable to confirm that the received authentic communication is authentic and may reject the received authentic communication.

Additionally, in some embodiments, communications hardware 206 may receive an authentic communication from a third-party device (e.g., any one of third-party devices 112A-112N) associated with a third-party institution that may participate in an authentic communication program with the institution that operates communication verification system 102. In some embodiment, the third-party device (e.g., any one of third-party devices 112A-112N) may provide an authentic communication that was provided to a user by the corresponding third-party institution. The third-party device may then provide the authentic communication to the communications hardware for storage in the authentic communication storage repository. In this way, an authentic communication record may be generated for authentic communications that originate outside of the institution that operates communication verification system 102 but are associated with an authenticated third-party institution. To ensure the validity of the received authentic communication, the authentic communication may further include the third-party device identifier (e.g., a IMEI, a MAC address, a UDID, an electronic serial number, a MEID, a UUID, a hardware identifier, an IP address, and/or the like) of the third-party device (e.g., any one of third-party devices 112A-112N) that provided the authentic communication such that the communication analysis circuitry 208 may verify that the third-party device identifier corresponds to an third-party device identifier associated with an authenticated third-party institution. In some embodiments, a list of each authenticated third-party and third-party device identifier may be stored in an associated memory (e.g., memory 204 or another storage repository). The communication analysis circuitry 208 may access this list to determine whether a provided third-party device identifier corresponds to a third-party device identifier on the list. In an instance the third-party device identifier does correspond to a third-party device identifier on the list, the communication analysis circuitry 208 may confirm the received authentic communication is authentic and proceed with subsequent operations. In an instance the third-party device identifier fails to correspond to a third-party device identifier on the list, the communication analysis circuitry 208 may be unable to confirm that the received authentic communication is authentic and may reject the received authentic communication.

In some embodiments, the communication analysis circuitry 208 may be configured to generate authentic communications and provide these communications to a user. Thus, the communications hardware 206 may receive an indication that the communication analysis circuitry 208 has generated and provided an authentic communication.

An authentic communication may be a communication whose origin is known such that the communication is known to be an authentic communication. For example, a communication that originates from agent device 108A that has successfully established an authenticated session with apparatus 200 and is associated with the communication verification system may generate and provide a communication to a user (e.g., a customer). The particular communication is known to be authentic as the origin of the communication at agent device 108A is known and further, agent device 108A has successfully established an authenticated session such that the source of the communication is also known to be authentic.

The received authentic communication may also include an indication of a user identifier of a user to whom the communication was sent. As described in further detail below, each user associated with the communication verification system 102 may be assigned a user identifier that uniquely identifies the user and corresponding user account. In some embodiments, the received authentic communication may also include an indication of the agent identifier of the agent who provided the authentic communication and/or the agent device identifier for the agent device used to provide the authentic communication.

The authentic communication may correspond to a particular communication channel type. A communication channel type may be indicative of the communication channel an agent device used to provide the communication to a user. A communication channel type may include an email communication channel type, a short-message service (SMS) message (e.g., a text message) communication channel type, a phone call communication channel type, a paper mailing communication channel type, and a miscellaneous communication channel type.

The received authentic communication may include the content of the communication sent to the user. The content of an authentic communication may depend on the communication channel type associated with the authentic communication. For example, a received authentic communication associated with an email communication channel type may include a communication body describing the content of the email. As another example, a received authentic communication associated with a SMS message communication channel type may include a communication body describing the content of the SMS message. As another example, a received authentic communication associated with a phone call communication channel type may include a transcript of the phone call. As yet another example, a received authentic communication associated with a paper mailing communication channel type may include an image of the paper mailing. In some the received authentic communication associated with a paper mailing may further include an indication of whether a user interaction element is present on the paper mailing. For example, a user interaction element may be a quick response (QR) code that a user may scan.

The authentic communication may include an indication of an entity identity. An entity identity may describe the entity (e.g., such as an entity associated with the communication verification system 102) that provided the authentic communication. In some embodiments, each agent device (e.g., any one of agent devices 108A-108N) may be configured with a specific entity identifier that describes the entity it is associated with. For example, each of agent devices 108A-108N may be associated with entity ABC, which may correspond to an entity identifier of "entityabc". Thus, any of agent device 108A-108N may be configured to provide the entity identifier with the authentic communication.

Additionally, the authentic communication may be configured to provide a sender identity. A sender identity may identify the particular agent device or agent account that provided the authentic communication. By way of example, for an email communication channel type, the sender identity may be the email address the email was sent from. As another example, for a SMS message communication channel type, the sender identity may be the phone number the SMS message was sent from. As another example, for a phone call communication channel type, the sender identity may be the phone number, with the extension (if applicable), the phone call originated from. In some embodiments, the sender identity may be provided with the authentic communication or may be provided in the authentic communication metadata, as described below.

The authentic communication may also include an indication of a user identity. The user identity may identify the user to whom the authentic communication is provided to. As described above, a user identifier may uniquely identify a user and corresponding user account. In some embodiments, an agent device (e.g., any one of agent devices 108A-108N) may be configured to determine the user identifier for a recipient user and include the user identifier in the authentic communication. Thus, the user account of the user intended to receive the authentic communication is known.

Additionally, the authentic communication may be configured to provide a recipient identity. A recipient identity may identify the particular user device or user account to which the authentic communication was provided. By way of example, for an email communication channel type, the recipient identity may be the email address the email was sent to. As another example, for a SMS message communication channel type, the recipient identity may be the phone number the SMS message was sent to. As another example, for a phone call communication channel type, the recipient identity may be the phone number, with the extension (if applicable), the phone call was made to. As another example, for a paper mailing communication channel type, the recipient identity may be the address the paper mailing was sent to. In some embodiments, the recipient identity may be provided with the authentic communication or may be provided in the authentic communication metadata, as described below.

The authentic communication may also include authentic communication metadata. The authentic communication metadata may be indicative of a sent timestamp and sent date that describes the time the communication was provided to the user and the date the communication was provided to the user, respectively. In some embodiments, the authentic communication metadata is further indicative of a sender identity and a recipient identity. The particular type of metadata included in the authentic communication may depend on the communication channel type associated with the authentic communication. For example, a received authentic communication associated with an email communication channel type may include authentic communication metadata indicative of a sender identity (e.g., an agent email address), a recipient identity (e.g., a user email address), a communication subject, a sent timestamp, and a sent date. As another example, a received authentic communication associated with a SMS message communication channel type may include authentic communication metadata indicative of a sender identity (e.g., an agent device phone number), a recipient identity (e.g., a user device phone number), a sent timestamp, and a sent date. As another example, a received authentic communication associated with a phone call communication channel type may include authentic communication metadata indicative of a caller identity (e.g., an agent device phone number), a recipient identity (e.g., a user device phone number), a call duration, a call timestamp, and a call date. As yet another example, a received authentic communication associated with a paper mailing communication channel type may include authentic communication metadata indicative of a sender identity (e.g., an agent device identifier), a recipient address (e.g., a user address), a sent timestamp, and a sent date.

In some embodiments, the authentic communication may also include an indication of a contextual reason for the authentic communication. An authentic communication may be provided in response to detection of trigger event. This trigger event may be associated with a user or the entity associated with apparatus 200. For example, a trigger event may be an agent device (e.g., any one of agent devices 108A-108N) and/or communications hardware 206 receiving a request to reset a password for a user account and providing the authentic communication of a password reset request. Thus, the contextual reason for the authentic communication is a receipt of a password reset request. As another example, a user account of the user may be associated with account settings indicative that the user has opted into one or more promotional programs. The trigger event may be detection that a new promotional offer is available to the user or a reminder of an available promotional offer and an agent device (e.g., any one of agent devices 108A-108N) and/or communications hardware 206 may provide an authentic communication request indicative of the new or existing promotional offer. Thus, the contextual reason for the authentic communication is a user eligibility notification. As another example, agent device (e.g., any one of agent devices 108A-108N) and/or communications hardware 206 may detect a time-sensitive event, such as monthly account update, and may provide the authentic communication that includes user account information. Thus, the contextual reason for the authentic communication is a user account notification. Each trigger event may be associated with a particular contextual reason category, which may be included in the authentic communication. Thus, the communication analysis circuitry 208 may determine the contextual reason for the authentic communication.

As shown by operation 306, the apparatus 200 includes means, such as processor 202, memory 204, communication analysis circuitry 208, or the like, for determining one or more authentic communication feature values for the authentic communication. The communication analysis circuitry 208 may be configured to process the received authentic communication to determine one or more authentic communication feature values that each correspond to a communication feature type. An authentic communication feature value may be used to help identify the authentic communication and/or differentiate it from other authentic communications. These one or more authentic communication feature values may be used by the communication analysis circuitry 208 when generating the authentic communication record.

In some embodiments, the communication analysis circuitry 208 may be configured to use a transformation model to determine the one or more authentic communication feature values. The transformation model may be a rules-based model or a machine learning model (e.g., a neural network) that is configured to analyze the authentic communication with the authentic communication metadata and determine one or more authentic communication feature values for one or more authentic communication feature types of interest. The transformation model may also be configured with a communication feature template. The communication feature template may provide a list of communication feature types of interest for each communication channel type. Thus, the transformation model may use the communication feature template to determine the communication feature types that require communication feature values for the authentic communication. Additionally, in some embodiments, the communication feature template may describe a process for determining transforming an intermediate communication feature value into a communication feature value for a communication feature type. As described in further detail below, an intermediate communication feature value may be transformed into an authentic communication feature value of a particular structure using any suitable technique, such as hashing, tokenization, encryption, and/or the like. This may ensure authentic communication feature values of a particular communication feature type are similarly formatted and further, may serve to protect any sensitive data included in the authentic communication, thereby maintaining security of communications.

In some embodiments, the authentic communication may be structured data such that the transformation model may be configured to analyze a particular field within the structured authentic communication and/or authentic communication metadata to determine an intermediate authentic communication feature value for a communication feature type. For example, an authentic communication associated with an email communication channel type may include authentic communication metadata that is structured with various data fields (e.g., "to", "from", "subject", or the like) and the communication analysis circuitry 208 may be configured to identify intermediate communication feature values based on these structured data fields.

In some embodiments, the authentic communication may also include unstructured data such that additional processing is required. For example, an authentic communication associated with a paper mailing communication channel type may include an image of the paper mailing. However, the authentic communication may also include authentic communication metadata that is structured data. In some embodiments, the communication analysis circuitry 208 may be configured to additionally use a feature extraction model to extract one or more intermediate authentic communication feature values for a communication feature type of interest from the unstructured data (e.g., an image of the paper mailing). The feature extraction model may be a machine learning model, such as a convolutional neural network (CNN), may be trained to analyze unstructured data and may process the image to determine intermediate authentic communication feature values for a communication feature type of interest. In some embodiments, the feature extraction model may be configured to use image processing techniques, such as optical character recognition (OCR), natural language processing (NLP) techniques, or other processing techniques to aid in image processing. In some embodiments, the feature extraction model may be trained to identify an object within the unstructured data (e.g., an image) that corresponds to a communication feature type of interest. For example, a communication feature type of interest may a recipient identity of an address. The feature extraction model may be trained using an annotated training data set that includes images of paper mailings with a bounding box around an address text. Thus, the feature extraction model may be trained to identify objects that correspond to a communication feature type of interest and may apply text processing techniques (OCR and/or NLP) to determine an intermediate authentic communication feature value for a given communication feature type. The feature extraction model may output the intermediate authentic communication feature values and an indication of the corresponding communication feature types to the transformation model.

Once the transformation model has identified an intermediate authentic communication feature value for each communication feature type described by the communication feature template, the transformation model may determine the authentic communication feature value for the communication feature. In some embodiments, the communication feature template may describe for the transformation model to transform the intermediate authentic communication feature value using a hashing algorithm. Thus, the authentic communication feature value may be a hashed value of the intermediate authentic communication feature value. Alternatively, the transformation model may be configured to use other techniques such as one-hot encoding, label encoding, binary encoding, and/or the like. In some embodiments, the transformation model may use a tokenization algorithm to analyze an intermediate authentic communication feature value and may apply parsing and/or rules to generate an authentic communication feature value. In some embodiments, one or more communication feature types may require a different hashing algorithm. The hashing algorithms may be stored in an accessible memory, such as memory 204 or another storage repository, such that the communication analysis circuitry 208 and the transformation model may access and use the hashing algorithms described by the communication feature template. Thus, each authentic communication feature value may be generated in accordance with a particular structure and format for the communication feature type.

Figure 4:
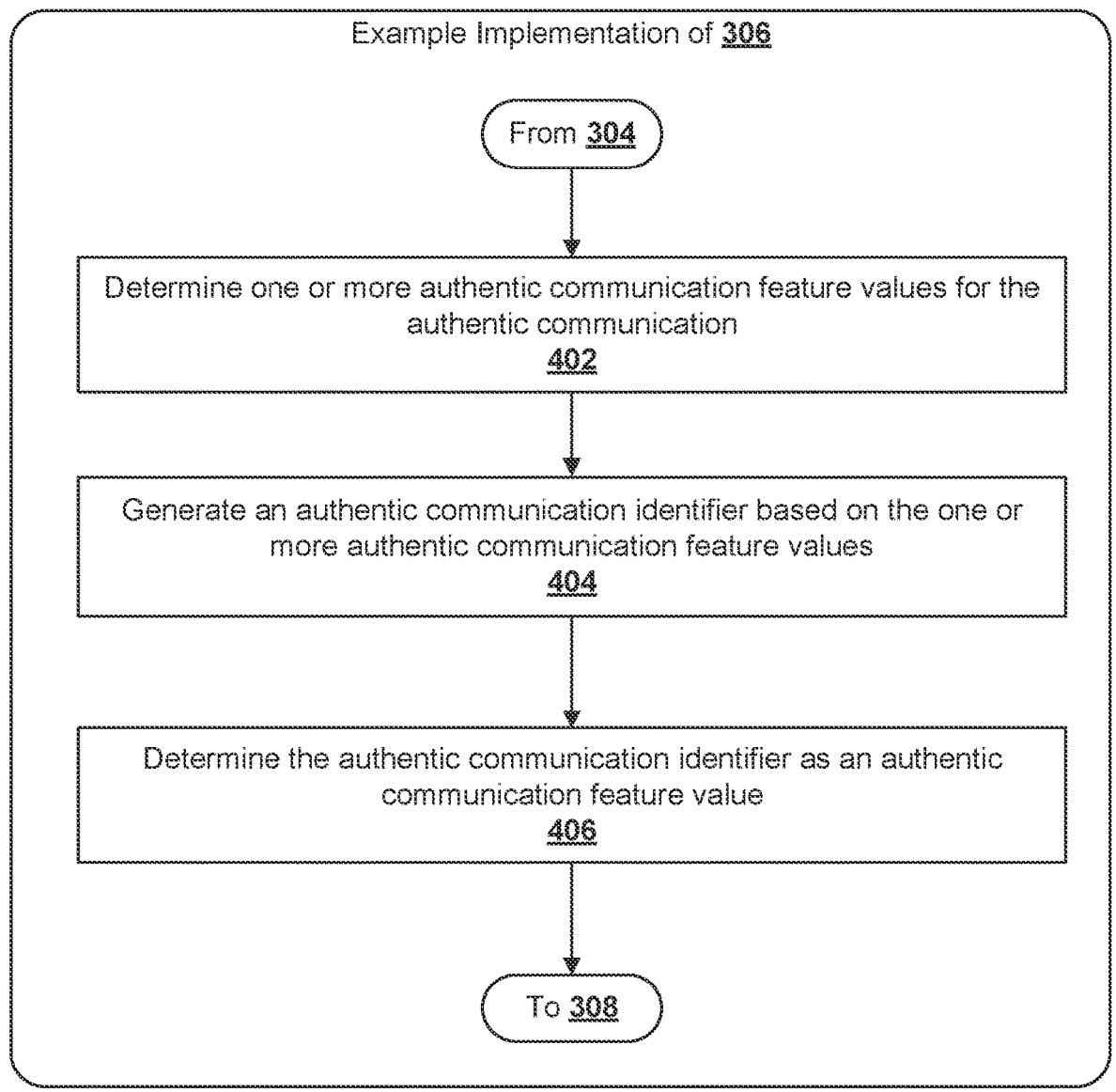
FIG. 4 illustrates an example flowchart for determining an authentic communication feature for the authentic communication, in accordance with some example embodiments described herein.

In some embodiments, operation 306 may be performed in accordance with the operations described by FIG. 4.

Turning now to FIG. 4, example operations are shown for determining an authentic communication feature for the authentic communication.

As shown by operation 402, the apparatus 200 includes means, such as processor 202, memory 204, communication analysis circuitry 208, or the like, for determining one or more feature values for the authentic communication. As described above in operation 306, the communication analysis circuitry 208 may be configured to determine one or more authentic communication feature values that each correspond to a communication feature type. These authentic communication feature values may be hashed values of an intermediate authentic communication feature value. Alternatively, some authentic communication feature values may be tokenized and parsed representations of an intermediate authentic communication feature value.

As shown by operation 404, the apparatus 200 includes means, such as processor 202, memory 204, communication analysis circuitry 208, or the like, for generating an authentic communication identifier based on the one or more authentic communication feature values. Once the communication analysis circuitry 208 determines the authentic communication feature values for the authentic communication, the communication analysis circuitry 208 may generate an authentic communication identifier. The authentic communication identifier may be a sequence of characters (e.g., alphabetical characters, numerical characters, or special characters) that may uniquely identify the authentic communication.

In some embodiments, the characters of the authentic communication identifier may correspond to a particular defined structure. In some embodiments, one or more characters included in the authentic communication identifier may correspond to a communication identification group. Each communication identification group may be associated with a particular communication feature type. Additionally, a communication identification group may be associated with one or more predefined character positions within the authentic communication identifier.

In some embodiments, the communication analysis circuitry 208 may be configured to use the identification generation model to generate the authentic communication identifier. The identification generation model may be a rules-based model or a machine learning that is configured to receive the one or more authentic communication feature values and generate the authentic communication identifier. The identification generation model may be configured with a communication identifier template for a communication channel type. The communication identifier template may be indicative of the defined structure for the authentic communication identifier. In particular, the communication identifier template may describe a total number of characters for the authentic communication identifier, a minimum number of characters, and/or a maximum number of characters and further, may describe character positions associated with each communication identification group and one or more static characters. The identification generation model may use the communication identifier template to determine a structure for the authentic communication identifier. Additionally, the identification generation model may determine the character values for the characters of a particular communication identification group based on an authentic communication feature values associated with a corresponding communication feature type. The identification generation model may input the authentic communication feature values corresponding to a communication feature type as characters values for the corresponding communication identification group and may additionally input any static characters (e.g., characters that remain unchanged in the authentic communication identifier) to generate the authentic communication identifier. The identification generation model may then output the authentic communication generation identifier to the communication analysis circuitry 208.

Figure 23A:
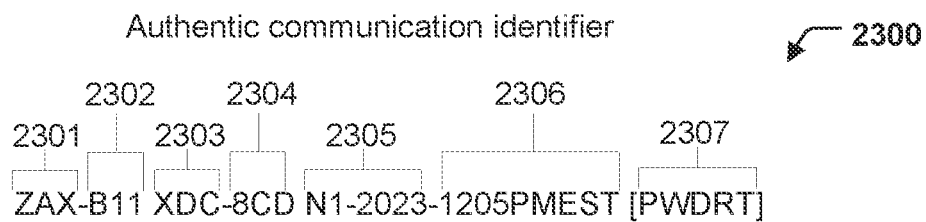
FIG. 23A illustrates an example structure of an authentic communication identifier as used in some example embodiments described herein.

FIG. 23A depicts an example authentic communication identifier 2300. The communication analysis circuitry 208 may use an identification generation model to generate the authentic communication identifier 2300. An example authentic communication may be received from agent device 108A and may be associated with an email communication channel type. The communication analysis circuitry 208 may use the transformation model to generate the one or more authentic communication feature values for the authentic communication and then use the identification generation model to determine the authentic communication identifier for the authentic communication.

In particular, the transformation model may determine a received authentic communication is associated with an email communication channel and may identify a communication feature template that is associated with an email communication channel type to provide the communication feature types of interest. The transformation model may analyze the communication feature template to determine the an email communication channel type requires authentic communication feature values for an entity identity communication feature type, a sender identity communication feature type, a user identity communication feature type, a recipient identity communication feature type, a sent date communication feature type, a sent timestamp communication feature type, and a contextual reason communication feature type.

The transformation model may then determine the one or more intermediate authentic communication feature values for each required communication feature type. The transformation model may process the received authentic communication that includes authentic communication metadata to determine intermediate authentic communication feature values of "entity 1" for an entity identity communication feature type, a value of "agent1@domain1.com" for a sender identity communication feature type, a value of "user 1" for a user identity communication feature type, a value of "user1@domain2.com" for a recipient identity communication feature type, a value of "Nov. 1, 2023" for a sent date communication feature type, a value of "12:05 PM EST" for a sent timestamp communication feature type, and a value of "password reset request received" for a contextual reason communication feature type.

The transformation model may transform these intermediate authentic communication feature values into authentic communication feature values using various techniques as defined by the communication feature template. For example, the transformation model may transform the intermediate authentic communication feature value of "entity 1" into "ZAX" for an entity identity communication feature type using a hashing algorithm XYZ, the value of "agent1@domain1.com" into "B11" for a sender identity communication feature type using the hashing algorithm ABC, the value of "user 1" into "XDC" for a user identity communication feature type using hashing algorithm XYZ, a value of "user1@domain2.com" into "8CD" for a recipient identity communication feature type using the hashing algorithm ABC, a value of "Nov. 1, 2023" into "N1-2023" for a sent date communication feature type using a tokenization algorithm and by applying transformation rules, a value of "12:05 PM EST" into "1205PMEST" for a sent timestamp communication feature type using a tokenization algorithm and by applying transformation rule, and a value of "password reset request received" into "PWDRT" for a contextual reason communication feature type using a tokenization algorithm and by applying transformation rule.

The transformation model may then output these authentic communication feature values with an indication of their corresponding communication feature type as input to the identification generation model. The identification generation model may then generate the authentic communication identifier 2300 using a communication identifier template which defines the structure of the communication identifier. For example, the communication identifier template may define that the first 3 characters at character positions 0, 1, and 2 are associated with a communication identification group 2301 corresponding to the entity identity communication feature type. The communication identifier template may define a static character of a dash at character position 4. The communication identifier template may then define that the next 3 characters at character positions 5, 6, and 7 are associated with a communication identification group 2302 corresponding to the sender identity communication feature type. The communication identifier template may define a static character of a space at character position 5. The communication identifier template may define that the next 3 characters at character positions 6, 7, and 8 are associated with a communication identification group 2303 corresponding to the user identity communication feature type. The communication identifier template may define a static character of a dash at character position 9. The communication identifier template may then define that the next 3 characters at character positions 10, 11, and 12 are associated with a communication identification group 2304 corresponding to the recipient identity communication feature type. The communication identifier template may define a static character of a space at character position 13. The communication identifier template may define that the next 7 characters at character positions 14, 15, 16, 17, 18, 19, and 20 are associated with a communication identification group 2305 corresponding to the sent date communication feature type. The communication identifier template may define a static character of a dash at character position 21. The communication identifier template may define that the next 9 characters at character positions 22, 23, 24, 25, 26, 27, 28, 29, and 30 are associated with a communication identification group 2306 corresponding to the sent timestamp communication feature type. The communication identifier template may define a static character of a space at character position 31. The communication identifier may then define a static character of a left bracket at character position 32 and a static character of a right bracket at a last character position with an undefined number of characters for a are associated with a communication identification group 2307 corresponding contextual reason communication feature type defined within the left bracket and right bracket.

As shown in FIG. 23A, the authentic communication identifier 2300 includes a plurality of characters. The authentic communication identifier 2300 is structured as described above and a portion of the characters included in authentic communication identifier 2300 correspond to communication identification groups 2301-2307. Thus, the authentic communication identifier 2300 may uniquely represent the authentic communication.

Returning now to FIG. 4, as shown by operation 406, the apparatus 200 includes means, such as processor 202, memory 204, communication analysis circuitry 208, or the like, for determining the authentic communication identifier as an authentic communication feature value. Once the communication analysis circuitry 208 determines the authentic communication identifier, the communication analysis circuitry 208 may determine the authentic communication identifier as an authentic communication feature value for an authentic communication identifier communication feature type. In some embodiments, the communication analysis circuitry 208 may discard other authentic communication feature values that do not correspond to the authentic communication identifier communication feature type as the authentic communication identifier includes an indication of these authentic communication feature values.

Returning now to FIG. 3, as shown by operation 308, the apparatus 200 includes means, such as processor 202, memory 204, communication analysis circuitry 208, cryptographic circuitry 212, or the like, for generating an authentic communication record for the authentic communication. The communication analysis circuitry 208 may generate an authentic communication record that is representative of the authentic communication received in operation 304. The communication analysis circuitry 208 may generate the authentic communication record based on the structure of the authentic communication storage repository 120. In some embodiments, the authentic communication record may include the one or more authentic communication features determined in operation 306. Alternatively, in some embodiments, the authentic communication record may only include the authentic communication identifier.

As described above, in some embodiments, authentic communication storage repository 120 is a storage repository, such as a database, that is configured to store authentic communication records. In some embodiments, the authentic communication storage repository 120 may be a relational database, a NoSQL database, a new SQL database, an in-memory database, an object oriented database, a graph database, a time-series database, and/or the like. The communication analysis circuitry 208 may format the authentic communication record as required by the authentic communication storage repository 120. For example, the communication analysis circuitry 208 may generate an authentic communication record as a table, with each row and/or column corresponding to a particular communication feature type as defined within the authentic communication storage repository 120 in an instance the authentic communication storage repository 120 is a relational database. As another example, the communication analysis circuitry 208 may generate an authentic communication record as a graph structure with each node corresponding to an authentic communication feature value of a particular communication feature type and each edge is representative of an order for the authentic communication feature (e.g., such as the order in the authentic communication identifier) in an instance the authentic communication storage repository 120 is a graph database.

Alternatively, in some embodiments, the authentic communication storage repository 120 corresponds to a DLT infrastructure, such as a blockchain. In some embodiments, the cryptographic circuitry 212 may be configured to digitally sign the authentic communication record. The digital signature may serve as proof that the authentic communication record originated from apparatus 200. The blockchain may be configured with rules and protocols that define the communication feature types required to include the authentic communication record in a block of the blockchain. In addition to the one or more authentic communication feature values as determined in operation 306, a blockchain may require a nonce value. A nonce value may correspond to a counter and may be indicative of the number of authentic communication records that apparatus 200 has provided to the blockchain. In some embodiments, the communication analysis circuitry 208 may be configured to maintain a nonce counter in an associated memory, such as memory 204, and may increase the nonce value after each instance the communications hardware 206 provides the authentic communication record to the authentic communication storage repository 120. In some embodiments, the communication analysis circuitry 208 may be configured to determine the rules and protocols for a blockchain using one or more application programming interfaces (APIs) provided for a blockchain. The communication analysis circuitry 208 may then generate the authentic communication record for the authentic communication in accordance with the required formatting of the blockchain (e.g., authentic communication storage repository 120).

In some embodiments, the cryptographic circuitry 212 may additionally encrypt the authentic communication record such that it may be securely transmitted and/or stored. The cryptographic circuitry 212 may be configured to use any suitable cryptographic technique to encrypt the authentic communication record. In some embodiment, the authentic communication storage repository 120 is a component of apparatus 200. As such, the cryptographic circuitry 212 may be configured to perform a local encryption using a cryptographic key. Alternatively, the authentic communication storage repository 120 is distinct from apparatus 200.

In some embodiments, the cryptographic circuitry 212 may be configured to use a random number generation (RNG) algorithm, a pseudo-random number generation (PRNG) algorithm that is certified by particular industry standards (e.g., Federal Information Processing Standards (FIPS) publication 140, such as FIPS 140-1, 140-2, or 140-3), a key derivation function (KDF), pre-shared keys (PSKs), hardware-security modules (HSM), and/or the like to generate a cryptographic key. In some embodiments, the cryptographic key is a symmetric cryptographic key that may be used to both encrypt and decrypt the authentic communication record using an an appropriate symmetric encryption algorithm (e.g., an advanced encryption standard (AES) algorithm, a data encryption standard (DES) algorithm, a Blowfish algorithm, or a Rivest Cipher algorithm, such as RC4, RC5, or RC6). Alternatively, the cryptographic key is an asymmetric key that may include a private key and a public key, where the public key may be used to encrypt the authentic communication record and a private key may be used to decrypt the encrypted authentic communication record. The cryptographic circuitry 212 may maintain the cryptographic key in a secure location, such as within memory 204, or within a key management repository.

As shown by operation 310, the apparatus 200 includes means, such as processor 202, memory 204, communications hardware 206, or the like, for storing the authentic communication record in an authentic communication storage repository. Once the communication analysis circuitry 208 generates the authentic communication record, the communications hardware 206 may store the authentic communication record in the authentic communication storage repository 120.

In an instance in which the authentic communication storage repository 120 is a database, the communications hardware 206 may be configured to provide the authentic communication record directly to the authentic communication storage repository 120. In some embodiments, the authentic communication record may first be validated by authentic communication storage repository 120. In an instance in which the authentic communication record is successfully validated, the authentic communication record may be added to the authentic communication storage repository 120. In an instance in which the authentic communication record is not validated, the communications hardware 206 may receive an indication of the reason for this failure, such as improper formatting. In some embodiments, the communications hardware 206 may provide this indication to communication analysis circuitry 208 and communication analysis circuitry 208 may update a communication feature template and/or communication identifier template to ensure proper formatting of the authentic communication record and may repeat operations 306-308.

In an instance in which the authentic communication storage repository 120 is a blockchain, the authentic communication record that may be digitally signed by apparatus 200, is provided to associated nodes of the blockchain network. In some embodiments, the authentic communication storage repository 120 is a federated blockchain that is associated with one or more third-party entities. The nodes of the blockchain may validate the authentic communication record, such as by ensuring the digital signature of the authentic communication record against a key associated with cryptographic key associated with apparatus 200. In some embodiments, apparatus 200 is a node of the blockchain and may participate in this validation process. In some embodiments, apparatus 200 may be a node on the blockchain and may be configured with permissions to write to the blockchain (e.g., authentic communication storage repository 120). Alternatively, apparatus 200 may not be a node on the blockchain and instead may use a different computing device, such as any one of agent devices 108A-108N to record the authentic communication record to the blockchain.

Once an authentic communication record is verified, it may be input into mempool with other authentic communication records. The authentic communication record may remain in the mempool until a particular node (e.g., a miner or validator node) selects the authentic communication record to include in a next block of the blockchain. In some embodiments, apparatus 200 is a miner node or a validator node and may use the communication analysis circuitry 208 to select the authentic communication record to include in a next block of the blockchain. Thus, the authentic communication record may be included in a block of the blockchain (e.g., authentic communication storage repository 120).

Figure 24:
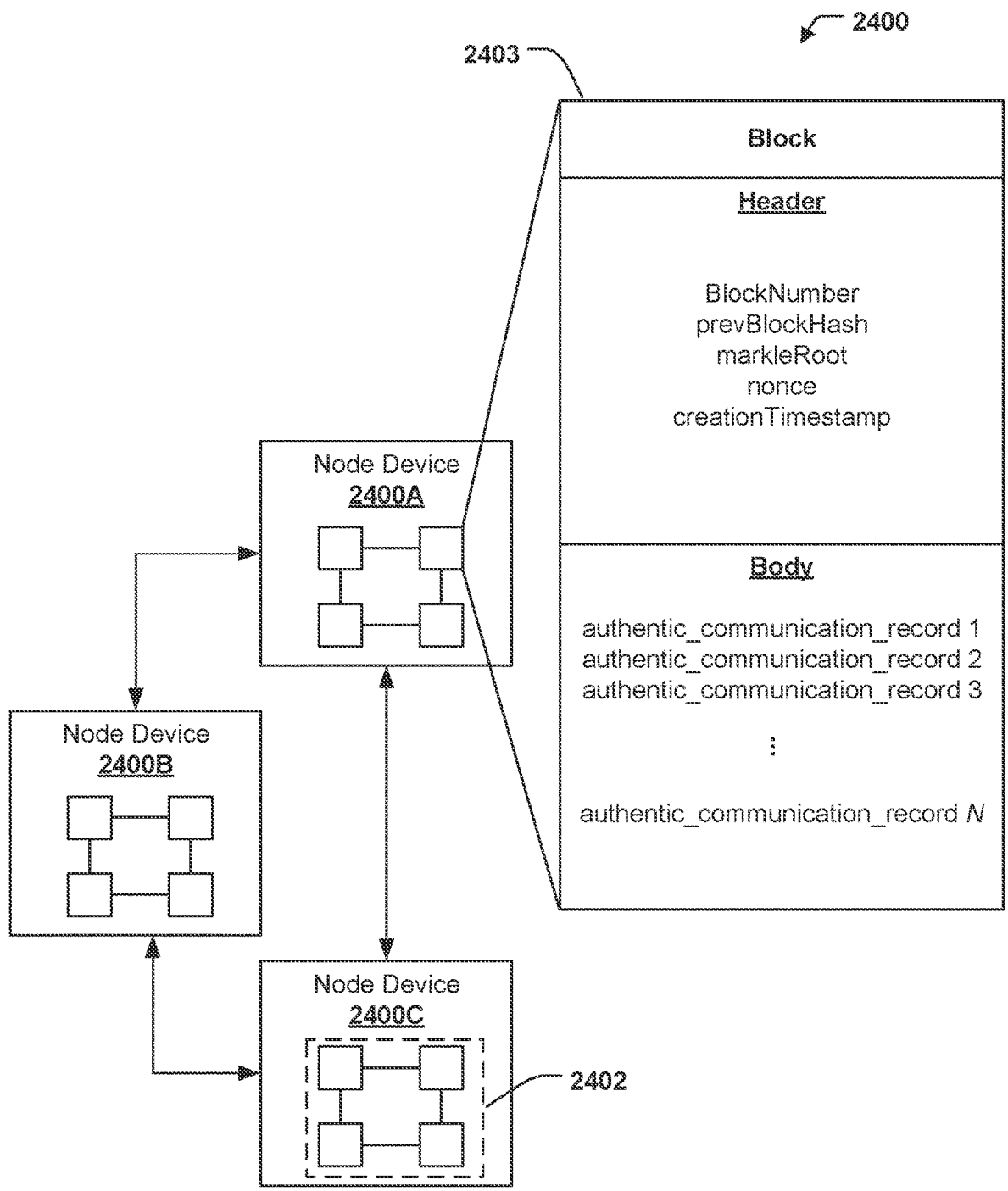
FIG. 24 illustrates an example architecture of authentic communication storage repository implemented as a blockchain, in accordance with some example embodiments described herein.

FIG. 24 illustrates an example architecture of authentic communication storage repository 120 as a blockchain network. As shown in FIG. 24, the blockchain network 2400 includes node device 2400A, node device 2400B, and node device 2400C, which are each in communication with one another. The number of node devices in the illustrated in FIG. 24 is merely an example, and is not intended to limit the embodiments of the present disclosure. The node devices 2400A-2400C may be interconnected and/or grouped into a blockchain 2402. The blockchain 2402 is provided as a distributed ledger that may be managed by the peer-to-peer network, where the node devices 2400A-2400C collectively adhere to a protocol to communicate and validate new blocks and record authentic communication records therein.

The blocks 2403 of the blockchain 2402 are linked together, in part, using cryptography. Each block 2403 contains a cryptographic hash of the previous block, a timestamp, and authentic communication record data. As each block contains information about the block previous to it, they form a chain, with each additional block reinforcing the ones before it. Therefore, blockchains 2402 are resistant to modification of their data because once recorded, the data in any given block cannot be altered retroactively without altering all subsequent blocks.

In some embodiments, a block 2403 of the blockchain 2402 may include the authentic communication record. In some embodiments, each of authentic communication records of block 2403 may be hashed, and combinations of authentic communication records may be further hashed, in a merkle tree. The use of a merkle tree allows for the presence of an individual authentic communication record in the merkle to be identified from a single merkle root hash for the block 2403. By analyzing the merkle root hash for a given block 2403, a particular authentic communication record may be identified.

Optionally, as shown by operation 312, the apparatus 200 includes means, such as processor 202, memory 204, communication analysis circuitry 208, or the like, for determining a user associated with the authentic communication. In some embodiments, the communication analysis circuitry 208 may further be configured to store the authentic communication in the original authentic communication storage repository as associated with a user account corresponding to the recipient user. This may enable a user to be provided with a communication history response, as described in further detail in FIG. 9. Thus, in some embodiments, the communication analysis circuitry 208 may be configured to determine the user associated with the authentic communication and further, identify a user account associated with the user. In some embodiments, the communication analysis circuitry 208 may be configured to identify a user identifier included in the received authentic communication or as determined as an authentic communication feature value. The communication analysis circuitry 208 may then use this user identifier to identify a user account included in a user account repository.

A user account may be associated with the user identifier such that a user account associated with the user may be identified by querying for user accounts which include the user identifier. A user account may be associated with the user and may contain user information (e.g., name, email, phone number, address, and/or the like) as well as user account information. By way of particular example, apparatus 200 may be associated with a financial institution where a user may have one or more user accounts (e.g., checking, savings, loans, and/or the like). Thus, a user account may be associated with an account balance, transaction record, and/or the like. Additionally, a user account may be associated with user credentials (e.g., username, password, personal identification number (PIN), biometric, and/or the like) that may be provided by a user to access his/her corresponding user account.

Optionally, as shown by operation 314, the apparatus 200 includes means, such as processor 202, memory 204, cryptographic circuitry 212, or the like, for encrypting the authentic communication using a cryptographic algorithm. The cryptographic circuitry 212 may be configured to use any suitable cryptographic technique to encrypt the authentic communication, as described in operation 308. The cryptographic circuitry 212 may also encrypt the authentic communication metadata included with the authentic communication.

In some embodiments, the original authentic communication storage repository 130 is a component of apparatus 200. As such, the cryptographic circuitry 212 may be configured to perform a local encryption using a cryptographic key. Alternatively, the authentic communication storage repository 120 is distinct from apparatus 200. In some embodiments, the cryptographic circuitry 212 may be configured to use a RNG algorithm, a PRNG algorithm that is certified by particular industry standards (e.g., FIPS publication 140, such as FIPS 140-1, 140-2, or 140-3), a KDF, PSKs, HSM, and/or the like to generate a cryptographic key. In some embodiments, the cryptographic key is a symmetric cryptographic key that may be used to both encrypt and decrypt the authentic communication record using an an appropriate symmetric encryption algorithm (e.g., an AES algorithm, a DES algorithm, a Blowfish algorithm, or a Rivest Cipher algorithm, such as RC4, RC5, or RC6). Alternatively, the cryptographic key is an asymmetric key that may include a private key and a public key, where the public key may be used to encrypt the authentic communication record and a private key may be used to decrypt the encrypted authentic communication record. The cryptographic circuitry 212 may maintain the cryptographic key in a secure location, such as within memory 204, or within a key management repository.

Optionally, as shown by operation 316, the apparatus 200 includes means, such as processor 202, memory 204, communications hardware 206, communication analysis circuitry 208, or the like, for storing the encrypted authentic communication in an original authentic communication storage repository 130. Once the communication analysis circuitry 208 encrypts the authentic communication, the communications hardware 206 may store the authentic communication in the original authentic communication storage repository 130. In some embodiments, the communications hardware 206 may store the authentic communication as associated with the user identifier determined to correspond to the user to whom the authentic communication pertains. This may cause the original authentic communication storage repository 130 to store the encrypted authentic communication as associated with the user identifier of the user. Thus, the original authentic communication storage repository 130 may be queried for a user identifier to identify all authentic communications which correspond to a particular user.

In some embodiments, the communication analysis circuitry 208 may format the authentic communication for storage in the original authentic communication storage repository 130. For example, in some embodiments, the original authentic communication storage repository 130 may be a relational database, a NoSQL database, a new SQL database, an in-memory database, an object oriented database, a graph database, a time-series database, a data lake and/or the like. The communication analysis circuitry 208 may format the authentic communication as required by the original authentic communication storage repository 130. For example, the communication analysis circuitry 208 may format the authentic communication as a table, with each row and/or column corresponding to a particular communication feature type as defined within the authentic communication storage repository 130 in an instance the original authentic communication storage repository 130 is a relational database. Additionally, or alternatively, the communication analysis circuitry 208 may format the authentic communication as an object in an instance the original authentic communication storage repository 130 is an object oriented database. However, the original authentic communication storage repository 130 may alternatively be equipped to handle any authentic communication format such that the communication analysis circuitry 208 may store the encrypted authentic communication as is and associate the encrypted authentic communication with the user identifier within original authentic communication storage repository 130.

Verifying a Candidate Communication for a User

Turning now to FIGS. 5-8, example operations are shown for providing a communication verification response to a user device. In particular, a user may provide apparatus 200 with a candidate communication he/she received that is alleged to originate from a particular source, such as the institution that operates apparatus 200 or another third-party institution associated with apparatus 200. However, the user may wish to verify that the received candidate communication did originate from the source and thus, may provide a communication verification request to apparatus 200. In turn, apparatus 200 may be configured to verify whether the candidate communication is authentic (e.g., originated from the alleged source) or whether the candidate communication is fraudulent (e.g., originated from a source other than the alleged source). In this way, a user may be provided with an indication of whether the communication he/she received is authentic or fraudulent and therefore, whether the communication can be trusted. This may allow the user to avoid scams, such as phishing attempts, various impersonation scams, investment scams, banking scams, and/or the like as the user may verify the source of the candidate communication prior to taking further action with the candidate communication. Thus, implementations described herein enable improved user security by allowing the user to verify received communications in a manner that has not conventionally been available.

Figure 5:
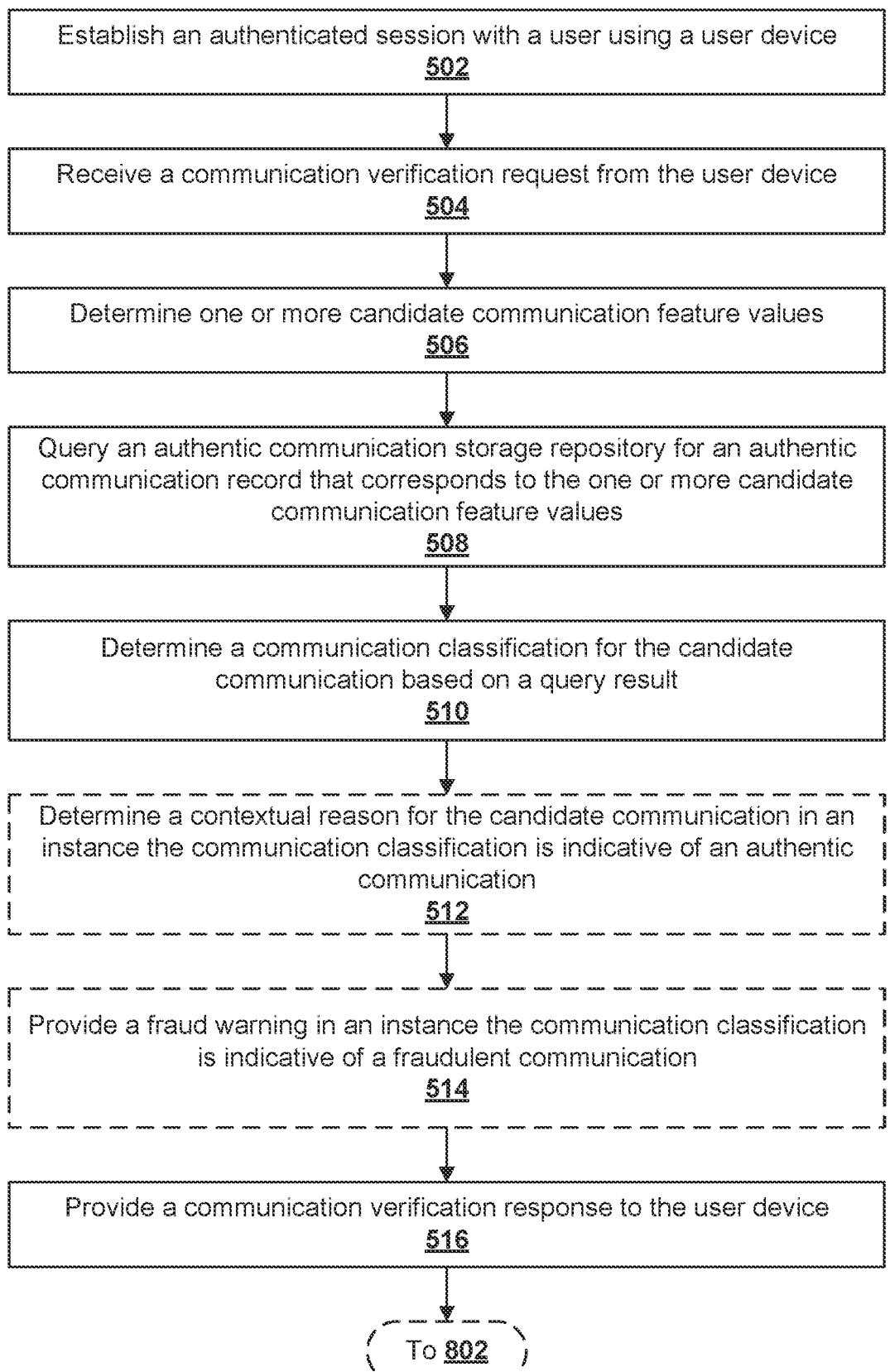
FIG. 5 illustrates an example flowchart for providing a communication verification response to a user device, in accordance with some example embodiments described herein.

Turning now to FIG. 5, example operations are shown for providing a communication verification response to a user device. As shown by operation 502, the apparatus 200 includes means, such as processor 202, memory 204, communications hardware 206, or the like, for establishing an authenticated session with a user using a user device. In some embodiments, the communications hardware 206 may receive a logon request from a user device (e.g., any one of user devices 106A-106N), such as in an instance when a user attempts to access an associated user account within a mobile application. The logon request may include candidate user credentials for the user. The communication analysis circuitry 208 may attempt to authenticate the provided candidate user credentials using stored user credentials from a user account associated with the user. In an instance in which the communication analysis circuitry 208 authenticates the provided user credentials, the communications hardware 206 may establish an authenticated session with the user using the user device (e.g., any one of user devices 106A-106N) and via a mobile application. In an instance in which the communication analysis circuitry 208 fails to authenticate the provided user credentials, the communications hardware 206 may reject an establishing an authenticated session with the user using the user device (e.g., any one of user devices 106A-106N) and may require the user to provide a new logon request that includes updated user credentials.

In some embodiments, the user may be a user who is associated with a user account maintained by the communication verification system 102 (e.g., a customer). The user may also be associated with a user account that may be stored and maintained in an associated memory (e.g., memory 204 or another data repository). The user account may further be associated with a user identifier (e.g., a username, email, customer number, and/or the like) and user credentials (e.g., a password, biometric data, personal identification number, and/or the like). The communication analysis circuitry 208 may identify a particular user using the user identifier and authenticate the user based on the associated user credentials. In some embodiments, the user account may be associated with authentic communications and/or authentic communication records as described above with respect to FIGS. 3-4.

In some embodiments, the logon request may be received from a user device (e.g., any one of user devices 106A-106N) and via a mobile application using a HTTP or HTTPS protocol. In some embodiments, the logon request may be a request to access a user account within the mobile application. The logon request may include a candidate user identifier (e.g., a username, email, customer number, and/or the like) and candidate user credentials (e.g., a password, biometric data, personal identification number, and/or the like). Furthermore, the logon request may be indicative of the user device (e.g., any one of user devices 106A-106N), such as by including a user device identifier (e.g., a IMEI, a MAC address, a UDID, an electronic serial number, a MEID, a UUID, a hardware identifier, an IP address, and/or the like), a universally unique identifier (UUID), a hardware identifier, an internet protocol (IP) address, and/or the like). The communication analysis circuitry 208 may authenticate the logon request based on the received candidate user credentials and stored user credentials associated with the user account and may determine whether the received candidate user credentials match stored user credentials. In an instance the received candidate user credentials match stored user credentials, the user may be authenticated and the communications hardware 206 may provide a response (e.g., an HTTP response) that includes user account data for the user account to the mobile application running on the user device (e.g., any one of user devices 106A-106N). In some embodiment, the communications hardware 206 may use specific APIs, such as RESTful APIs or WebSocket APIs to provide the user account data to the mobile application.

Once the user account data is provided to the mobile application running on the user device (e.g., any one of user devices 106A-106N), the authenticated session may be successfully established. The authenticated sessions may continue until a termination event occurs. A termination event may be the user logging out of the session. Alternatively, the termination event may be a timeout event, where the mobile application running on the user device (e.g., any one of user devices 106A-106N) experiences a period of inactivity for a length of time that exceeds an inactivity time threshold (e.g., 10 minutes). In an instance a termination event occurs, the user may be required to provide another logon request to establish a new authenticated sessions or re-establish the authenticated session.

As shown by operation 504, the apparatus 200 includes means, such as processor 202, memory 204, communications hardware 206, or the like, for receiving a communication verification request from the user device. Once the authenticated session is established with the user using the user device (e.g., any one of user devices 106A-106N), the communications hardware 206 may receive a communication verification request from the user device. The communication verification request may be indicative of a request to determine a communication classification for a candidate communication included in the communication verification request.

The communication verification request may include a candidate communication. The candidate communication may be a communication of interest that the user wishes to have analyzed by apparatus 200. The candidate communication may be received in any suitable format. The particular format of the candidate communication may depend on the communication channel type the candidate communication corresponds to. As described above, a communication channel type may be indicative of the communication channel by which the candidate communication was received. For example, a communication channel type may include an email communication channel type, a SMS message (e.g., a text message) communication channel type, a phone call communication channel type, a paper mailing communication channel type, and a miscellaneous communication channel type. A candidate communication may be formatted using a text file (e.g., a plaintext file, a comma-separated value file, an EML file), a portable document format (e.g., a PDF), an image format (e.g., a joint photographic experts group (JPG/JPEG), portable network graphics (PNG), tag image file format (TIFF), etc.), and/or the like. In some embodiments, the user may grant the mobile application access to another mobile application where the candidate communication was received such that the original format of the candidate communication may be preserved. In some embodiments, such as for candidate communications corresponding to paper mailings communication channel types, the candidate communication may be captured by the user device (e.g., via use of an associated camera).

In some embodiments, the received candidate communication may further include an indication of a candidate entity identity associated with the candidate communication. The candidate entity identity may be the entity which the candidate communication alleges to be associated with. However, this candidate entity identity for the candidate communication may or may not be the entity which provided the candidate communication. For example, the candidate communication that is associated with an email communication channel type and may include a mention of "institution ABC" in the body of the email. However, the email may actually be provided by a different entity attempting to impersonate institution ABC. In some embodiments, the received candidate communication may provide an indication of the candidate entity identity that the candidate communication is allegedly associated with. This indication of candidate entity identity may be input by the user or may be determined in subsequent steps.

In some embodiments, the received candidate communication may further include an indication of a user identity associated with the candidate communication. The recipient entity identity may be the user identifier associated with the user account that established the authenticated session.

The candidate communication may also include candidate communication metadata. The candidate communication metadata may be indicative of associated metadata for the communication, if available. The candidate communication metadata may be obtained by the mobile application executing on the user device by accessing the candidate communication through the native mobile application associated with the candidate communication. In some embodiments, the candidate communication metadata may include a sent timestamp and sent date that describes the time the candidate communication was received and the date the communication received. In some embodiments, the candidate communication metadata is further indicative of a sender identity and a recipient identity.

The particular type of metadata included in the candidate communication may depend on the communication channel type associated with the candidate communication. For example, a candidate communication associated with an email communication channel type may include candidate communication metadata indicative of a sender identity (e.g., an agent email address), a recipient identity (e.g., a user email address), a communication subject, a sent timestamp, and a sent date. As another example, a candidate communication associated with a SMS message communication channel type may include candidate communication metadata indicative of a sender identity (e.g., an agent device phone number), a recipient identity (e.g., a user device phone number), a sent timestamp, and a sent date. As another example, a candidate communication associated with a phone call communication channel type may include candidate communication metadata indicative of a caller identity (e.g., an agent device phone number), a recipient identity (e.g., a user device phone number), a call duration, a call timestamp, and a call date.

As shown by operation 506, the apparatus 200 includes means, such as processor 202, memory 204, communication analysis circuitry 208, or the like, for determining one or more candidate communication feature values. The communication analysis circuitry 208 may be configured to process the received candidate communication to determine one or more candidate communication feature values that each correspond to a communication feature type. A candidate communication feature value may be used to help identify an authentic communication that corresponds to the candidate communication, should such an authentic communication exist. These one or more candidate communication feature values may be used by the communication analysis circuitry 208 when querying the authentic communication storage repository 120 for an indication of an authentic communication. In some embodiments, operation 506 may be performed substantially similarly to operation 306 of FIG. 3.

In some embodiments, the communication analysis circuitry 208 may be configured to use a transformation model to determine the one or more candidate communication feature values. As described above in operation 306 of FIG. 3, the transformation model may be a rules-based model or a machine learning model (e.g., a neural network). The transformation model may also be configured to analyze the candidate communication with the candidate communication metadata and determine one or more candidate communication feature values for one or more communication feature types of interest. In some embodiments, the transformation model may use candidate communication feature template to determine the communication feature types that require communication feature values for the candidate communication. The candidate communication feature template may be substantially similar to the communication feature template but may require fewer communication feature types for a candidate communication as compared to an authentic communication. By way of example, the candidate communication feature template may not require a contextual reason communication feature type but the communication feature template may require this. Additionally, in some embodiments, the candidate communication feature template may describe a process for determining transforming an intermediate communication feature value into a communication feature value for a communication feature type. That is, the candidate communication feature template may describe an algorithm to use to transform an intermediate communication feature value into a candidate communication feature value of a particular structure.

In some embodiments, as described above, at least a portion of the candidate communication may be structured data such that the transformation model may be configured to analyze a particular field within the structured candidate communication and/or candidate communication metadata to determine an intermediate candidate communication feature value for a communication feature type. For example, a candidate communication associated with an email communication channel type may include candidate communication metadata that is structured with various data fields (e.g., "to", "from", "subject", or the like) and the communication analysis circuitry 208 may be configured to identify intermediate communication feature values based on these structured data fields.

In some embodiments, the candidate communication may also include unstructured data such that additional processing is required. For example, a candidate communication associated with a paper mailing communication channel type may include an image of the paper mailing. However, the candidate communication may also include candidate communication metadata that is structured data. In some embodiments, the communication analysis circuitry 208 may be configured to additionally use a feature extraction model to extract one or more intermediate candidate communication feature values for a communication feature type of interest from the unstructured data. As described above in operation 306 of FIG. 3, the feature extraction model may be a machine learning model, such as a CNN, may be trained to analyze unstructured data and may process the image to determine intermediate candidate communication feature values for a communication feature type of interest. In some embodiments, the feature extraction model may be configured to use image processing techniques, such as OCR, NLP techniques, or other processing techniques to aid in image processing. The feature extraction model may output the intermediate candidate communication feature values and an indication of the corresponding communication feature types to the transformation model.

Once the transformation model has identified an intermediate candidate communication feature value for each communication feature type described by the candidate communication feature template, the transformation model may determine the candidate communication feature value for the communication feature. In some embodiments, the candidate communication feature template may describe for the transformation model to transform the intermediate candidate communication feature value using a hashing algorithm. Thus, the candidate communication feature value may be a hashed value of the intermediate candidate communication feature value. Alternatively, the transformation model may be configured to use other techniques such as one-hot encoding, label encoding, binary encoding, and/or the like. In some embodiments, the transformation model may use a tokenization algorithm to analyze an intermediate candidate communication feature value and may apply parsing and/or rules to generate a candidate communication feature value. In some embodiments, one or more communication feature types may require a different hashing algorithm. The hashing algorithms may be stored in an accessible memory, such as memory 204 or another storage repository, such that the communication analysis circuitry 208 and the transformation model may access and use the hashing algorithms described by the candidate communication feature template. Thus, each candidate communication feature value may be generated in accordance with a particular structure and format for the communication feature type.

Figure 6:
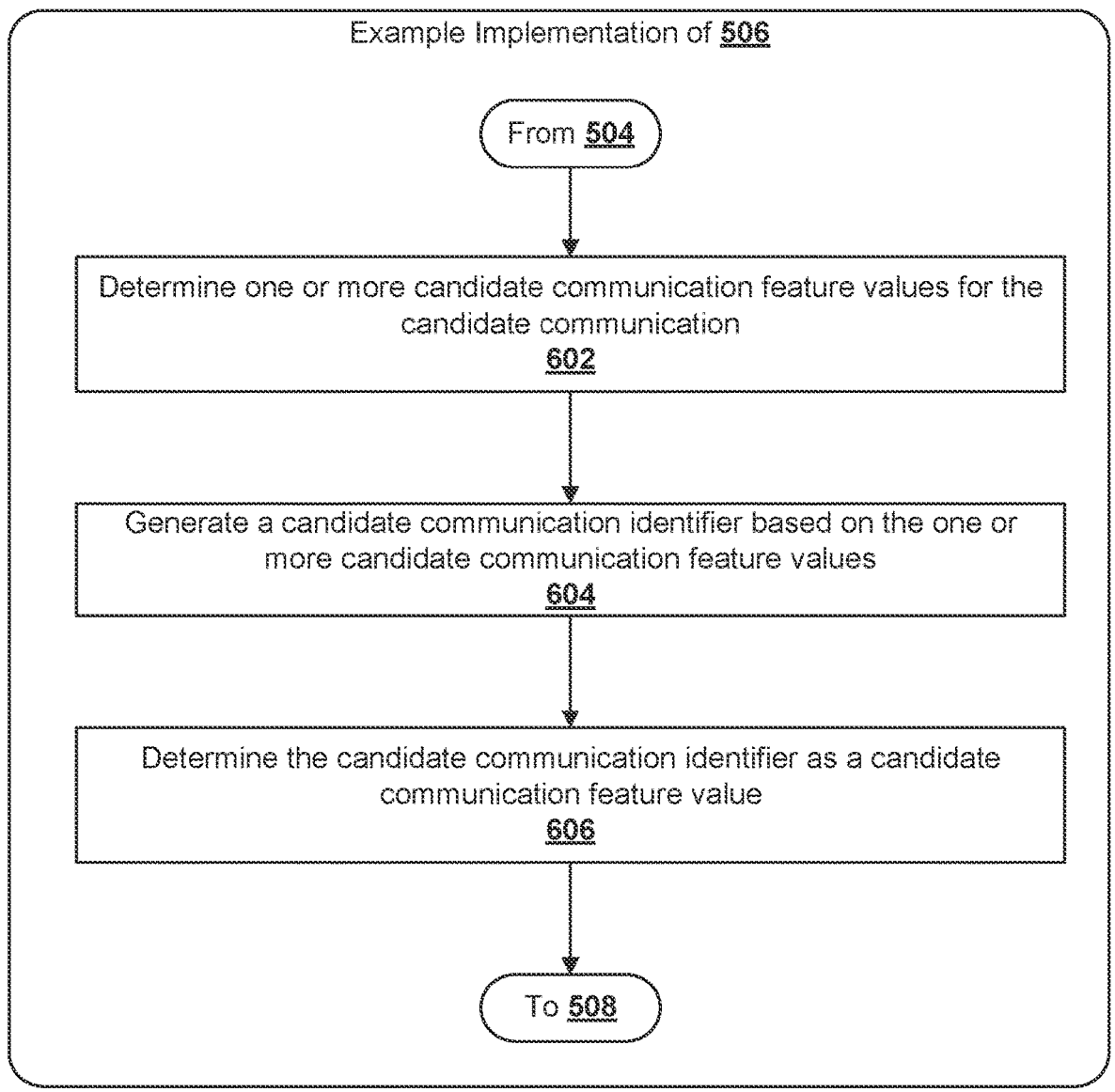
FIG. 6 illustrates an example flowchart for determining a candidate communication feature for the candidate communication, in accordance with some example embodiments described herein.

In some embodiments, operation 506 may be performed in accordance with the operations described by FIG. 6.

Turning now to FIG. 6, example operations are shown for determining a candidate communication feature for the candidate communication.

As shown by operation 602, the apparatus 200 includes means, such as processor 202, memory 204, communication analysis circuitry 208, or the like, for determining one or more feature values for the candidate communication. As described above in operation 506, the communication analysis circuitry 208 may be configured to determine one or more candidate communication feature values that each correspond to a communication feature type. These candidate communication feature values may be hashed values of an intermediate candidate communication feature value. Alternatively, some candidate communication feature values may be tokenized and parsed representations of an intermediate candidate communication feature value.

As shown by operation 604, the apparatus 200 includes means, such as processor 202, memory 204, communication analysis circuitry 208, or the like, for generating a candidate communication identifier based on the one or more candidate communication feature values. Once the communication analysis circuitry 208 determines the candidate communication feature values for the candidate communication, the communication analysis circuitry 208 may generate a candidate communication identifier. The candidate communication identifier may be a sequence of characters (e.g., alphabetical characters, numerical characters, or special characters) that may uniquely identify the candidate communication. In an instance the candidate communication is an authentic communication, at least a portion of the candidate communication identifier may match an authentic communication identifier. Thus, the candidate communication identifier may be used to query the authentic communication storage repository 120 for an authentic communication record.

In some embodiments, the characters of the candidate communication identifier may correspond to a particular defined structure. In some embodiments, one or more characters included in the candidate communication identifier may correspond to a communication identification group. Each communication identification group may be associated with a particular communication feature type. Additionally, a communication identification group may be associated with one or more predefined character positions within the candidate communication identifier.

In some embodiments, the communication analysis circuitry 208 may be configured to use the identification generation model to generate the candidate communication identifier. As described in operation 404 of FIG. 4, the identification generation model may be a rules-based model or a machine learning. The identification generation model may further be configured to receive the one or more candidate communication feature values and generate the candidate communication identifier. The identification generation model may be configured with a communication identifier template for a communication channel type. The communication identifier template may be indicative of the defined structure for the candidate communication identifier. In particular, the communication identifier template may describe a total number of characters for the candidate communication identifier, a minimum number of characters, and/or a maximum number of characters and further, may describe character positions associated with each communication identification group and one or more static characters. The identification generation model may use the communication identifier template to determine a structure for the candidate communication identifier. Additionally, the identification generation model may determine the character values for the characters of a particular communication identification group based on candidate communication feature values associated with a corresponding communication feature type. The identification generation model may input the candidate communication feature values corresponding to a communication feature type as characters values for the corresponding communication identification group and may additionally input any static characters (e.g., characters that remain unchanged in the candidate communication identifier) to generate the candidate communication identifier. In some embodiments, because the identification generation model may be used to generate both candidate communication identifiers and authentic communication identifiers, the identification generation model may be configured to ignore communication identification groups that are not associated with candidate communication feature values for a corresponding candidate communication feature type. By way of example, the identification generation model may ignore a communication identification group corresponding to a contextual reason communication feature type for a candidate communication. That is, the identification generation model may not generate characters for this communication identification group and/or may not generate associated static characters associated with the communication identification group. The identification generation model may then output the candidate communication generation identifier to the communication analysis circuitry 208.

Figure 23B:
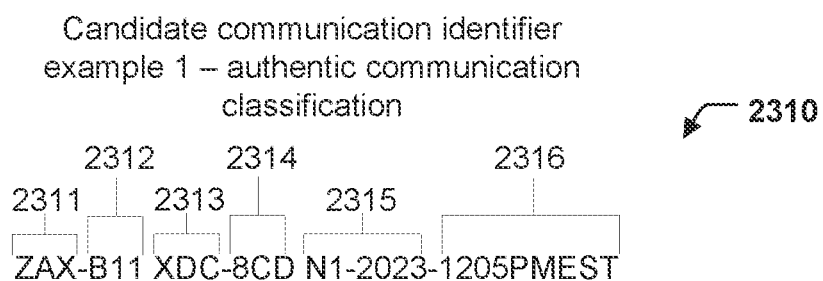
FIGS. 23B-23C each illustrate an example structure of a candidate communication identifier as used in some example embodiments described herein.

FIG. 23B depicts a first example candidate communication identifier 2310. In this example, the candidate communication may be an authentic communication that corresponds to the authentic communication described in FIG. 23A. The communication analysis circuitry 208 may use an identification generation model to generate the candidate communication identifier 2310. An example candidate communication may be received from user device 106A and may be associated with an email communication channel type. The communication analysis circuitry 208 may use the transformation model to generate the one or more candidate communication feature values for the candidate communication and then use the identification generation model to determine the candidate communication identifier for the candidate communication.

In particular, the transformation model may determine a received candidate communication is associated with an email communication channel and may identify a candidate communication feature template that is associated with an email communication channel type to provide the communication feature types of interest. The transformation model may analyze the candidate communication feature template to determine if an email communication channel type requires candidate communication feature values for an entity identity communication feature type, a sender identity communication feature type, a user identity communication feature type, a recipient identity communication feature type, a sent date communication feature type, and a sent timestamp communication feature type.

The transformation model may then determine the one or more intermediate candidate communication feature values for each required communication feature type. The transformation model may process the received candidate communication that includes candidate communication metadata to determine intermediate candidate communication feature values of "entity 1" for an entity identity communication feature type, a value of "agent1@domain1.com" for a sender identity communication feature type, a value of "user 1" for a user identity communication feature type, a value of "user1@domain2.com" for a recipient identity communication feature type, a value of "Nov. 1, 2023" for a sent date communication feature type, and a value of "12:05 PM EST" for a sent timestamp communication feature type.

The transformation model may transform these intermediate candidate communication feature values into candidate communication feature values using various techniques as defined by the candidate communication feature template. For example, the transformation model may transform the intermediate candidate communication feature value of "entity 1" into "ZAX" for an entity identity communication feature type using a hashing algorithm XYZ, the value of "agent1@domain1.com" into "B11" for a sender identity communication feature type using the hashing algorithm ABC, the value of "user 1" into "XDC" for a user identity communication feature type using hashing algorithm XYZ, a value of "user1@domain2.com" into "8CD" for a recipient identity communication feature type using the hashing algorithm ABC, a value of "Nov. 1, 2023" into "N1-2023" for a sent date communication feature type using a tokenization algorithm and by applying transformation rules, and a value of "12:05 PM EST" into "1205PMEST" for a sent timestamp communication feature type using a tokenization algorithm and by applying transformation rule.

The transformation model may then output these candidate communication feature values with an indication of their corresponding communication feature type as input to the identification generation model. The identification generation model may then generate the candidate communication identifier 2310 using a communication identifier template which defines the structure of the candidate communication identifier. For example, the communication identifier template may define that the first 3 characters at character positions 0, 1, and 2 are associated with a communication identification group 2311 corresponding to the entity identity communication feature type. The communication identifier template may define a static character of a dash at character position 4. The communication identifier template may then define that the next 3 characters at character positions 5, 6, and 7 are associated with a communication identification group 2312 corresponding to the sender identity communication feature type. The communication identifier template may define a static character of a space at character position 5. The communication identifier template may define that the next 3 characters at character positions 6, 7, and 8 are associated with a communication identification group 2313 corresponding to the user identity communication feature type. The communication identifier template may define a static character of a dash at character position 9. The communication identifier template may then define that the next 3 characters at character positions 10, 11, and 12 are associated with a communication identification group 2314 corresponding to the recipient identity communication feature type. The communication identifier template may define a static character of a space at character position 13. The communication identifier template may define that the next 7 characters at character positions 14, 15, 16, 17, 18, 19, and 20 are associated with a communication identification group 2315 corresponding to the sent date communication feature type. The communication identifier template may define a static character of a dash at character position 21. The communication identifier template may define that the next 9 characters at character positions 22, 23, 24, 25, 26, 27, 28, 29, and 30 are associated with a communication identification group 2316 corresponding to the sent timestamp communication feature type. The communication identifier template may define a static character of a space at character position 31. The communication identifier may then define a static character of a left bracket at character position 32 and a static character of a right bracket at a last character position with an undefined number of characters for a contextual reason communication feature type defined within the left bracket and right bracket. However, because there is no candidate communication feature value for the contextual reason communication feature type, the identification generation model may not generate characters for these values, as shown depicted in FIG. 23B.

As shown in FIG. 23B, the candidate communication identifier 2310 includes a plurality of characters. The candidate communication identifier 2310 is structured as described above and a portion of the characters included in candidate communication identifier 2310 correspond to communication identification groups 2311-2316. Thus, the candidate communication identifier 2310 may uniquely represent the candidate communication. Each character in the candidate communication identifier in FIG. 23B matches a corresponding character at a particular character position for the authentic communication identifier depicted in FIG. 23A. Thus, as described in further detail below, the candidate communication is determined to be authentic and may be assigned an authentic communication classification.

Figure 23C:
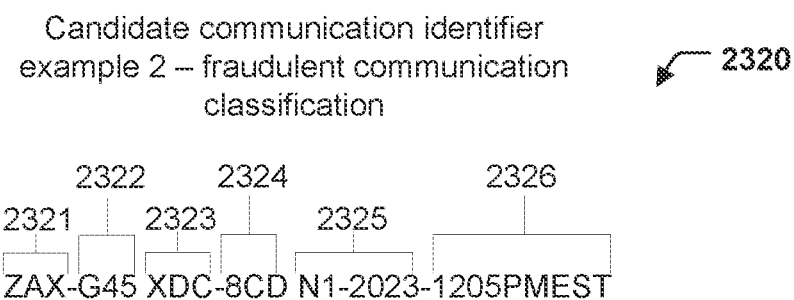

In contrast, FIG. 23C depicts a second example candidate communication identifier 2320. In this example, the candidate communication may be a fraudulent communication. The communication analysis circuitry 208 may use an identification generation model to generate the candidate communication identifier 2320. The example candidate communication may be received from user device 106A and may be associated with an email communication channel type. The communication analysis circuitry 208 may use the transformation model to generate the one or more candidate communication feature values for the candidate communication and then use the identification generation model to determine the candidate communication identifier for the candidate communication, as described in FIG. 23B.

However, FIG. 23C may differ from FIG. 23B because it is a fraudulent communication. For example, should the candidate communication of FIG. 23B be received from an email address a different email address that is not associated with the institution that manages apparatus 200, the candidate communication identifier 2320 may be generated.

In particular the transformation model may process the received candidate communication that includes candidate communication metadata to determine intermediate candidate communication feature values of "entity 1" for an entity identity communication feature type, a value of "fakeagent1@domain5.com" for a sender identity communication feature type, a value of "user 1" for a user identity communication feature type, a value of "user1@domain2.com" for a recipient identity communication feature type, a value of "Nov. 1, 2023" for a sent date communication feature type, and a value of "12:05 PM EST" for a sent timestamp communication feature type. Here, the sender identity communication feature value differs from the sender identity communication feature value of FIG. 23B.

The transformation model may transform these intermediate candidate communication feature values into candidate communication feature values using various techniques as defined by the candidate communication feature template. For example, the transformation model may transform the intermediate candidate communication feature value of "entity 1" into "ZAX" for an entity identity communication feature type using a hashing algorithm XYZ, the value of "fakeagent1@domain5.com" into "G45" for a sender identity communication feature type using the hashing algorithm ABC, the value of "user 1" into "XDC" for a user identity communication feature type using hashing algorithm XYZ, a value of "user1@domain2.com" into "8CD" for a recipient identity communication feature type using the hashing algorithm ABC, a value of "Nov. 1, 2023" into "N1-2023" for a sent date communication feature type using a tokenization algorithm and by applying transformation rules, and a value of "12:05 PM EST" into "1205PMEST" for a sent timestamp communication feature type using a tokenization algorithm and by applying transformation rule.

The transformation model may then output these candidate communication feature values with an indication of their corresponding communication feature type as input to the identification generation model. The identification generation model may then generate the candidate communication identifier 2320 using a communication identifier template which defines the structure of the candidate communication identifier. For example, the communication identifier template may define that the first 3 characters at character positions 0, 1, and 2 are associated with a communication identification group 2321 corresponding to the entity identity communication feature type. The communication identifier template may define a static character of a dash at character position 4. The communication identifier template may then define that the next 3 characters at character positions 5, 6, and 7 are associated with a communication identification group 2322 corresponding to the sender identity communication feature type. The communication identifier template may define a static character of a space at character position 5. The communication identifier template may define that the next 3 characters at character positions 6, 7, and 8 are associated with a communication identification group 2323 corresponding to the user identity communication feature type. The communication identifier template may define a static character of a dash at character position 9. The communication identifier template may then define that the next 3 characters at character positions 10, 11, and 12 are associated with a communication identification group 2324 corresponding to the recipient identity communication feature type. The communication identifier template may define a static character of a space at character position 13. The communication identifier template may define that the next 7 characters at character positions 14, 15, 16, 17, 18, 19, and 20 are associated with a communication identification group 2325 corresponding to the sent date communication feature type. The communication identifier template may define a static character of a dash at character position 21. The communication identifier template may define that the next 9 characters at character positions 22, 23, 24, 25, 26, 27, 28, 29, and 30 are associated with a communication identification group 2326 corresponding to the sent timestamp communication feature type. The communication identifier template may define a static character of a space at character position 31. The communication identifier may then define a static character of a left bracket at character position 32 and a static character of a right bracket at a last character position with an undefined number of characters for a contextual reason communication feature type defined within the left bracket and right bracket. However, because there is no candidate communication feature value for the contextual reason communication feature type, the identification generation model may not generate characters for these values, as shown depicted in FIG. 23C.

As shown in FIG. 23C, the candidate communication identifier 2310 includes a plurality of characters. Here, characters corresponding to communication identification group 2322 fail to match a characters in a corresponding communication identification group 2303 of the authentic communication identifier depicted in FIG. 23A. Additionally, the characters of candidate communication identifier 2320 may fail to exactly match each character for all authentic communication identifiers. Thus, as described in further detail below, the candidate communication is determined to be fraudulent and may be assigned a fraudulent communication classification.

Returning now to FIG. 6, as shown by operation 606, the apparatus 200 includes means, such as processor 202, memory 204, communication analysis circuitry 208, or the like, for determining the candidate communication identifier as a candidate communication feature value. Once the communication analysis circuitry 208 determines the candidate communication identifier, the communication analysis circuitry 208 may determine the candidate communication identifier as a candidate communication feature value for a candidate communication identifier communication feature type. In some embodiments, the communication analysis circuitry 208 may discard other candidate communication feature values that do not correspond to the candidate communication identifier communication feature type as the candidate communication identifier includes an indication of these candidate communication feature values.

Returning now to FIG. 5, as shown by operation 508, the apparatus 200 includes means, such as processor 202, memory 204, communications hardware 206, communication analysis circuitry 208, or the like, for querying an authentic communication storage repository for an authentic communication record that corresponds to the one or more candidate communication features. In some embodiments, the communication analysis circuitry 208 may query the authentic communication storage repository 120 using the candidate communication identifier. In some embodiments, the communication analysis circuitry 208 may include other communication feature values in addition to the candidate communication identifier.

As described above, in some embodiments, authentic communication storage repository 120 is a storage repository, such as a database, that is configured to store authentic communication records. The communication analysis circuitry 208 may thus perform a search query using the candidate communication identifier and/or one or more other candidate communication feature values in the authentic communication storage repository. In an instance the authentic communication storage repository 120 is a component of apparatus 200, the communications hardware 206 may directly access the authentic communication storage repository 120 and perform the query. Alternatively, if the authentic communication storage repository 120 is not a component of apparatus 200, the communications hardware 206 may be configured to provide the query to a database management system (DBMS) associated with the authentic communication storage repository 120.

Alternatively, in some embodiments, the authentic communication storage repository 120 corresponds to a DLT infrastructure, such as a blockchain. In such an instance, the communications hardware 206 may be configured to query the blockchain for an authentic communication record that corresponds to the candidate communication identifier and/or one or more other candidate communication feature values. In some embodiments, the communications hardware 206 may indirectly query the blockchain, such as by using a blockchain explorer application or using a blockchain API to perform the query. Alternatively, the communications hardware 206 may query the blockchain directly.

Regardless of whether the authentic communication storage repository 120 is a blockchain or a database, the communications hardware 206 may be configured to receive query results that are returned from the query. The query results may be indicative of whether a match was found within the authentic communication storage repository 120. The query results may be indicative of a location of a match if one is found. Additionally, the query results may include the authentic communication record determined to correspond to the one or more candidate communication feature values, including the candidate communication identifier.

In some embodiments, a match may include authentic communication record that includes an authentic communication identifier with characters that exactly match the candidate communication identifier provided in the query. The authentic communication identifier may include additional characters (e.g., an authentic communication feature value for a contextual reason communication feature type), which may be ignored during the query. Instead, the query may focus on characters of the candidate communication identifier.

As shown by operation 510, the apparatus 200 includes means, such as processor 202, memory 204, communication analysis circuitry 208, or the like, for determining a communication classification for the candidate communication based on a query result. Once the communication analysis circuitry 208 receives the results of the query, the communication analysis circuitry 208 may determine a communication classification for the candidate communication. In particular, in an instance a corresponding authentic communication record is indicated in the query results (e.g., indicative that a match was found, indicative of the location of a match, and/or the authentic communication record itself), the communication analysis circuitry 208 may be configured to determine an authentic communication classification for the candidate communication. An authentic communication classification may be indicative that the candidate communication is authentic and did originate from the alleged source.

Alternatively, in an instance no authentic communication record is indicated in the query results (e.g., no match was found), the communication analysis circuitry 208 may be configured to determine a fraudulent communication classification for the candidate communication. A fraudulent communication classification may be indicative that the candidate communication is not authentic and did not originate from the alleged source. Thus, the candidate communication may be unsafe to interact with and may further, be a communication associated with a scam or other fraudulent communication.

In some embodiments, in an instance a corresponding authentic communication record is indicated in the query results (e.g., indicative that a match was found, indicative of the location of a match, and/or the authentic communication record itself), the communication analysis circuitry 208 may be configured to determine whether the authentic communication is associated with a user interaction element (e.g., a QR code). In such an instance, the communication analysis circuitry 208 may be configured to use a security testing model to determine whether the user interaction element included in a candidate communication matches the user interaction element included in the authentic communication. In some embodiments, the communication analysis circuitry 208 may need to retrieve and decrypt an authentic communication corresponding to the authentic communication record from original authentic communication storage repository 130, similar to operations 906-908 of FIG. 9. The security testing model may be a machine learning model, such as a CNN, or a rules based model that may be configured to compare the user interaction elements included in a candidate communication and an authentic communication. In an instance the user interaction elements exactly match, the security testing model may determine the user interaction element of the candidate communication is authentic. In an instance the user interaction elements fail to match, the security testing model may determine the user interaction element of the candidate communication is fraudulent.

Alternatively, the security testing model may be configured to preview associated information encoded in the user interaction element for the candidate communication and the authentic communication. For example, the security testing model may be configured to preview a uniform resource locator encoded in the user interaction element for the candidate communication and the authentic communication. In an instance the encoded information exactly matches, the security testing model may determine the user interaction element of the candidate communication is authentic. In an instance the encoded information fails to match, the security testing model may determine the user interaction element of the candidate communication is fraudulent.

Once the communication analysis circuitry 208 determines whether the user interaction element is authentic or fraudulent, the communication analysis circuitry 208 may determine and/or update a communication classification for the candidate communication that is indicative of whether the user interaction element is authentic or fraudulent.

Optionally, as shown by operation 512, the apparatus 200 includes means, such as processor 202, memory 204, communication analysis circuitry 208, or the like, for determining contextual reason for the candidate communication in an instance in which the communication classification is indicative of an authentic communication. In an instance in which the communication classification is indicative of an authentic communication, the candidate communication may be determined to match an authentic communication in an authentic communication record stored in the authentic communication storage repository 120. The result of the query may also provide the authentic communication record such that the communication analysis circuitry 208 may process the authentic communication record.

In some embodiments, the authentic communication record may be indicative of a contextual reason the authentic communication was provided. In some embodiments, the authentic communication record may include a communication feature value for a contextual reason communication feature type, which may be indicative of the contextual reason for the authentic communication. In some embodiments, the authentic communication record may include an authentic communication identifier that includes a communication identification group corresponding to a contextual reason communication feature type. Thus, the communication analysis circuitry 208 may determine an authentic communication feature value for a contextual reason communication feature type.

In some embodiments, the contextual reason communication feature type may be associated with predefined communication feature values. As such, the authentic communication feature value for the contextual reason communication feature type may correspond to a predefined communication feature value. These predefined communication feature values may correspond to the tokenized and transformed intermediate communication feature value. The communication analysis circuitry 208 may be configured to access an associated memory, such as memory 204 or another memory, storing a list of the predefined communication feature values. The predefined communication feature values may also each be associated with a contextual reason for the authentic communication. The communication analysis circuitry 208 may match the authentic communication feature value of the authentic communication to a predefined communication feature value to determine the contextual reason for the authentic communication. For example, the contextual reason may include an indication that the communications hardware 206 received a password reset request, communication analysis circuitry 208 determined a user eligibility notification, the communication analysis circuitry 208 determined a time-sensitive event, such as monthly account update, and/or the like.

For example, referring back to FIG. 23A, the authentic communication identifier 2300 may include a communication identification group 2307 that corresponds to a contextual reason communication feature type. Thus, the authentic communication feature value for the contextual reason communication feature type may be determined to be "PWDRT". The communication analysis circuitry 208 may use the predefined communication feature values to identify a communication feature value of "PWDRT" and an associated contextual reason of "received password reset request". Thus, the communication analysis circuitry 208 may determine the contextual reason for which the authentic communication was provided.

In some embodiments, the authentic communication record may include further contextual details regarding the authentic communication. For example, the authentic communication record may be indicative of where the password reset request was received from, a device identifier associated with the password reset request, a timestamp of when the request was received, etc. Thus, the communication analysis circuitry 208 may determine additional context details for the contextual reason.

Optionally, as shown by operation 514, the apparatus 200 includes means, such as processor 202, memory 204, communications hardware 206, communication analysis circuitry 208, or the like, for providing a fraud warning in an instance in which the communication classification is indicative of a fraudulent communication. In some embodiments, the fraud warning may include an indication of one or more of the one or more intermediate candidate communication feature values (e.g., non-hashed/non-tokenized candidate communication feature values) of the candidate communication. The fraud warning may be provided to one or more other users via an associated user device (e.g., any one of user devices 106A-106N) such that the other users may be made aware that a fraudulent communication was discovered and may be provided with an indication of what the fraudulent communication includes. For example, the fraud warning may include an indication of the sender identity (e.g., an email address or phone number), a communication subject, and/or the like as described by the candidate communication feature values of the candidate communication.

Additionally, in some embodiments, the fraud warning may be provided to one or more third-party entities using a third-party device (e.g., any one of third-party devices 112A-112N) that may be associated with a communication channel type corresponding to the communication channel type of the candidate communication. Thus, the third-party entity may take additional action to prevent the candidate communication from being further circulated to other users.

Figure 7:
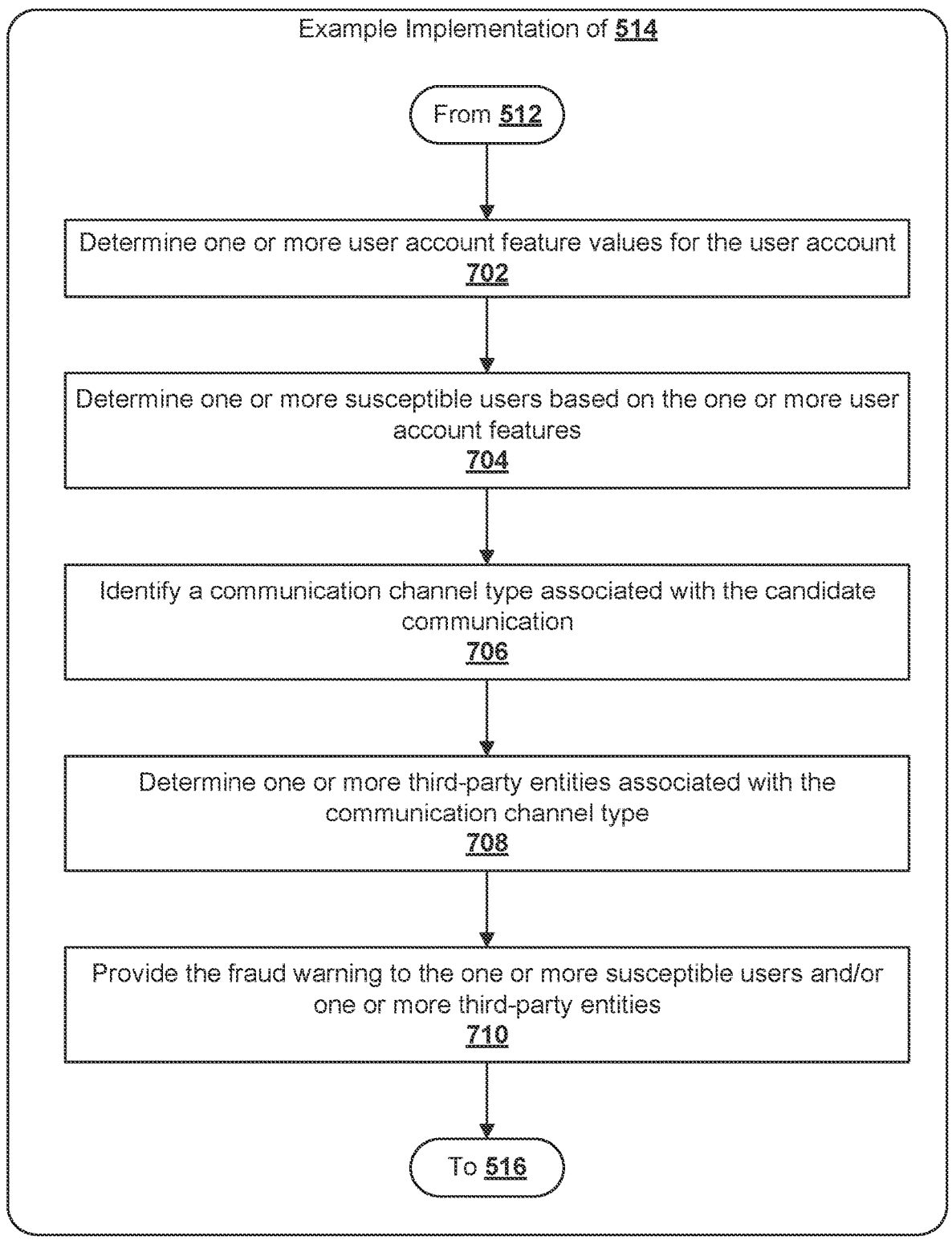
FIG. 7 illustrates an example flowchart for providing a fraud warning to one or more users and/or third-party entities, in accordance with some example embodiments described herein.

In some embodiments, operation 514 may be performed in accordance with the operations described by FIG. 7. Turning now to FIG. 7, example operations are shown for providing a fraud warning to one or more users and/or third-party entities.

As shown by operation 702, the apparatus 200 includes means, such as processor 202, memory 204, communication analysis circuitry 208, or the like, for determining one or more user account feature values for the user. As described above, a user account may be associated with the user and may contain user information (e.g., name, email, phone number, address, and/or the like). In some embodiments, the communication analysis circuitry 208 may be configured to determine values for one or more user account feature values for one or more user account features of interest. In some embodiments, the communication analysis circuitry 208 may be configured with a user feature template. The user feature template may be indicative of the user account features of interest for a given communication channel type. For example, the user feature template may be indicative that for a paper mailing communication channel type, the user account features of interest include a user address zip code, a user town address, and a user state address. Thus, the communication analysis circuitry 208 may be configured to determine a user account feature values for a user address zip code user account feature, a user town user account feature, and a user state address user account feature.

As shown by operation 704, the apparatus 200 includes means, such as processor 202, memory 204, communication analysis circuitry 208, or the like, for determining one or more susceptible users based on the one or more user account features. The communication analysis circuitry 208 may then determine one or more susceptible users that are associated with user account feature values that match the user account feature for a user. For example, the communication analysis circuitry 208 may determine susceptible users whose user account is associated with a user account feature value that matches a value for a user address zip code user account feature, a user town user account feature, and a user state address user account feature of the user determined in operation 704. These users may be determined to be susceptible to the candidate communication as they exhibit at least one common feature as the user who received the candidate communication. Thus, it may be beneficial to proactively warn susceptible users of possible candidate communications they may receive that are determined to be fraudulent.

As shown by operation 706, the apparatus 200 includes means, such as processor 202, memory 204, communication analysis circuitry 208, or the like, for identifying a communication channel type associated with the candidate communication. As described above, the communication analysis circuitry 208 may determine a communication channel type for the candidate communication. A communication channel type may be indicative of the communication channel a user device received the candidate communication from. In some embodiments, the communication analysis circuitry 208 may determine the communication channel type based on the communication feature types included in the candidate communication. The particular information included in a candidate communication may be indicative of the communication channel type associated with the candidate communication. Alternatively, the candidate communication may be formatted in a particular format that is indicative of the communication channel type.

As shown by operation 708, the apparatus 200 includes means, such as processor 202, memory 204, communication analysis circuitry 208, or the like, for determining one or more third-party entities associated with the communication channel type. In some embodiments, the communication analysis circuitry 208 may be configured to determine one or more third-party entities that are associated with the communication channel type. In some embodiments, the communication analysis circuitry 208 may be configured to access an entity repository, which may include entries for one or more third-party entities. Each entry for a particular third-party entity may further include one or more communication channel types associated with the third-party entity. For example, a third-party entity may offer an email service that allows users to send and receive emails and thus, the third-party entity may be associated with an email communication channel type. Additionally, each entry may further include an indication of one or more third-party devices (e.g., any one of third-party devices 112A-112N) that may be configured to send communications to and/or receive communications from communications hardware 206.

As shown by operation 710, the apparatus 200 includes means, such as processor 202, memory 204, communications hardware 206, communication analysis circuitry 208, or the like, for providing the fraud warning to one or more susceptible users and/or one or more third-party entities. The communications hardware 206 may provide the fraud warning to the one or more susceptible users via associated user devices (e.g., any one of user devices 106A-106N) described by an associated user account of the susceptible user. The fraud warning may include an indication of one or more of the one or more intermediate candidate communication feature values of the candidate communication. Thus, susceptible users may be made aware that a fraudulent communication was discovered and may be provided with an indication of what the fraudulent communication includes. For example, the fraud warning may include an indication of the sender identity (e.g., an email address or phone number), a communication subject, and/or the like as described by the candidate communication feature values of the candidate communication.

Additionally or alternatively, in some embodiments, the fraud warning may be provided to one or more third-party entities using a third-party device (e.g., any one of third-party devices 112A-112N) that may be associated with a communication channel type corresponding to the communication channel type of the candidate communication. Thus, the third-party entity may take additional action to prevent the candidate communication from being further circulated to other users.

Returning now to FIG. 5, as shown by operation 516, the apparatus 200 includes means, such as processor 202, memory 204, communications hardware 206, communication analysis circuitry 208, or the like, for providing a communication verification response to the user device. Once the communication analysis circuitry 208 has determined a communication classification for the candidate communication, the communication analysis circuitry 208 may generate a communication verification response for the user. The communication verification response may include the communication classification determined for the candidate communication. Thus, the user may be provided with an indication of whether the candidate communication is authentic or fraudulent. In some embodiments, in an instance in which the communication classification is indicative of an authentic communication, the communication verification response may further include the contextual reason for the candidate communication.

In some embodiments, the communication verification response may further include intermediate candidate communication feature values for the candidate communication and/or one or more intermediate authentic communication feature values for a corresponding authentic communication (if applicable). These intermediate communication feature values may be non-hashed/non-tokenized communication feature values such that a user may view additional details regarding the candidate communication and/or authentic communication.

Figure 8:
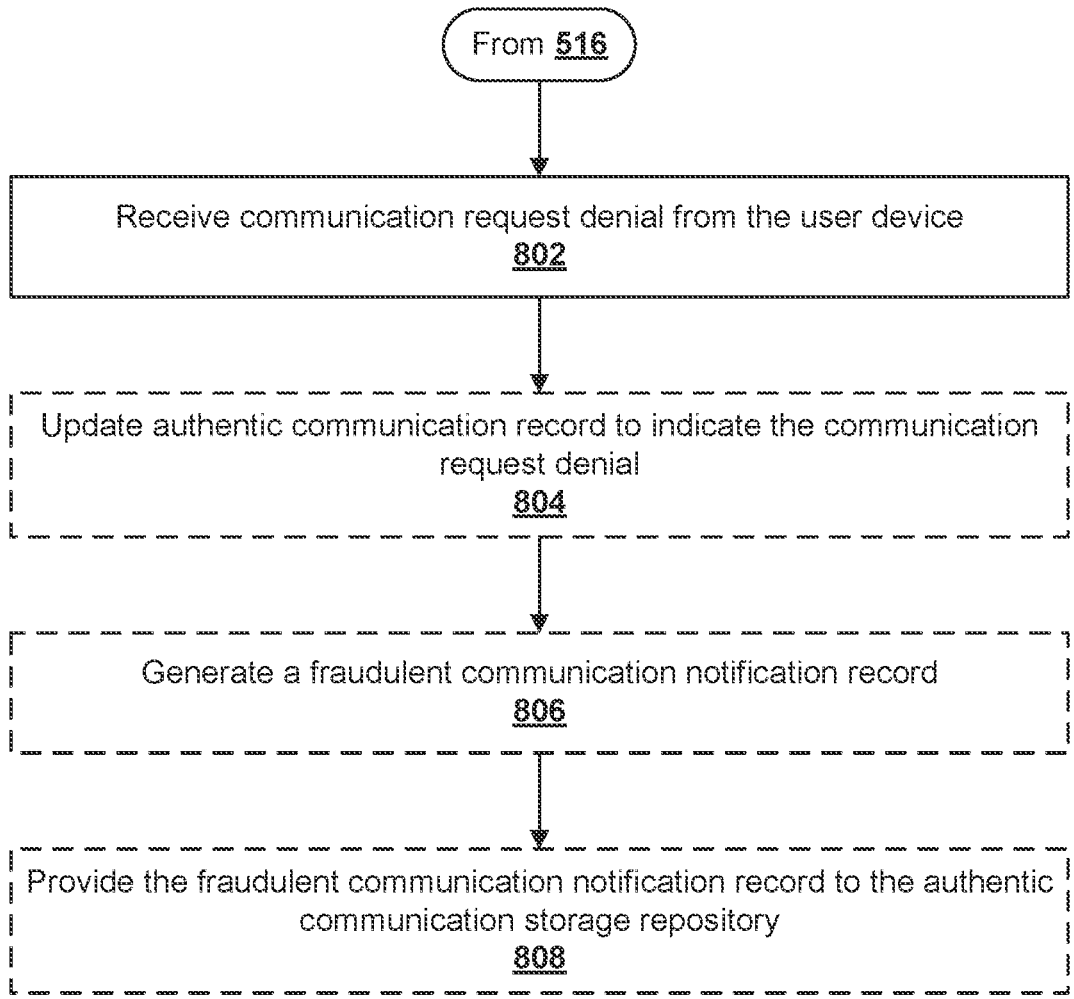
FIG. 8 illustrates an example flowchart for providing a fraudulent communication notification record, in accordance with some example embodiments described herein.

The communication verification response may further include one or more interaction elements that allow a user to interact with the communication verification response, such as to provide a communication request denial (as discussed in greater detail in FIG. 8). These interaction elements may allow a user to interact with them (e.g., touch, select, click, audibly select, and/or the like) to proceed with a corresponding interaction operation.

The communication analysis circuitry 208 may generate the communication verification response in a standardized format (e.g., JavaScript Object Notation (JSON), Extensible Markup Language (XML), HTML, an image, and/or the like) and cause the communication verification response to be provided to the user device that provided the communication verification request. In particular, the communication analysis circuitry 208 may provide the formatted communication verification response to communication analysis circuitry 208 to communications hardware 206, and communications hardware 206 may provide the communication verification response to the mobile application executing on the user device.

In some embodiments, the communications hardware 206 may provide the communication verification response using HTTP or HTTPS protocols to the mobile application. For example, the communications hardware 206 may provide the communication verification response to a mobile application used by the user device using an appropriate HTTP response, such as a "POST" method with an appropriate HTTP header. As another example, the communications hardware 206 may use specific APIs, such as RESTful APIs or WebSocket APIs to provide the communication verification response to the user device. In some embodiments, the communications hardware 206 may use WebSocket APIs to provide the communication verification response to the user device in real time or near real time without the need for repeated HTTP requests.

Turning now to FIG. 8, example operations are shown for providing a fraudulent communication notification record. In some embodiments, a user may review a contextual reason included in the communication verification response and may reject the contextual reason. Thus, this may be indicative that while the candidate communication may be an authentic communication, the authentic communication was generated due to fraudulent reasons. Thus, an indication of communication request denial should be reflected in the authentic communication record and/or as its own fraudulent communication notification record. In this way, the authentic communication record may be associated with a communication request denial such that future analysis of the authentic communication record yields a communication classification of a fraudulent user communication.

As shown by operation 802, the apparatus 200 includes means, such as processor 202, memory 204, communications hardware 206, or the like, for receiving a communication denial request from the user device. In some embodiments, in an instance in which the communication classification is indicative of an authentic communication, the communication verification response may include a contextual reason for the authentic communication and/or candidate communication. As described above, the communication verification response may include one or more interaction elements the user may interact with. One interaction element may be associated with a candidate communication denial that causes the communications hardware 206 to receive the communication request denial from the mobile application operating on the user device (e.g., any one of user device 106A-106N). The communication request denial may be indicative that the user has denied the contextual reason for the candidate communication and/or the authentic communication. For example, in an instance a fraudster requested to reset the user's password such that an authentic communication to facilitate the password reset request was provided to a user device of the user, the authentic communication will have an authentic communication record because the password reset request was provided from the institution. Thus, the communication classification may be indicative of an authentic communication despite the authentic communication being caused by a fraudster. Thus, the communications hardware 206 may provide the communication request denial to show he/she did not request the authentic communication and/or candidate communication.

In some embodiments, the communication analysis circuitry 208 may further provide the authentic communication record and communication request denial to one or more agent devices (e.g., any one of agent devices 108A-108N) such that an agent may perform additional fraud analysis on the authentic communication.

Optionally, as shown by operation 804, the apparatus 200 includes means, such as processor 202, memory 204, communications hardware 206, communication analysis circuitry 208, or the like, for updating an authentic communication record to indicate the communication request denial. As described above, in some embodiments, the authentic communication storage repository 120 is a database. As such, the authentic communication records stored in the authentic communication storage repository 120 may be modified by the communication analysis circuitry 208. Thus, the communication analysis circuitry 208 may identify an authentic communication record in the authentic communication storage repository 120 that corresponds to the authentic communication record identified in the query of operation 508 of FIG. 5. The communication analysis circuitry 208 may then update the authentic communication record to reflect that a communication request denial was received from the user. For example, the communication analysis circuitry 208 may update the authentic communication record to indicate that a communication request denial was received. The communication analysis circuitry 208 may further update the authentic communication record to reflect the time and/or date the communication request denial was received, an associated device identifier associated with the communication request denial, etc. As such, in the event the authentic communication record is accessed again, the communication analysis circuitry 208 may determine the authentic communication is associated with a communication request denial. Thus, the communication analysis circuitry 208 may determine a communication classification of a fraudulent user communication for future queries that return the authentic communication record.

Optionally, as shown by operation 806, the apparatus 200 includes means, such as processor 202, memory 204, communication analysis circuitry 208, or the like, for generating a fraudulent communication notification record. As described above, in some embodiments, the authentic communication storage repository 120 is a blockchain. As such, the authentic communication records stored in blocks of the authentic communication storage repository 120 may be immutable once published on the blockchain. Thus, the communication analysis circuitry 208 may generate a fraudulent communication notification record that may be stored on the same blockchain. The fraudulent communication notification record may be indicative of the authentic communication record determined to correspond to the candidate communication. For example, the fraudulent communication notification record may include the one or more authentic communication feature values that are included in the authentic communication record. As such, should the communication analysis circuitry 208 or another device query the authentic communication storage repository 120 for an authentic communication record that corresponds to one or more candidate communication feature values, the query results may return both the authentic communication record and the fraudulent communication notification record. As such, in the event the authentic communication record is accessed again, the query may return the fraudulent communication notification record as well and the communication analysis circuitry 208 may determine the authentic communication is associated with a communication request denial. Thus, the communication analysis circuitry 208 may determine a communication classification of a fraudulent user communication for future queries that return the authentic communication record.

Optionally, as shown by operation 808, the apparatus 200 includes means, such as processor 202, memory 204, communications hardware 206, or the like, for providing the fraudulent communication notification record to the authentic communication storage repository. Once the communication analysis circuitry 208 generates the fraudulent communication notification record, the communications hardware 206 may provide the fraudulent communication notification record to the authentic communication storage repository 120. The fraudulent communication notification record that may be digitally signed by apparatus 200 and may be provided to associated nodes of the blockchain network. The nodes of the blockchain may validate the fraudulent communication notification record, such as by ensuring the digital signature of the fraudulent communication notification record against a key associated with cryptographic key associated with apparatus 200. In some embodiments, apparatus 200 is a node of the blockchain and may participate in this validation process. In some embodiments, apparatus 200 may be a node on the blockchain and may be configured with permissions to write to the blockchain (e.g., authentic communication storage repository 120). Alternatively, apparatus 200 may not be a node on the blockchain and instead may use a different computing device, such as any one of agent devices 108A-108N to record the fraudulent communication notification record to the blockchain.

Once a fraudulent communication notification is verified, it may be input into mempool with other authentic communication records and/or fraudulent communication notification records. The fraudulent communication notification record may remain in the mempool until a particular node (e.g., a miner or validator node) selects the fraudulent communication notification record to include in a next block of the blockchain. In some embodiments, apparatus 200 is a miner node or a validator node and may use the communication analysis circuitry 208 to select the fraudulent communication notification record to include in a next block of the blockchain. Thus, the fraudulent communication notification record may be included in a block of the blockchain (e.g., authentic communication storage repository 120).

Providing a Communication History for a User

Figure 9:
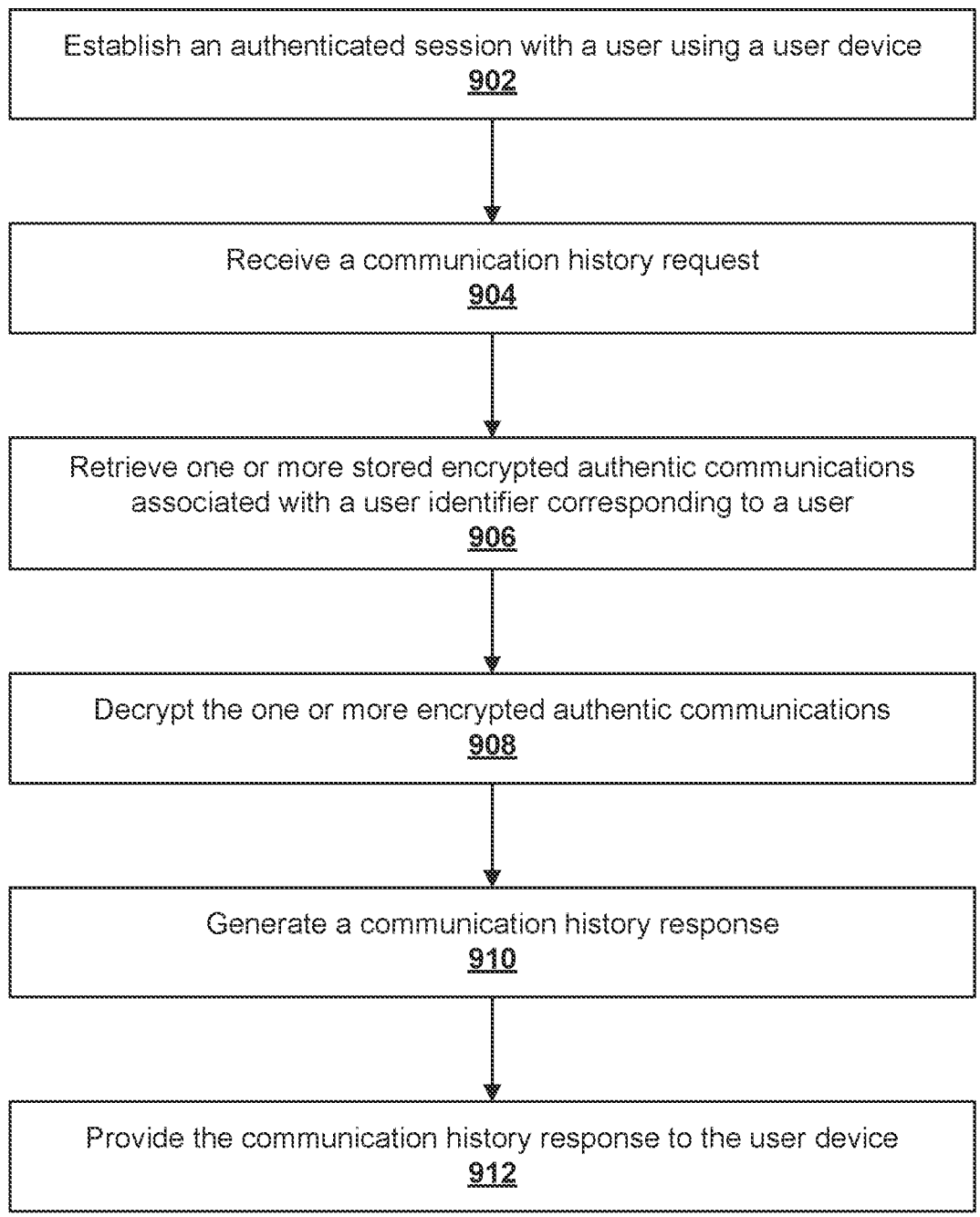
FIG. 9 illustrates an example flowchart for providing a communication history response to a user, in accordance with some example embodiments described herein.

Turning now to FIG. 9, example operations are shown for providing a communication history response to a user. In some embodiments, a user may wish to view a list of the authentic correspondences he/she received and may provide a communication history request that is indicative of a desired time range for authentic communications. The user may be provided a communication history response that includes representations of the authentic communications provided to the user during the requested time frame. As such, the user may be provided with a definitive list of all authentic communications provided to the user during the requested time frame. This may allow the user to avoid the various scams discussed above as the user may view all provided authentic communications. This may also allow a user to confirm whether he/she is receiving all authentic communications or is missing any authentic communications. This may be particularly useful for users who have recently changed communication parameters, such as moving residences, changing phone numbers, switching email addresses, and/or the like.

As shown by operation 902, the apparatus 200 includes means, such as processor 202, memory 204, communications hardware 206, or the like, for establishing an authenticated session with a user using a user device. In some embodiments, the communications hardware 206 may receive a logon request from a user device (e.g., any one of user devices 106A-106N), such as in an instance when a user attempts to access an associated user account within a mobile application. In some embodiments, operation 902 may be performed in a substantially similar manner as operation 502 of FIG. 5.

As shown by operation 904, the apparatus 200 includes means, such as processor 202, memory 204, communications hardware 206, or the like, for receiving a communication history request from the user device. Once the authenticated session is established with the user using the user device (e.g., any one of user devices 106A-106N), the communications hardware 206 may receive a communication history request from the user device. The communication history request may be including a requested time frame indicative of a request start date and a request end date. The communication history request may be indicative of a request to view a representation of all authentic correspondence provided to the user between the request start date and the request end date. In some embodiments, the communication history request may further be indicative of a user identifier corresponding to the user with the established session. For example, the user identifier may be included in the user credentials received by the communications hardware 206 in operation 902.

As shown by operation 906, the apparatus 200 includes means, such as processor 202, memory 204, communications hardware 206, communication analysis circuitry 208, or the like, for retrieving one or more stored encrypted authentic communications associated with a user identifier corresponding to the user. The communication analysis circuitry 208 may first determine a user identifier corresponding to a user who requested the communication history request. In some embodiments, the user identifier is included in the communication history request such that the communication analysis circuitry 208 may analyze the communication history request to determine the user identifier. Alternatively, the communication analysis circuitry 208 may access a user account associated with the user to determine a user identifier.

Once the communication analysis circuitry 208 determines the user identifier for the user, the communication analysis circuitry 208 may retrieve one or more stored encrypted authentic communications associated with the user identifier from the original authentic communication storage repository 130. The encrypted authentic communications stored in the original authentic communication storage repository 130 may each be associated with a user identifier such that authentic communications associated with the user identifier may be determined.

In some embodiments, each stored encrypted authentic communication is additionally associated with a timestamp indicative of when the encrypted authentic communication was added to the original authentic communication storage repository 130 and another timestamp indicative of when the authentic communication was provided to the user. Thus, the communication analysis circuitry 208 may use these timestamps to determine stored encrypted authentic communications that were provided to the user between the request start date and the request end date.

As shown by operation 908, the apparatus 200 includes means, such as processor 202, memory 204, cryptographic circuitry 212, or the like, for decrypting the one or more encrypted authentic communications. Once the communication analysis circuitry 208 retrieves the one or more encrypted authentic communications, the cryptographic circuitry 212 may be decrypt the one or more retrieved encrypted authentic communications. The cryptographic circuitry 212 may be configured to decrypt the one or more encrypted authentic communications using an associated cryptographic key used to encrypt an encrypted data instance. The cryptographic circuitry 212 may be configured to retrieve a cryptographic key from a secure storage location, such as memory 204 or from a key management repository, and may use the cryptographic key to decrypt an encrypted data instance.

In some embodiments, one or more of the one or more encrypted authentic communications are encrypted using the same cryptographic key such that the cryptographic circuitry 212 may decrypt the encrypted authentic communications using the same cryptographic key. Alternatively, one or more encrypted authentic communications are encrypted using a different cryptographic key such that the cryptographic circuitry 212 may retrieve multiple cryptographic keys to decrypt the encrypted authentic communications.

As shown by operation 910, the apparatus 200 includes means, such as processor 202, memory 204, communication analysis circuitry 208, or the like, for generating a communication history response. The communication analysis circuitry 208 may generate the communication history response that includes a representation of each of the decrypted authentic communications. The communication analysis circuitry 208 may generate the communication history response in a standardized format (e.g., JSON, XML, HTML, an image, and/or the like). The communication analysis circuitry 208 may also format the decrypted authentic communications in a standardized format such that the communication history response includes representations of the authentic communications for the user.

In some embodiments, in an instance in which a decrypted authentic communication includes an indication of the presence of user interaction element (e.g., a QR code), the communication analysis circuitry 208 may include a warning in the corresponding representation of the authentic communication. The warning may indicate that the user should use a communication verification tool to confirm whether the user interaction element is also authentic instead of relying on an image of the paper mailing to verify a communication. For example, if a user intends to use the communication history response to visually compare a received candidate communication to the representation of the authentic communication, it may be recommended that the user instead uses the communication verification tool to provide the candidate communication in a communication verification request. For example, while a paper mailing may be authentic and visually appear the same to the representation of the authentic communication, a fraudster may place a QR sticker over an authentic QC code such that the QR code is fraudulent. Thus, the user may be advised to provide the candidate communication in a communication verification request that may verify the interaction element.

As shown by operation 912, the apparatus 200 includes means, such as processor 202, memory 204, communications hardware 206, or the like, for providing a communication history response to the user device. Once the communication analysis circuitry 208 has generated the communication history response, the communications hardware 206 may provide the communication history response using HTTP or HTTPS protocols to the mobile application. For example, the communications hardware 206 may provide the communication history response to a mobile application used by the user device using an appropriate HTTP response, such as a "POST" method with an appropriate HTTP header. As another example, the communications hardware 206 may use specific APIs, such as RESTful APIs or WebSocket APIs to provide the communication history response to the user device. In some embodiments, the communications hardware 206 may use WebSocket APIs to provide the communication history response to the user device in real time or near real time without the need for repeated HTTP requests.

Verifying a Candidate Communication for a Third-Party Entity

Figure 10:
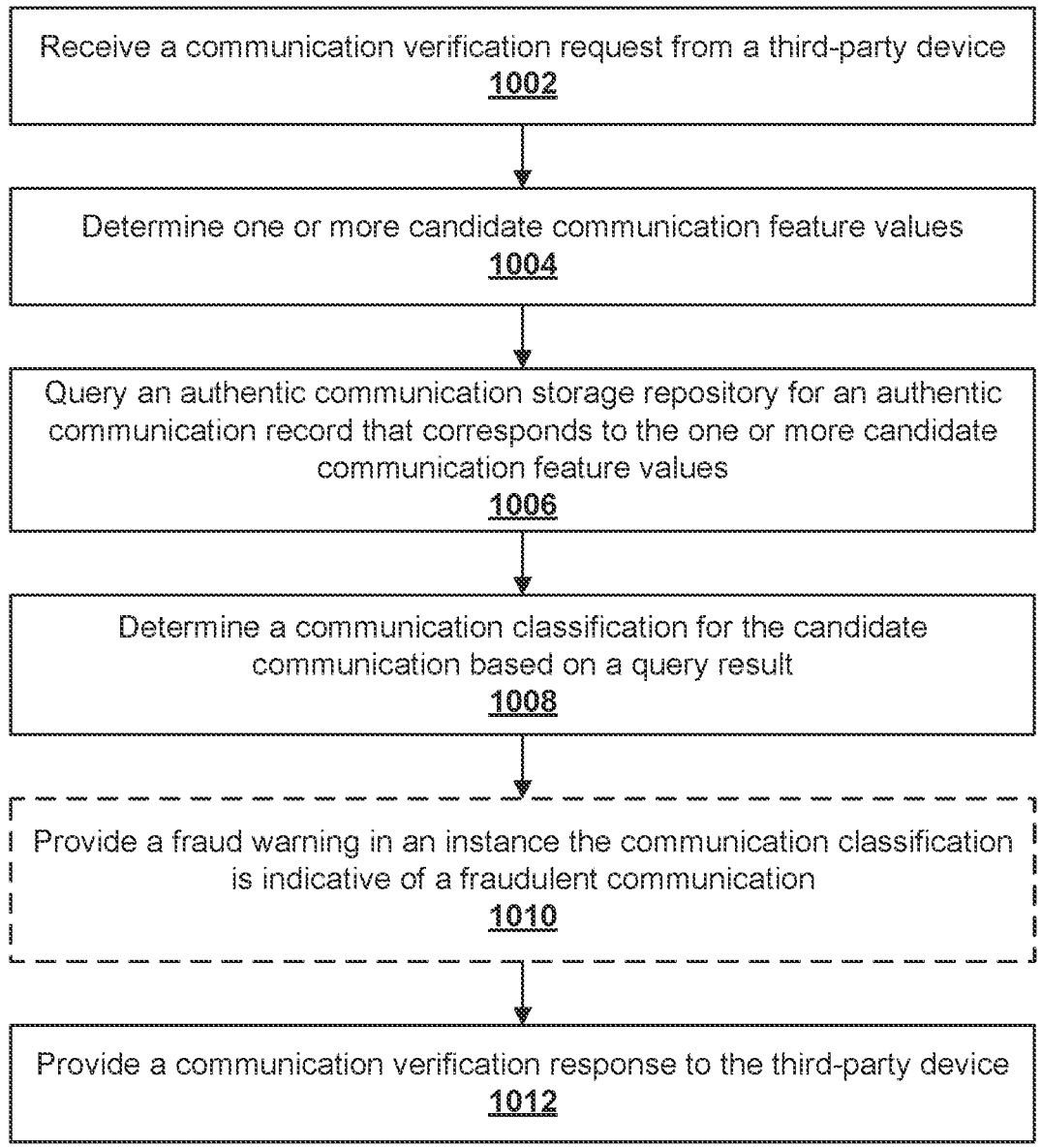
FIG. 10 illustrates an example flowchart for providing a communication verification response to a third-party device, in accordance with some example embodiments described herein.
Figure 11:
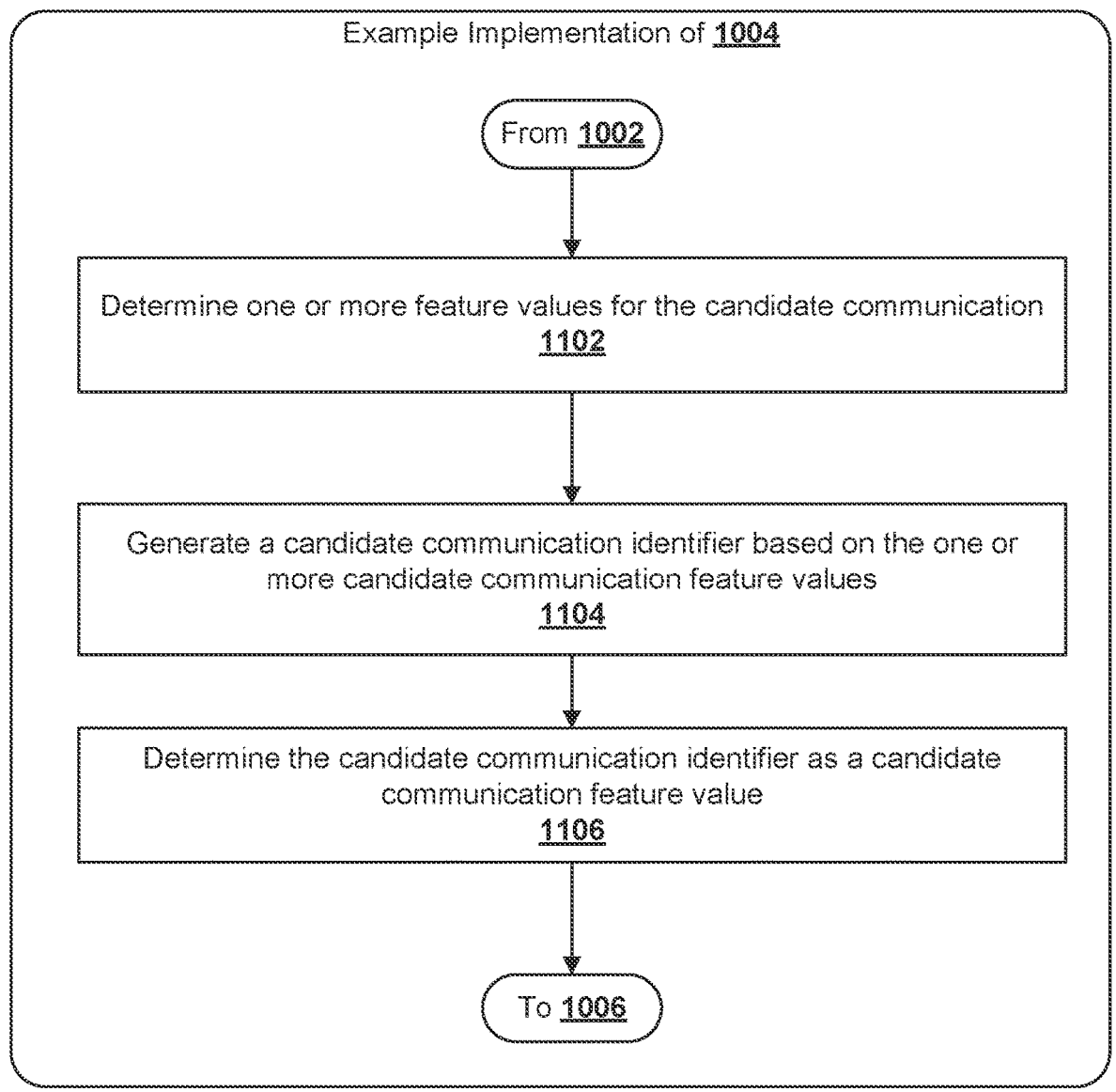
FIG. 11 illustrates an example flowchart for determining a candidate communication feature for the candidate communication provided by the third-party device, in accordance with some example embodiments described herein.
Figure 12:
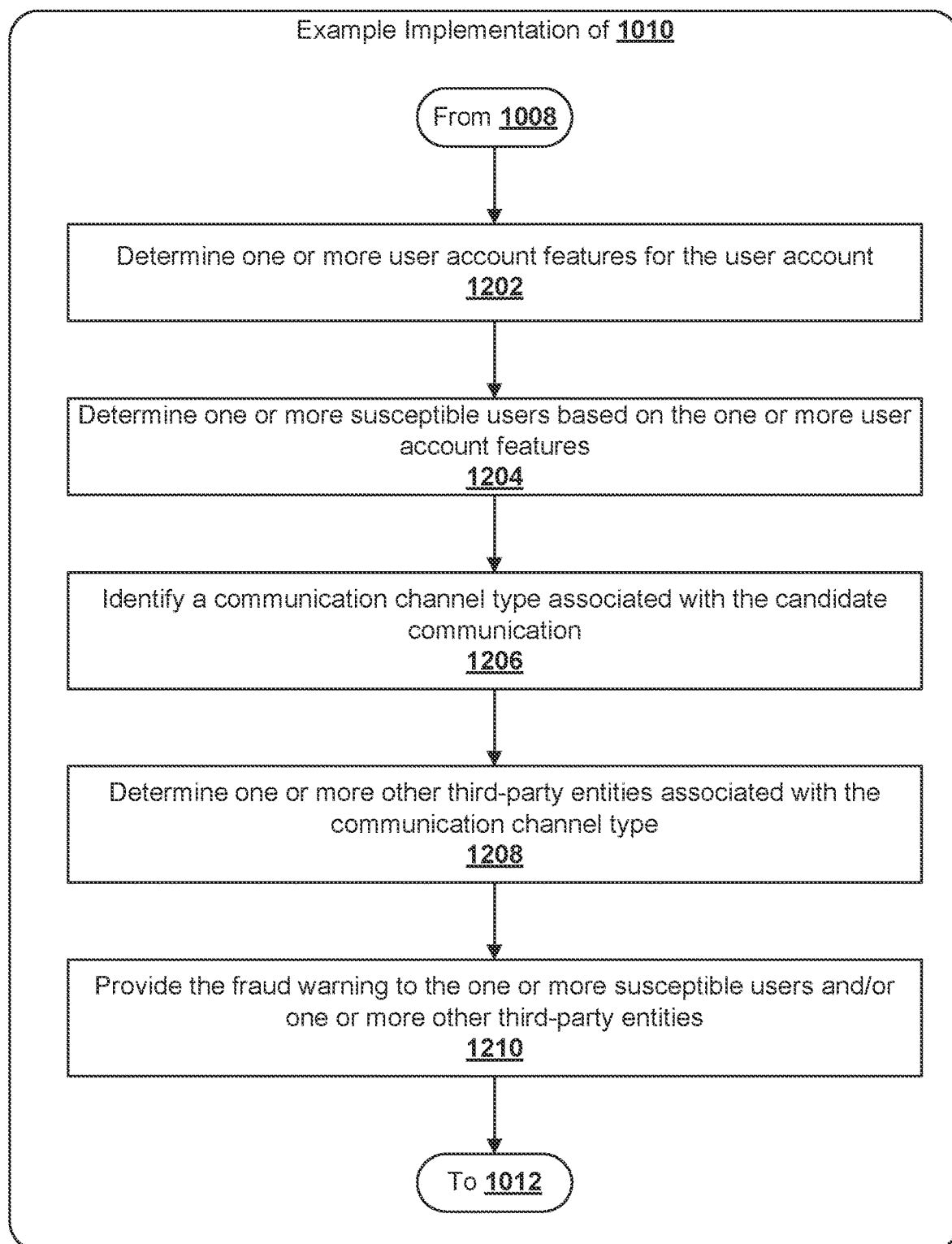
FIG. 12 illustrates an example flowchart for providing a fraud warning to one or more users and/or other third-party entities, in accordance with some example embodiments described herein.

Turning now to FIGS. 10-12, example operations are shown for providing a communication verification response to a third-party device. In particular, a third-party institution may provide apparatus 200 with a candidate communication that is alleged to originate from a particular source, such as the institution that operates apparatus 200 or another third-party institution associated with apparatus 200. The third-party institution may receive the candidate communication from a first user (e.g., a sender) and may be configured to provide it to a second user (e.g., a recipient) in an instance in which the candidate communication is authentic. Thus, the third-party institution may wish to first verify that the candidate communication is authentic before it is provided to the recipient user. The third-party institution may use a third-party device to provide apparatus 200 with a communication verification request that includes the candidate communication. Apparatus 200 may analyze the candidate communication and provide the third-party device with a communication verification response that includes the communication classification for the candidate communication. As such, the third-party device may determine whether to provide the candidate communication to the recipient user. In an instance the communication classification is indicative of an authentic communication, the third-party device may provide the candidate communication to the recipient user and may further include a verification indicia certifying that the candidate communication was analyzed and determined to be an authentic communication. In an instance the communication classification is indicative of a fraudulent communication, the third-party device may reject the candidate communication and not provide it to the recipient user. Thus, in some embodiments a candidate communication may be verified through a third-party entity in a manner that is opaque to the user. This may allow proactively prevent candidate communications determined to be fraudulent communications from reaching a user and thus, may eliminate the risk of exposing a user to scams through these communications. Thus, implementations described herein enable improved user security by proactively verify communications prior to the user receiving said communications in a manner that has not conventionally been available.

As shown by operation 1002, the apparatus 200 includes means, such as processor 202, memory 204, communications hardware 206, or the like, for receiving a communication verification request from the third-party device. The communications hardware 206 may receive the communication verification request from a third-party device (e.g., any one of third-party devices 112A-112N). The communication verification request may be indicative of a request to determine a communication classification for a candidate communication included in the communication verification request. In some embodiments, operation 1002 may be performed substantially similarly to operation 504 of FIG. 5.

However, the third-party device (e.g., any one of third-party devices 112A-112N) may not need to first establish an authenticated session with apparatus 200. Instead, to ensure the validity of the received candidate communication request, the authentic communication may further include the third-party device identifier (e.g., a IMEI, a MAC address, a UDID, an electronic serial number, a MEID, a UUID, a hardware identifier, an IP address, and/or the like) of the third-party device (e.g., any one of third-party devices 112A-112N) that provided the authentic communication such that the communication analysis circuitry 208 may verify that the third-party device identifier corresponds to an third-party device identifier associated with an authenticated third-party institution. In some embodiments, a list of each authenticated third-party and third-party device identifier may be stored in an associated memory (e.g., memory 204 or another storage repository). The communication analysis circuitry 208 may access this list to determine whether a provided third-party device identifier corresponds to a third-party device identifier on the list. In an instance the third-party device identifier does correspond to a third-party device identifier on the list, the communication analysis circuitry 208 may confirm the received candidate communication request is authentic and proceed with subsequent operations. In an instance the third-party device identifier fails to correspond to a third-party device identifier on the list, the communication analysis circuitry 208 may be unable to confirm that the received candidate communication request is authentic and may reject the received candidate communication request.

As shown by operation 1004, the apparatus 200 includes means, such as processor 202, memory 204, communication analysis circuitry 208, or the like, for determining one or more candidate communication features. The communication analysis circuitry 208 may be configured to process the received candidate communication to determine one or more candidate communication feature values that each correspond to a communication feature type. A candidate communication feature value may be used to help identify an authentic communication that corresponds to the candidate communication, should such an authentic communication exist. In some embodiments, operation 1004 may be performed substantially similarly to operation 506 of FIG. 5.

In some embodiments, operation 1004 may be performed in accordance with the operations described by FIG. 11. Turning now to FIG. 11, example operations are shown for determining a candidate communication feature for the candidate communication.

As shown by operation 1102, the apparatus 200 includes means, such as processor 202, memory 204, communication analysis circuitry 208, or the like, for determining one or more feature values for the candidate communication. The candidate communication feature values may be hashed values of an intermediate candidate communication feature value. Alternatively, some candidate communication feature values may be tokenized and parsed representations of an intermediate candidate communication feature value. In some embodiments, operation 1102 may be performed substantially similarly to operation 602 of FIG. 6.

As shown by operation 1104, the apparatus 200 includes means, such as processor 202, memory 204, communication analysis circuitry 208, or the like, for generating a candidate communication identifier based on the one or more candidate communication feature values. Once the communication analysis circuitry 208 determines the candidate communication feature values for the candidate communication, the communication analysis circuitry 208 may generate a candidate communication identifier. The candidate communication identifier may be a sequence of characters (e.g., alphabetical characters, numerical characters, or special characters) that may uniquely identify the candidate communication. In an instance the candidate communication is an authentic communication, at least a portion of the candidate communication identifier may match an authentic communication identifier. Thus, the candidate communication identifier may be used to query the authentic communication storage repository 120 for an authentic communication record. In some embodiments, operation 1104 may be performed substantially similarly to operation 604 of FIG. 6.

As shown by operation 1106, the apparatus 200 includes means, such as processor 202, memory 204, communication analysis circuitry 208, or the like, for determining the candidate communication identifier as a candidate communication feature value. Once the communication analysis circuitry 208 determines the candidate communication identifier, the communication analysis circuitry 208 may determine the candidate communication identifier as a candidate communication feature value for a candidate communication identifier communication feature type. In some embodiments, the communication analysis circuitry 208 may discard other candidate communication feature values that do not correspond to the candidate communication identifier communication feature type as the candidate communication identifier includes an indication of these candidate communication feature values. In some embodiments, operation 1106 may be performed substantially similarly to operation 606 of FIG. 6.

Returning now to FIG. 10, as shown by operation 1006, the apparatus 200 includes means, such as processor 202, memory 204, communications hardware 206, communication analysis circuitry 208, or the like, for querying an authentic communication storage repository for an authentic communication record that corresponds to the one or more candidate communication features. In some embodiments, the communication analysis circuitry 208 may query the authentic communication storage repository 120 using the candidate communication identifier. In some embodiments, the communication analysis circuitry 208 may include other communication feature values in addition to the candidate communication identifier. In some embodiments, operation 1006 may be performed substantially similarly to operation 508 of FIG. 5.

As shown by operation 1008, the apparatus 200 includes means, such as processor 202, memory 204, communication analysis circuitry 208, or the like, for determining a communication classification for the candidate communication based on a query result. Once the communication analysis circuitry 208 receives the results of the query, the communication analysis circuitry 208 may determine a communication classification for the candidate communication. In particular, in an instance a corresponding authentic communication record is indicated in the query results (e.g., indicative that a match was found, indicative of the location of a match, and/or the authentic communication record itself), the communication analysis circuitry 208 may be configured to determine an authentic communication classification for the candidate communication. An authentic communication classification may be indicative that the candidate communication is authentic and did originate from the alleged source. In some embodiments, operation 1008 may be performed substantially similarly to operation 510 of FIG. 5.

Optionally, as shown by operation 1010, the apparatus 200 includes means, such as processor 202, memory 204, communications hardware 206, communication analysis circuitry 208, or the like, for providing a fraud warning in an instance in which the communication classification is indicative of a fraudulent communication. In some embodiments, the fraud warning may include an indication of one or more of the one or more intermediate candidate communication feature values (e.g., non-hashed/non-tokenized candidate communication feature values) of the candidate communication. The fraud warning may be provided to one or more users via an associated user device (e.g., any one of user devices 106A-106N) such that the other users may be made aware that a fraudulent communication was discovered and may be provided with an indication of what the fraudulent communication includes. For example, the fraud warning may include an indication of the sender identity (e.g., an email address or phone number), a communication subject, and/or the like as described by the candidate communication feature values of the candidate communication.

Additionally, in some embodiments, the fraud warning may be provided to one or more other third-party entities using a third-party device (e.g., any one of third-party devices 112A-112N) that may be associated with a communication channel type corresponding to the communication channel type of the candidate communication. Thus, the one or more third-party entity may take additional action to prevent the candidate communication from being further circulated to other users.

In some embodiments, operation 1010 may be performed in accordance with the operations described by FIG. 12. Turning now to FIG. 12, example operations are shown for providing a fraud warning to one or more users and/or other third-party entities.

As shown by operation 1202, the apparatus 200 includes means, such as processor 202, memory 204, communication analysis circuitry 208, or the like, for determining one or more user account features for the user. The communication analysis circuitry 208 may first identify a user account for a recipient user. The candidate communication request may include an indication of a recipient user. For example, the candidate communication request may include an email address for the recipient user. The candidate communication analysis circuitry 208 may then search user accounts for the email address. The user account may be associated with the user and may contain user information (e.g., name, email, phone number, address, and/or the like). In some embodiments, the communication analysis circuitry 208 may be configured to determine values for one or more user account feature values for one or more user account features of interest. In some embodiments, the communication analysis circuitry 208 may be configured with a user feature template. The user feature template may be indicative of the user account features of interest for a given communication channel type. For example, the user feature template may be indicative that for a paper mailing communication channel type, the user account features of interest include a user address zip code, a user town address, and a user state address. Thus, the communication analysis circuitry 208 may be configured to determine a user account feature values for a user address zip code user account feature, a user town user account feature, and a user state address user account feature.

As shown by operation 1204, the apparatus 200 includes means, such as processor 202, memory 204, communication analysis circuitry 208, or the like, for determining one or more susceptible users based on the one or more user account features. The communication analysis circuitry 208 may then determine one or more susceptible users that are associated with user account feature values that match the user account feature for a user. For example, the communication analysis circuitry 208 may determine susceptible users whose user account is associated with a user account feature value that matches a value for a user address zip code user account feature, a user town user account feature, and a user state address user account feature of the user determined in operation 704. These users may be determined to be susceptible to the candidate communication as they exhibit at least one common feature as the user who received the candidate communication. Thus, it may be beneficial to proactively warn susceptible users of possible candidate communications they may receive that are determined to be fraudulent.

As shown by operation 1206, the apparatus 200 includes means, such as processor 202, memory 204, communication analysis circuitry 208, or the like, for identifying a communication channel type associated with the candidate communication. As described above, the communication analysis circuitry 208 may determine a communication channel type for the candidate communication. A communication channel type may be indicative of the communication channel a user device received the candidate communication from. In some embodiments, the communication analysis circuitry 208 may determine the communication channel type based on the communication feature types included in the candidate communication. The particular information included in a candidate communication may be indicative of the communication channel type associated with the candidate communication. Alternatively, the candidate communication may be formatted in a particular format that is indicative of the communication channel type.

As shown by operation 1208, the apparatus 200 includes means, such as processor 202, memory 204, communication analysis circuitry 208, or the like, for determining one or more other third-party entities associated with the communication channel type. In some embodiments, the communication analysis circuitry 208 may be configured to determine one or more other third-party entities (e.g., other than the third-party entity which provided the communication verification request) that are associated with the communication channel type. In some embodiments, the communication analysis circuitry 208 may be configured to access an entity repository, which may include entries for one or more third-party entities. Each entry for a particular third-party entity may further include one or more communication channel types associated with the third-party entity. For example, a third-party entity may offer an email service that allows users to send and receive emails and thus, the third-party entity may be associated with an email communication channel type. Additionally, each entry may further include an indication of one or more third-party devices (e.g., any one of third-party devices 112A-112N) that may be configured to send communications to and/or receive communications from communications hardware 206.

As shown by operation 1210, the apparatus 200 includes means, such as processor 202, memory 204, communications hardware 206, communication analysis circuitry 208, or the like, for providing the fraud warning to one or more susceptible users and/or one or more other third-party entities. The communications hardware 206 may provide the fraud warning to the one or more susceptible users via associated user devices (e.g., any one of user devices 106A-106N) described by an associated user account of the susceptible user. The fraud warning may include an indication of one or more of the one or more intermediate candidate communication feature values of the candidate communication. Thus, susceptible users may be made aware that a fraudulent communication was discovered and may be provided with an indication of what the fraudulent communication includes. For example, the fraud warning may include an indication of the sender identity (e.g., an email address or phone number), a communication subject, and/or the like as described by the candidate communication feature values of the candidate communication.

Additionally or alternatively, in some embodiments, the fraud warning may be provided to one or more other third-party entities using a third-party device (e.g., any one of third-party devices 112A-112N) that may be associated with a communication channel type corresponding to the communication channel type of the candidate communication. Thus, other third-party entities may take additional action to prevent the candidate communication from being further circulated to other users.

Returning now to FIG. 10, as shown by operation 1012, the apparatus 200 includes means, such as processor 202, memory 204, communications hardware 206, communication analysis circuitry 208, or the like, for providing a communication verification response to the third-party device. Once the communication analysis circuitry 208 has determined a communication classification for the candidate communication, the communication analysis circuitry 208 may generate a communication verification response for the third-party entity. The communication verification response may include the communication classification determined for the candidate communication. Thus, the third-party entity may be provided with an indication of whether the candidate communication is authentic or fraudulent.

In some embodiments, the communications hardware 206 may provide the communication verification response using HTTP or HTTPS protocols to the third-party device (e.g., any one of third-party devices 112A-112N). For example, the communications hardware 206 may provide the communication verification response to a third-party device (e.g., any one of third-party devices 112A-112N) using an appropriate HTTP response, such as a "POST" method with an appropriate HTTP header. As another example, the communications hardware 206 may use specific APIs, such as RESTful APIs or WebSocket APIs to provide the communication verification response to the third-party device ((e.g., any one of third-party devices 112A-112N). In some embodiments, the communications hardware 206 may use WebSocket APIs to provide the communication verification response to the third-party device in real time or near real time without the need for repeated HTTP requests.

FIGS. 3-12 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Example System Interaction

FIGS. 13A-16C shows a swim lane diagram illustrating example operations (e.g., as described above in connection with FIGS. 3-12) performed by components of the environment depicted in FIG. 1 to produce various benefits of the implementations described herein. The operations shown in the swim lane diagram performed by system device 110 are shown along the line extending from the box labeled "system device 110," operations performed by an agent device 108A are shown along the line extending from the box labeled "agent device 108A," operations performed by an authentic communication storage repository 120 are shown along the line extending from the box labeled "authentic communication storage repository 120," operations performed by a user device 106A are shown along the line extending from the box labeled "user device 106A," operations performed by a user device 106B are shown along the line extending from the box labeled "user device 106B," operations performed by a user device 106C are shown along the line extending from the box labeled "user device 106C," operations performed by a third-party device 112A are shown along the line extending from the box labeled "third-party device 112A," operations performed by a third-party device 112B are shown along the line extending from the box labeled "third-party device 112B," and operations performed by an original authentic communication storage repository 130 are shown along the line extending from the box labeled "original authentic communication storage repository 130." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIGS. 13A-16C.

Figure 13A:
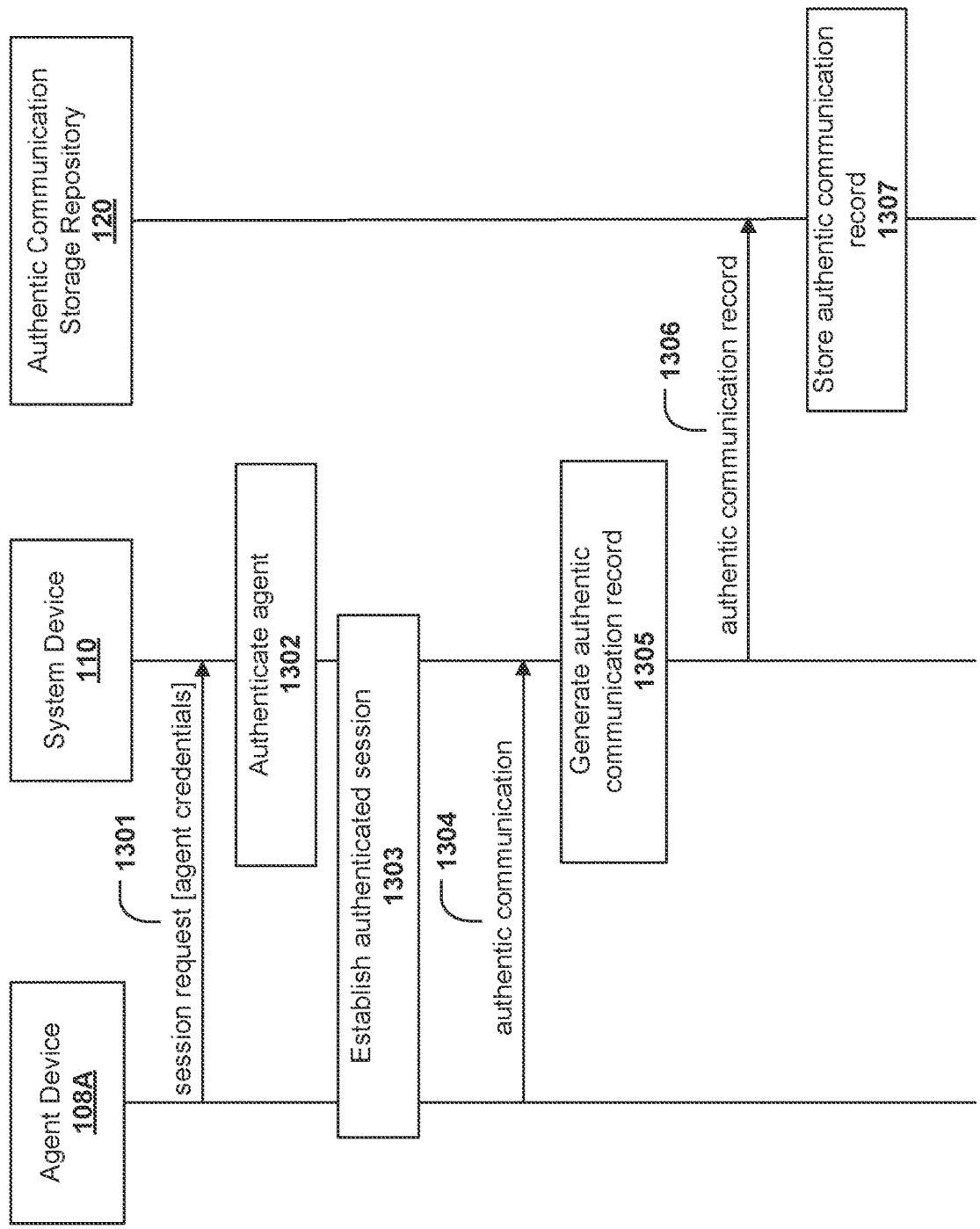
FIGS. 13A-13B illustrate a swim lane diagram with example operations for storing an authentic communication and/or authentic communication record that may be performed by components of the environment depicted in FIG. 1, in accordance with some example embodiments described herein.
Figure 13B:
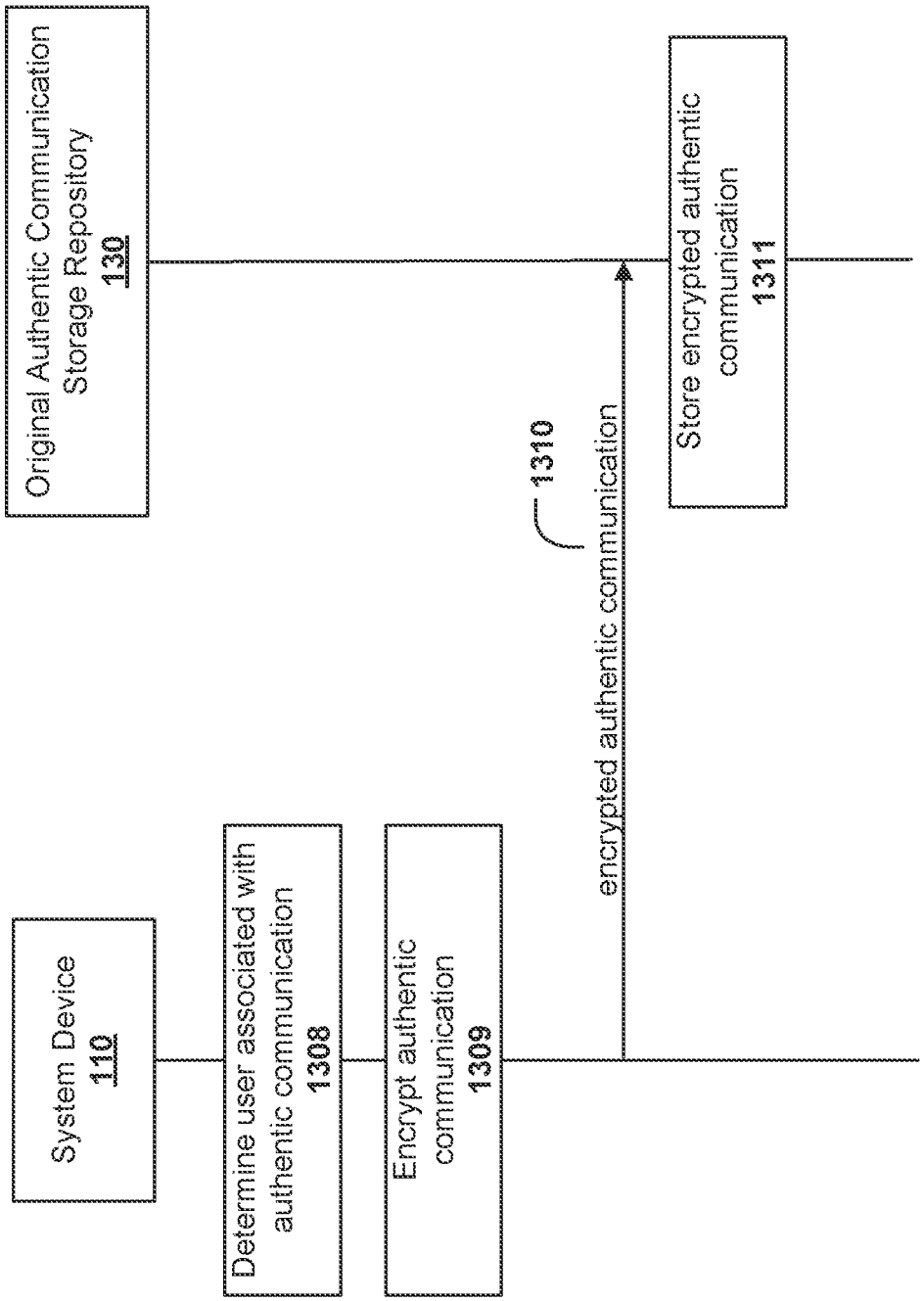

Turning first to FIGS. 13A-13B, example operations are shown for storing authentic communication records. As shown in FIG. 13A, at operation 1301, the agent device 108A may provide the system device 110 with a session request that includes agent credentials. At operation 1302, the system device 110 may determine whether the agent is authenticated. At operation 1303, in an instance the agent is successfully authenticated, the agent device 108A and system device 110 may establish an authenticated session with one another. At operation 1304, the agent device 108A may provide an authentic communication to the system device 110. At operation 1305, the system device 110 may process the received authentic communication and may generate an authentic communication record for the authentic communication. At operation 1306, the system device 110 may provide the authentic communication record to authentic communication storage repository 120 for storage. At operation 1307, the authentic communication storage repository 120 may store the authentic communication record.

Turning now to FIG. 13B, at operation 1308, the system device 110 may determine a user associated with the authentic communication. At operation 1309, the system device 110 may encrypt the authentic communication. At operation 1310, the system device 110 may provide the encrypted authentic communication to original authentic communication storage repository 130. At operation 1311, the original authentic communication storage repository 130 may store the encrypted authentic communication.

Figure 14A:
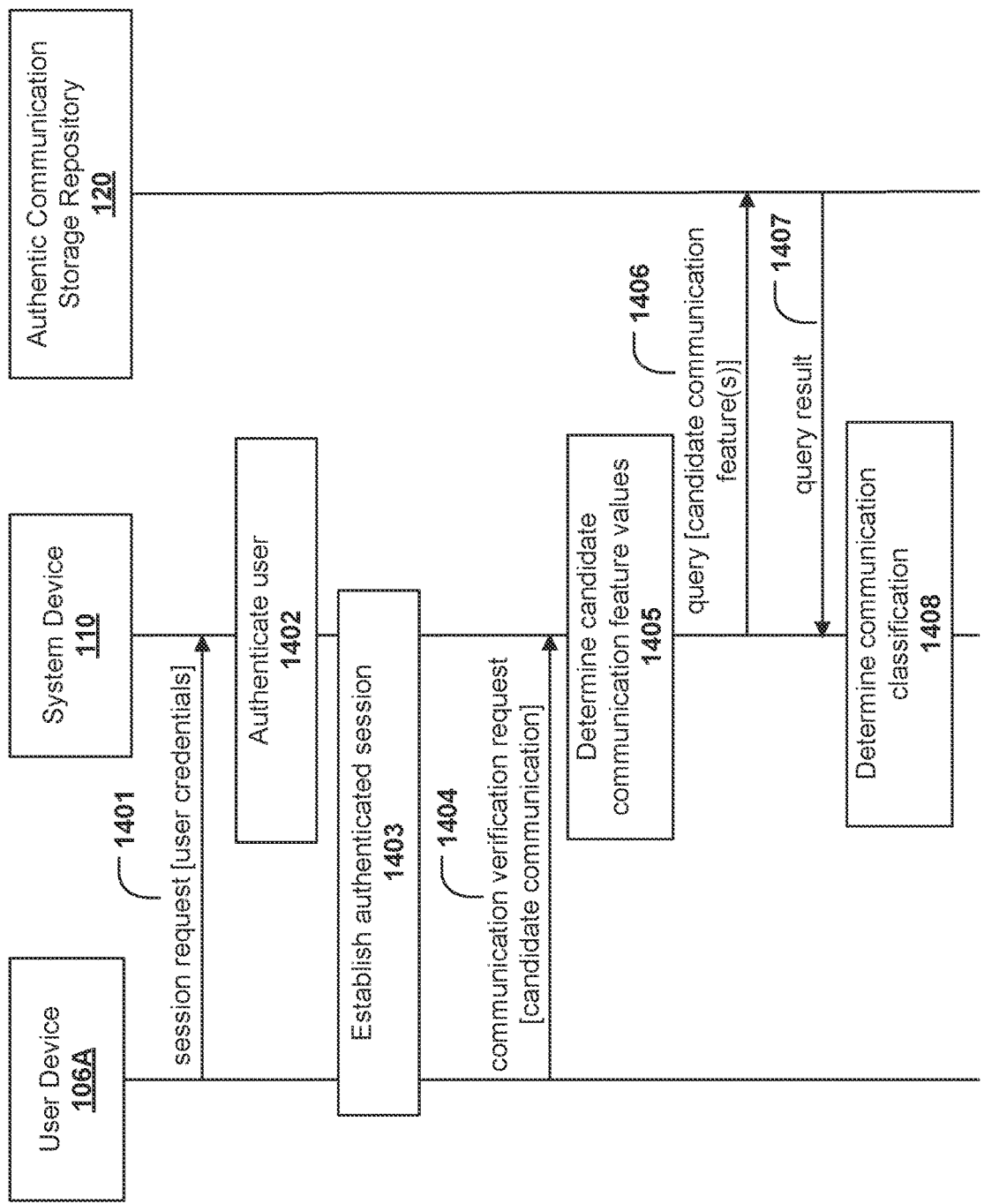
FIGS. 14A, 14B, and 14C illustrate a swim lane diagram with example operations for providing a communication verification response to a user device that may be performed by components of the environment depicted in FIG. 1, in accordance with some example embodiments described herein.
Figure 14B:
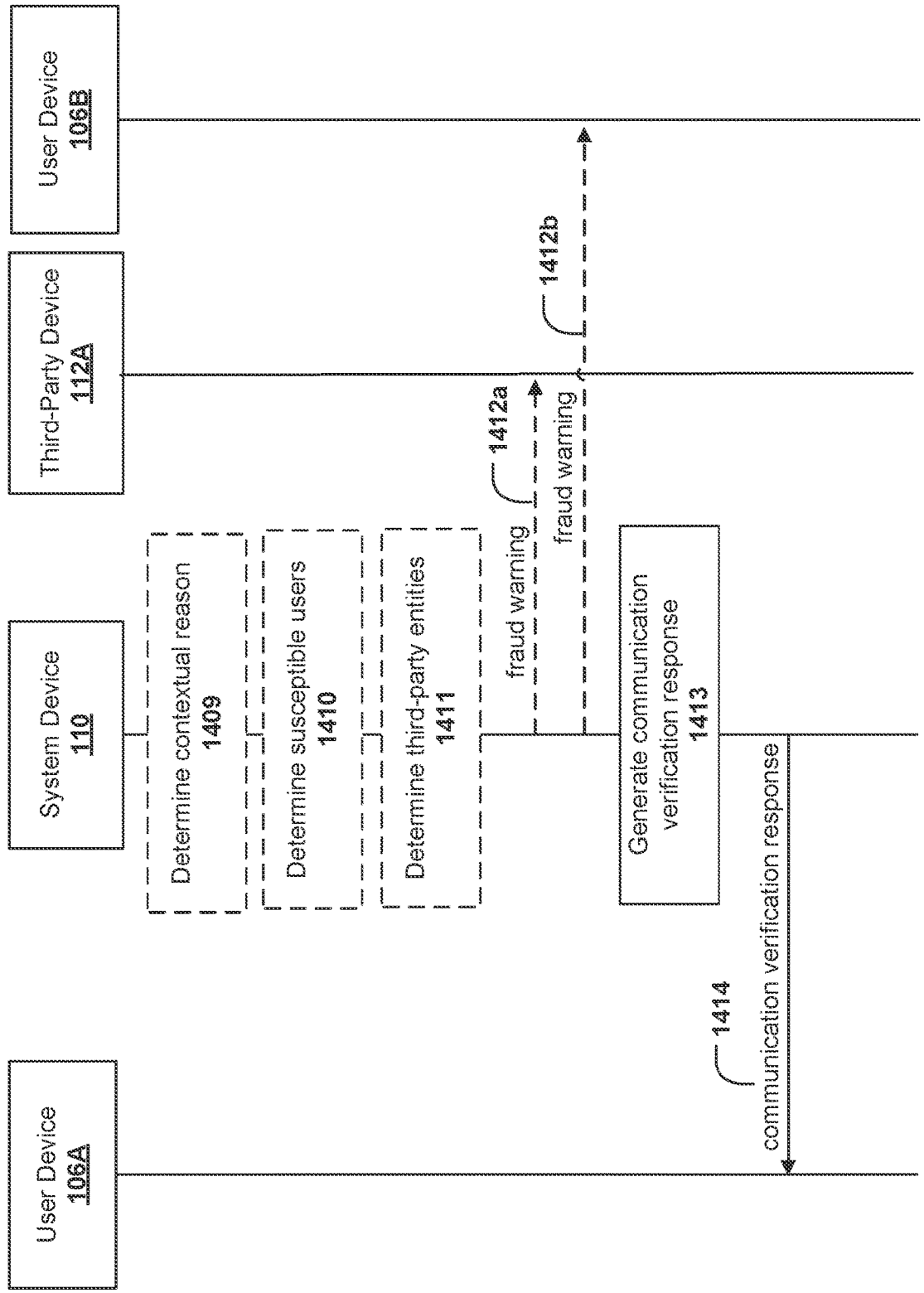
Figure 14C:
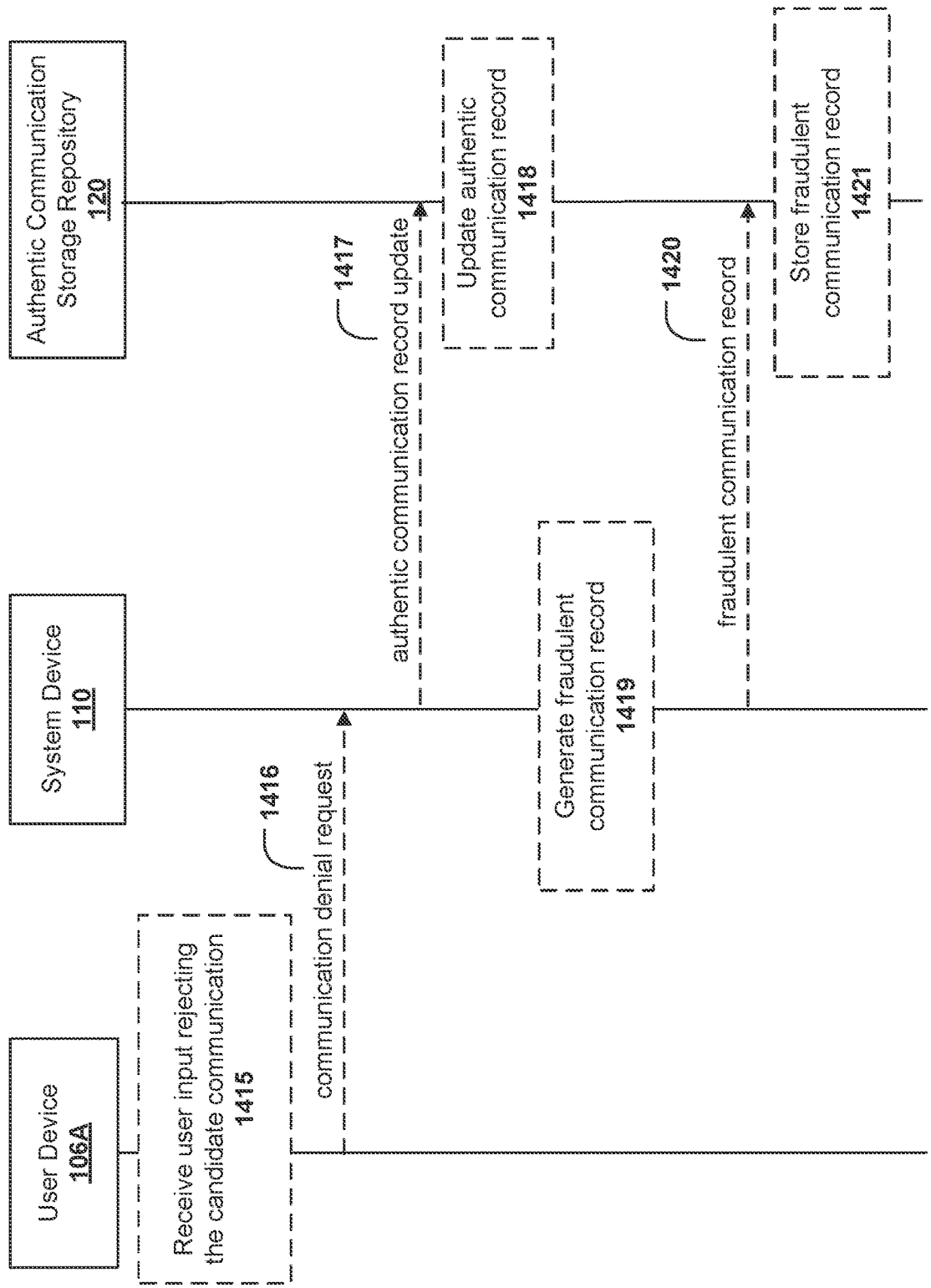

Turning next to FIGS. 14A-14C, example operations are shown for providing a communication verification response to a user device. As shown in FIG. 14A, at operation 1401 the user device 106A may provide the system device 110 with a session request that includes user credentials using an associated mobile application. At operation 1402, the system device 110 may determine whether the user is authenticated. At operation 1403, in an instance the user is successfully authenticated, the user device 106A and system device 110 may establish an authenticated session with one another. At operation 1404, the user device 106A may provide a communication verification request that includes a candidate communication to the system device 110 using the mobile application. At operation 1405, the system device 110 may process the received candidate communication to determine candidate communication feature values. At operation 1405, the system device 110 may provide a query that includes one or more candidate communication features, such as the candidate communication identifier, to authentic communication storage repository 120. At operation 1407, the system device 110 may receive the query result, which may include an indication of whether an authentic communication record was found that corresponds to the candidate communication. At operation 1408, the system device 110 may determine a communication classification for the candidate communication based on the query result.

Turning now to FIG. 14B, optionally at operation 1409, the system device 110 may determine a contextual reason for the candidate communication in an instance the communication classification is indicative of an authentic communication. Optionally at operation 1410, the system device 110 may determine one or more susceptible users in an instance the communication classification is indicative of a fraudulent communication. Optionally at operation 1411, the system device 110 may determine one or more third-party entities that are associated with a communication channel type of the candidate communication in an instance the communication classification is indicative of a fraudulent communication. Optionally at operations 1412a and 1412b, a fraud warning may be provided to a third-party device 112A and a user device 106B, respectively. At operation 1413, the system device 110 may generate a communication verification response that may include the communication classification. At operation 1414, the system device 110 may provide the communication verification response to the mobile application of user device 106A.

Turning now to FIG. 14C, optionally at operation 1415, the user device 106A may receive user input disputing the candidate communication. Optionally, at operation 1416, the user device 106A may provide a communication denial request to the system device 110. Optionally, at operation 1416, the system device 110 may provide an authentic communication record update indicative that the user has disputed the authentic communication. At operation 1418, the authentic communication storage repository 120 may update the authentic communication record. Additionally or alternatively, optionally at operation 1419, the system device 110 may generate a fraudulent communication record. Optionally at operation 1420, the system device 110 may provide the fraudulent communication record to the authentic communication storage repository 120. Optionally, at operation 1421, the authentic communication storage repository 120 may store the fraudulent communication record.

Figure 15:
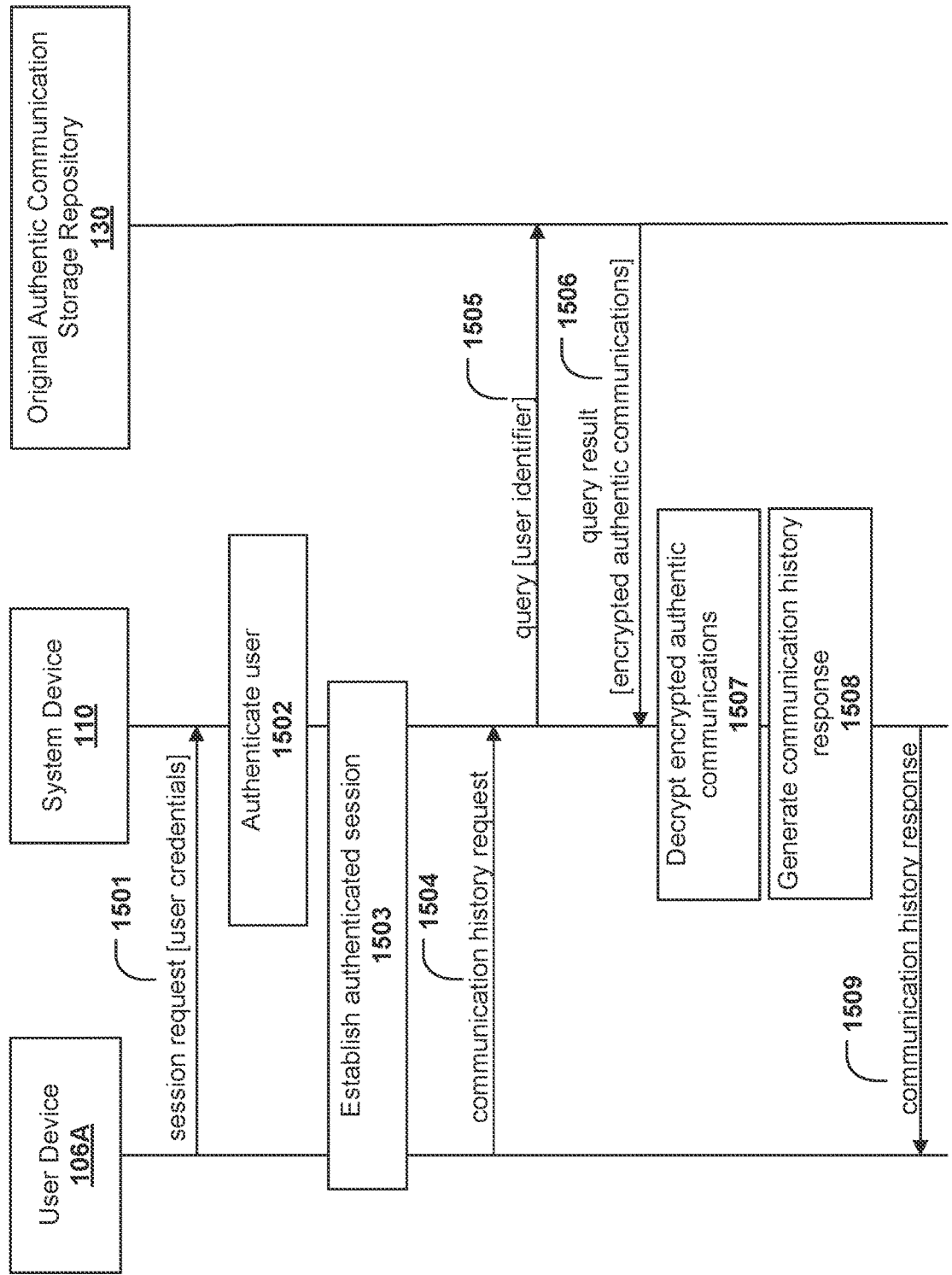
FIG. 15 illustrates a swim lane diagram with example operations for providing a communication history response to a user device that may be performed by components of the environment depicted in FIG. 1, in accordance with some example embodiments described herein.

Turning first to FIG. 15, example operations are shown for providing a communication history response to a user to a user device. As shown in FIG. 15, at operation 1501 the user device 106A may provide the system device 110 with a session request that includes user credentials using an associated mobile application. At operation 1502, the system device 110 may determine whether the user is authenticated. At operation 1503, in an instance the user is successfully authenticated, the user device 106A and system device 110 may establish an authenticated session with one another. At operation 1504, the user device 106A may provide a communication history request to the system device 110 using the mobile application. At operation 1505, the system device 110 may provide a query that includes a user identifier, to original authentic communication storage repository 130. At operation 1506, the system device 110 may receive the query result, which may include one or more encrypted authentic communications associated with the user identifier. At operation 1507, the system device 110 may decrypt the encrypted authentic communications. At operation 1508, the system device 110 may generate the communication history response. At operation 1509, the system device 110 may provide a communication history response to the user device 106A.

Figure 16A:
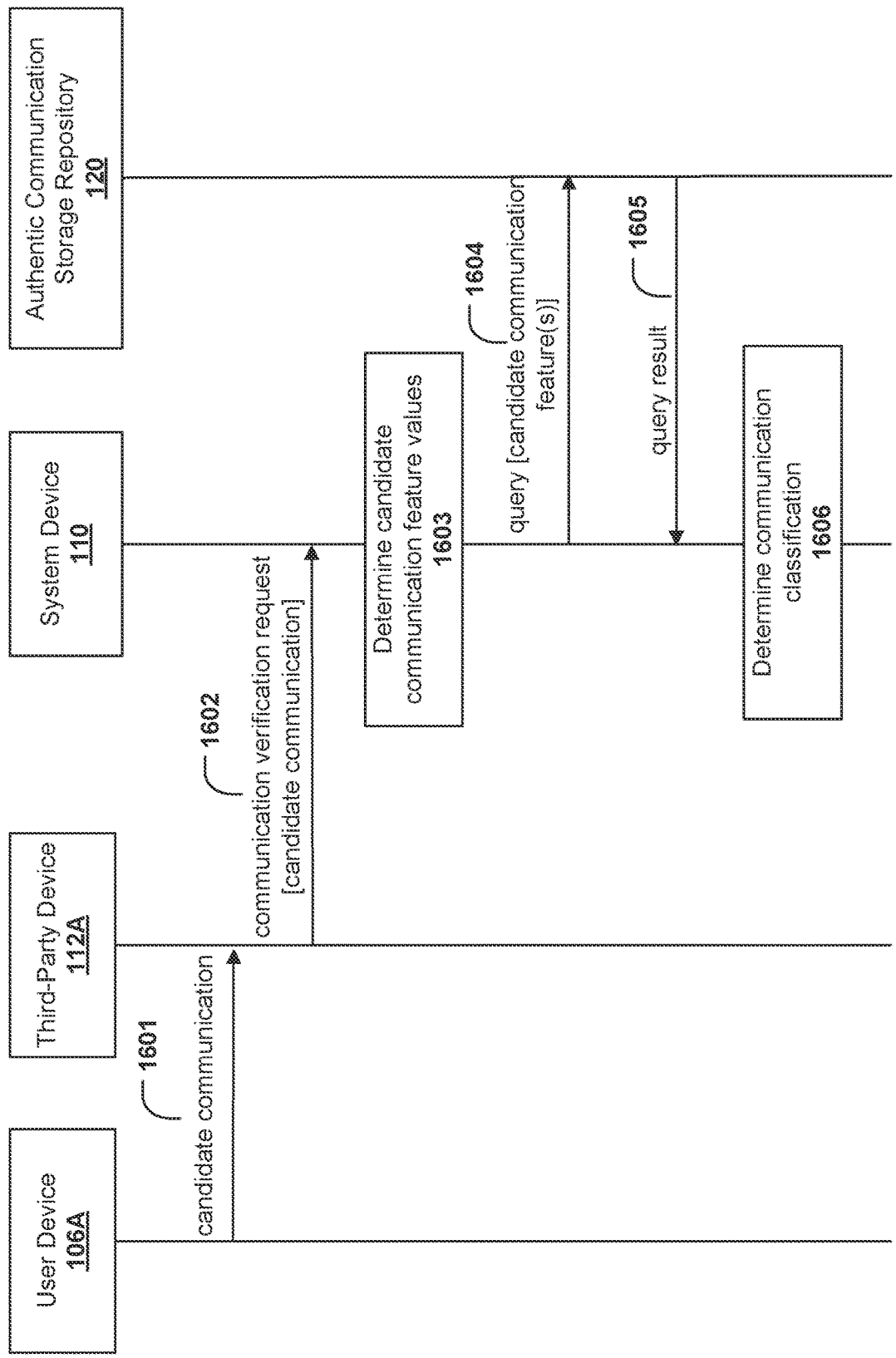
FIGS. 16A, 16B, and 16C illustrate a swim lane diagram with example operations for providing a communication verification response to a third-party device that may be performed by components of the environment depicted in FIG. 1, in accordance with some example embodiments described herein.
Figure 16B:
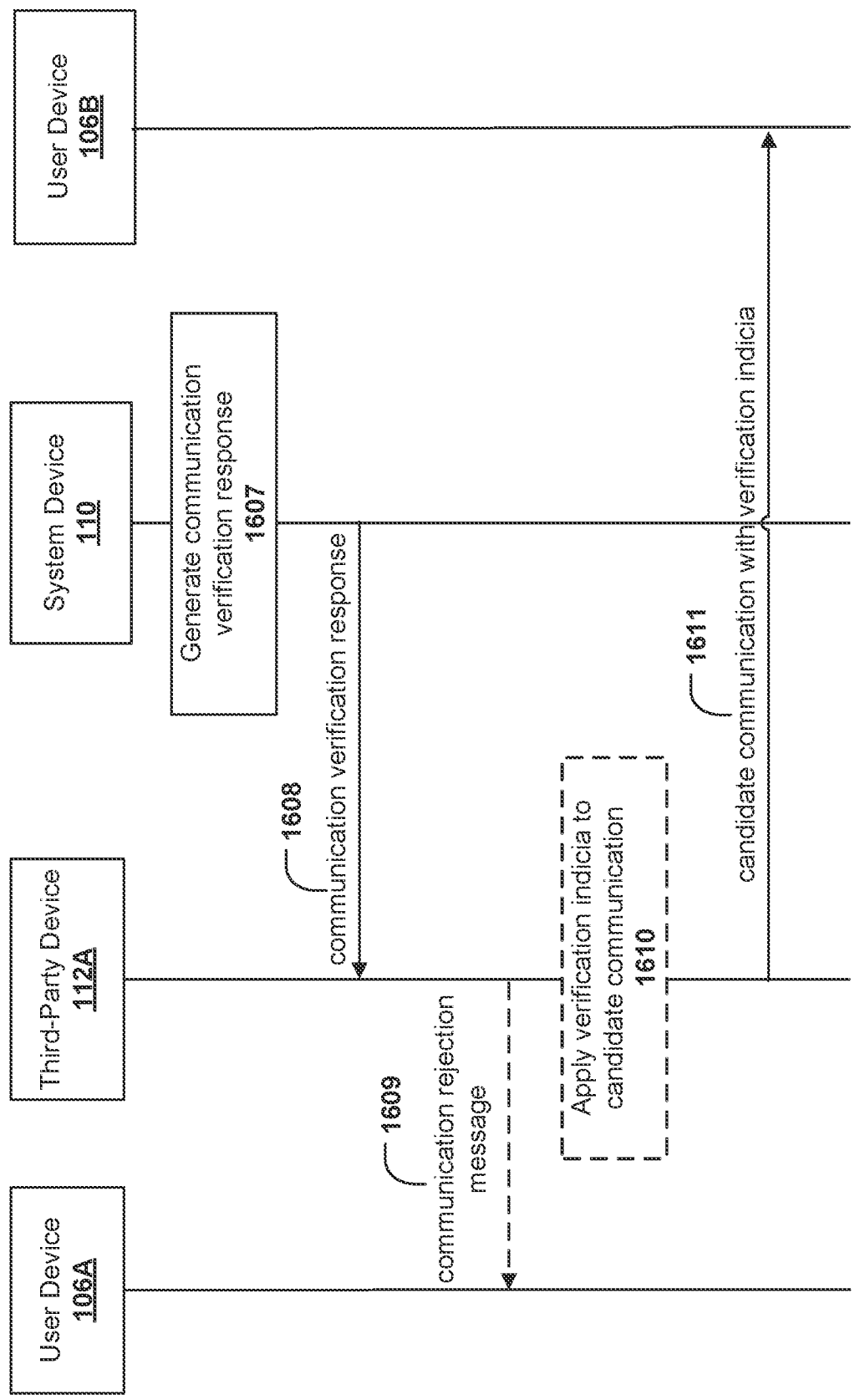
Figure 16C:
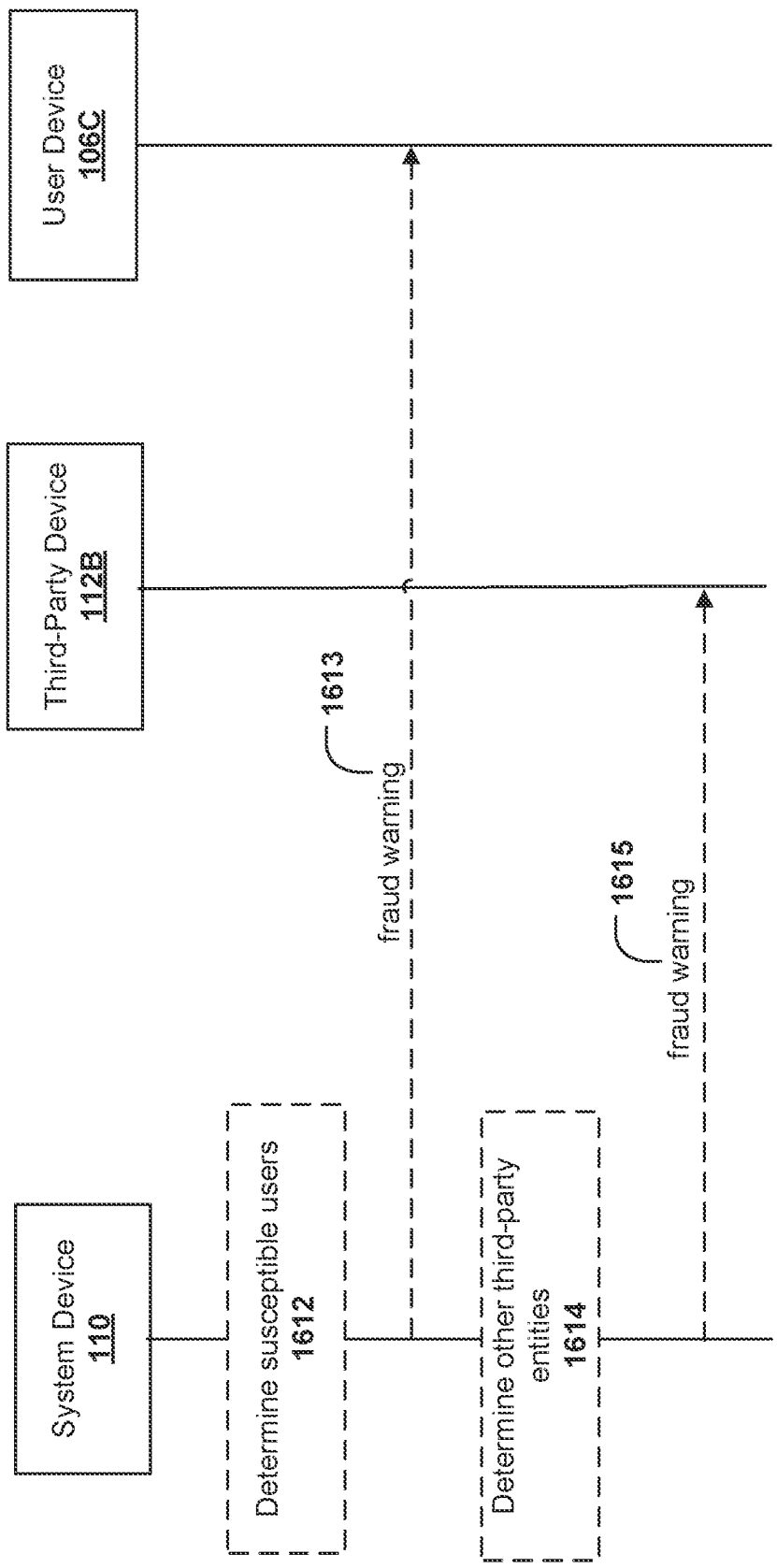

Turning next to FIGS. 16A-16C, example operations are shown for providing a communication verification response to a third-party device. As shown in FIG. 16A, at operation 1601 a user device 106A may provide a candidate communication to a third-party device 112A. At operation 1602, the third-party device 112A may provide a communication verification request that includes a candidate communication to the system device 110. At operation 1603, the system device 110 may process the received candidate communication to determine candidate communication feature values. At operation 1604, the system device 110 may provide a query that includes one or more candidate communication features, such as the candidate communication identifier, to authentic communication storage repository 120. At operation 1605, the system device 110 may receive the query result, which may include an indication of whether an authentic communication record was found that corresponds to the candidate communication. At operation 1606, the system device 110 may determine a communication classification for the candidate communication based on the query result.

Turning now to FIG. 16B, at operation 1607, the system device 110 may generate a communication verification response that includes the communication classification. At operation 1608, the system device 110 may provide the communication verification response to the third-party device 112A. Optionally, at operation 1609, the third-party device 112A may provide a communication rejection message to the user device 106A in an instance the communication classification is indicative of a fraudulent communication. Optionally, at operation 1610, the third-party device may apply verification indicia to the candidate communication, such as a green checkmark. At operation 1611, the third-party device 112A may provide the candidate communication with the verification indicia to the user device 106B in an instance the communication classification is indicative of an authentic communication and where user device 106B is the intended recipient.

Turning now to FIG. 16C, optionally at operation 1612, the system device 110 may determine one or more susceptible users in an instance the communication classification is indicative of a fraudulent communication. Optionally at operation 1613, the system device 110 may provide a fraud warning to a user device 106C. Optionally at operation 1614, the system device 110 may determine one or more other third-party entities in an instance the communication classification is indicative of a fraudulent communication. Optionally at operation 1615, the system device 110 may provide a fraud warning to a third-party device 112B.

In some embodiments, some of the operations described above in connection with FIGS. 3-12 may be modified or further amplified. Furthermore, in some embodiments, additional optional operations may be included. Modifications, amplifications, or additions to the operations above may be performed in any order and in any combination.

Turning next to FIGS. 17-22, graphical user interfaces (GUIs) are provided that illustrate example interfaces within a mobile application. As noted previously, a user may interact with the communication verification system 102 by directly engaging with communications hardware 206 of an apparatus 200 comprising a system device 110 of the communication verification system 102. In such an embodiment, the GUIs shown in FIGS. 17-22 may be displayed to a user by the apparatus 200. Alternatively, a user may interact with the communication verification system 102 using a separate user device (e.g., any of user devices 106A-106N, as shown in FIG. 1), which may communicate with the communication verification system 102 via communications network 104. In such an embodiment, the GUIs shown in FIGS. 17-22 may be displayed to the user by the user device.

Figure 17:
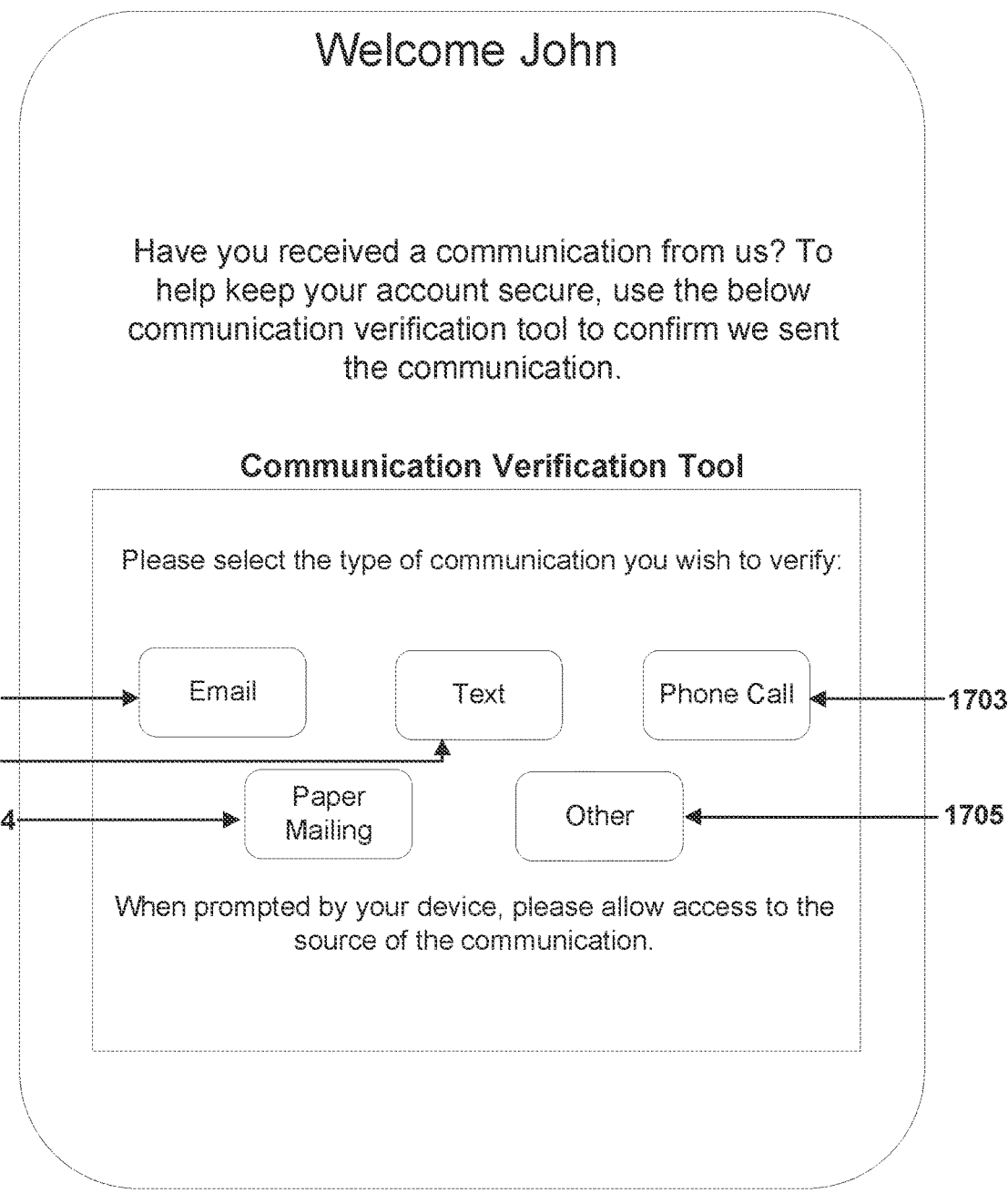
FIGS. 17, 18, and 19 illustrate an example user interface for a communication verification tool in a mobile application used to create a communication verification request as used in some example embodiments described herein.

Turning first to FIG. 17, an example user interface for a communication verification tool in a mobile application used to create a communication verification request is depicted. The communication verification tool may be accessible to a user on the mobile application once an authenticated session is established with the user. The communication verification tool may include one or more interaction elements 1701-1705 that a user may interact (e.g., touch, select, click, audibly select, and/or the like) with to create a communication verification request. In particular, the user may interact with interaction element 1701 to cause a communication verification request associated with an email communication channel type to be provided to communications hardware 206. The user may interact with interaction element 1702 to cause a communication verification request associated with an SMS message communication channel type to be provided to communications hardware 206. The user may interact with interaction element 1703 to cause a communication verification request associated with a phone call communication channel type to be provided to communications hardware 206. The user may interact with interaction element 1704 to cause a communication verification request associated with a paper mailing communication channel type to be provided to communications hardware 206. The user may interact with interaction element 1705 to cause a communication verification request associated with a miscellaneous communication channel type to be provided to communications hardware 206.

In some embodiments, interaction with an interaction element may cause the mobile application to prompt the user to access a candidate communication of interest in an associated native mobile application. Alternatively, interaction with the interaction element may cause the mobile application to prompt the user to allow the mobile application camera access such that the user may capture an image of the candidate communication and/or upload an image of the candidate communication.

Figure 18:
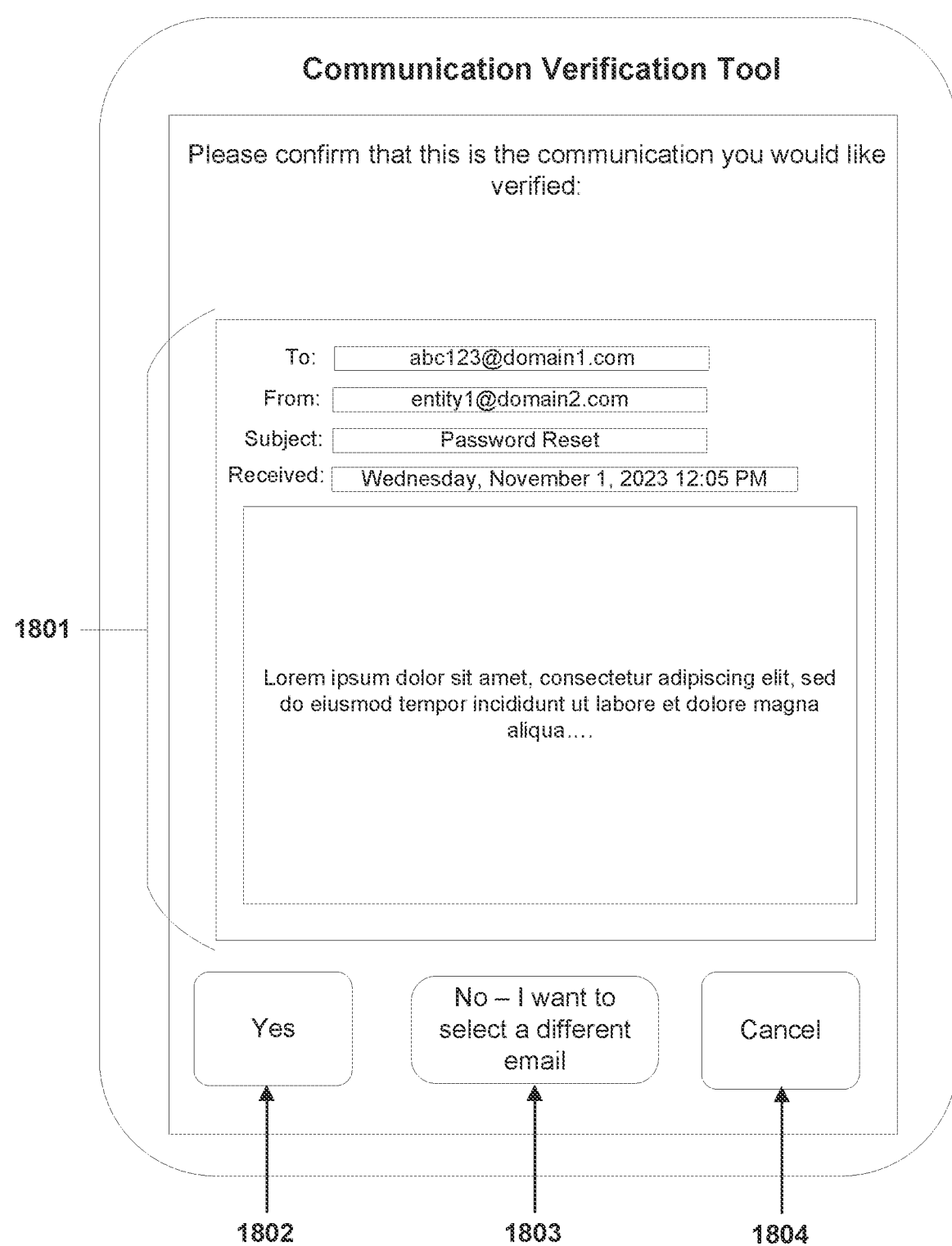

Turning now to FIG. 18, an example user interface for a communication verification tool in a mobile application used to create a communication verification request is depicted. Here, the user may have interacted with interaction element 1701 and may have selected an email as the candidate communication. The communication verification tool may allow a user to view the selected candidate communication 1801. The user may then interact with interaction element 1802 to confirm the candidate communication selection and cause the mobile application to provide the communication verification request with candidate communication 1801. The user may alternatively interact with interaction element 1803 to select a different candidate communication selection. The user may alternatively interact with interaction element 1804 to cancel the candidate communication selection for the email communication channel type and may return to the homepage of the communication verification tool depicted in FIG. 17.

Figure 19:
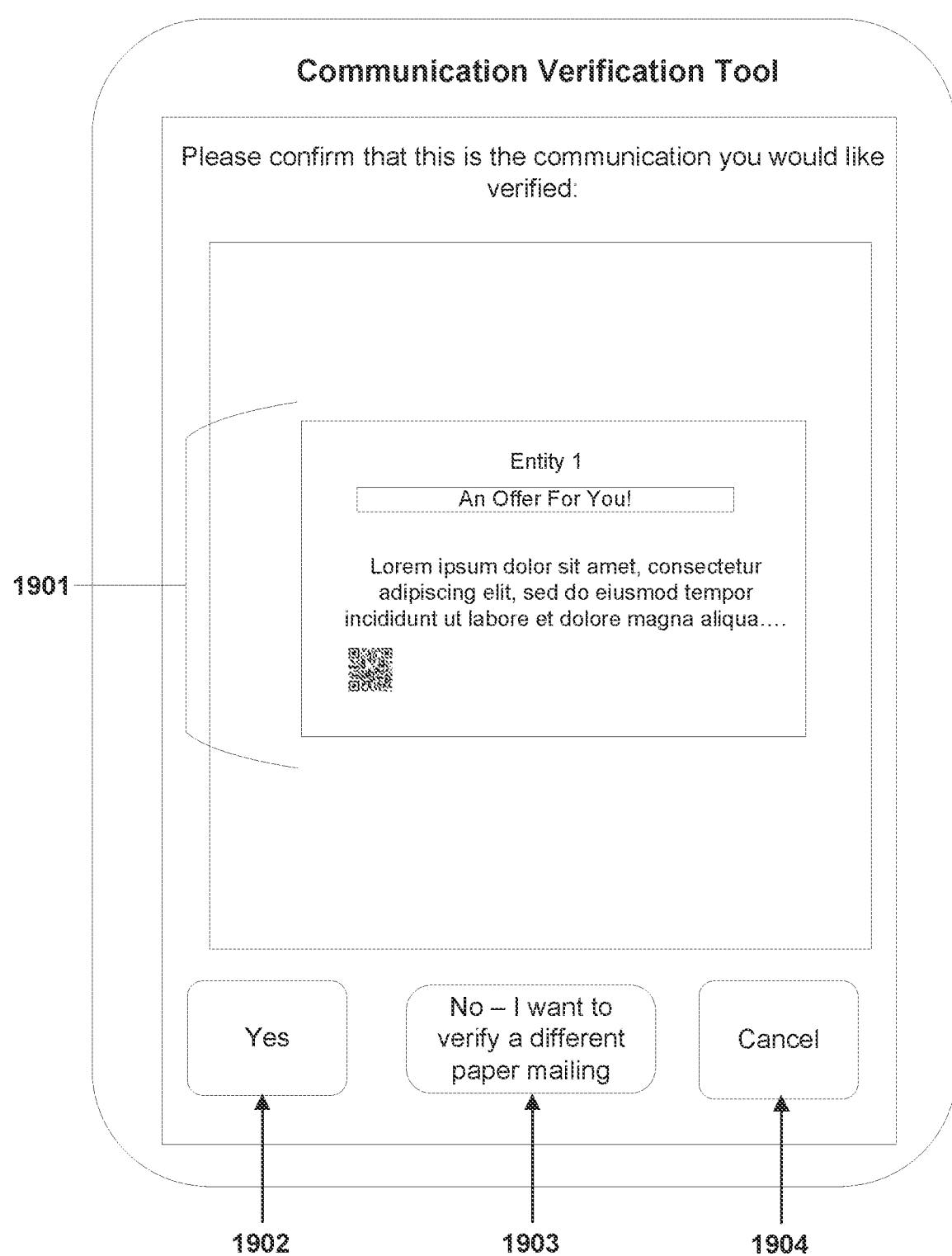

Turning now to FIG. 19, another example user interface for a communication verification tool in a mobile application used to create a communication verification request is depicted. Here, the user may have interacted with interaction element 1704 and may have captured an image of a paper mailing as the candidate communication. The communication verification tool may allow a user to view the captured candidate communication 1901. The user may then interact with interaction element 1902 to confirm the candidate communication selection and cause the mobile application to provide the communication verification request with candidate communication 1901. The user may alternatively interact with interaction element 1903 to capture a different candidate communication. The user may alternatively interact with interaction element 1904 to cancel the candidate communication selection for the paper mailing communication channel type and may return to the homepage of the communication verification tool depicted in FIG. 17.

Figure 20:
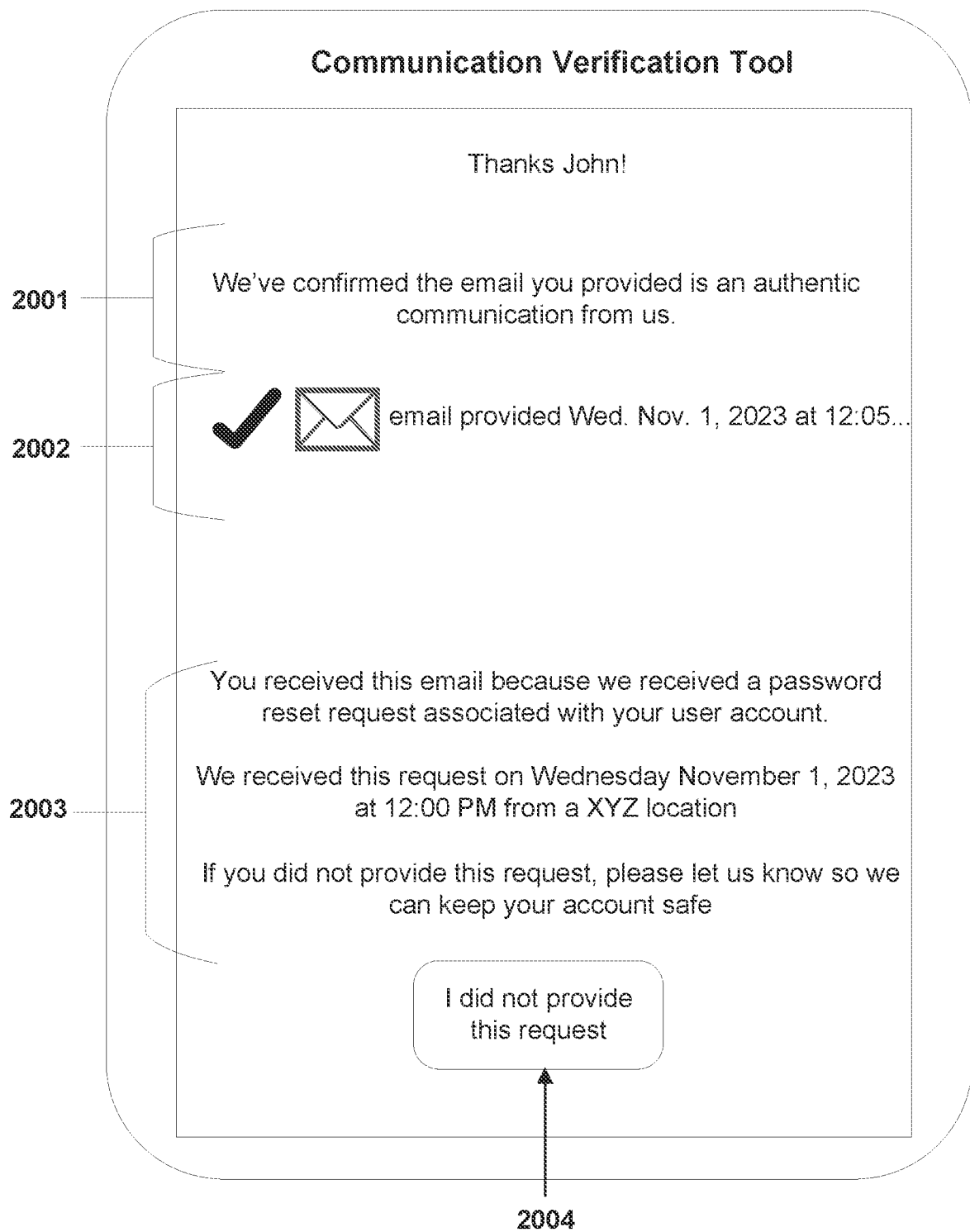
FIG. 20 illustrates an example user interface of a communication verification response in a mobile application as used in some example embodiments described herein.

Turning now to FIG. 20, an example user interface of a communication verification response in a mobile application is depicted. The communication verification response includes the communication classification 2001 indicative of whether the candidate communication is an authentic communication or a fraudulent communication. The communication verification response may further include intermediate authentic communication feature values 2002 that describe the authentic communication corresponding to the candidate communication in an instance in which the communication classification is indicative of an authentic communication.

Additionally, in an instance in which the communication classification is indicative of an authentic communication, the communication verification response may further include a contextual reason for the candidate communication and/or authentic communication 2003. The communication verification response may also include interaction element 2004 that allows a user to deny the requesting the authentic communication. Interaction with interaction element 2004 may cause the communications hardware to receive a communication request denial from the mobile application.

Figure 21:
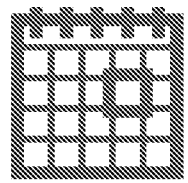
FIG. 21 illustrates an example user interface for a communication verification tool in a mobile application used to create a communication history request as used in some example embodiments described herein.

Turning now to FIG. 21, an example user interface for a communication history tool in a mobile application used to create a communication history request is depicted. The communication history tool may be accessible to a user on the mobile application once an authenticated session is established with the user. The communication history tool may include one or more interaction elements 2101 and 2102 that a user may interact (e.g., touch, select, click, audibly select, and/or the like) with to define a requested time frame. In particular, the user may interact with interaction element 2101 to define a request start date and interaction element 2102 to define a request end date. The user may also interact with interaction element 2103 to cause the communications hardware 206 to receive the communication history request.

Figure 22:
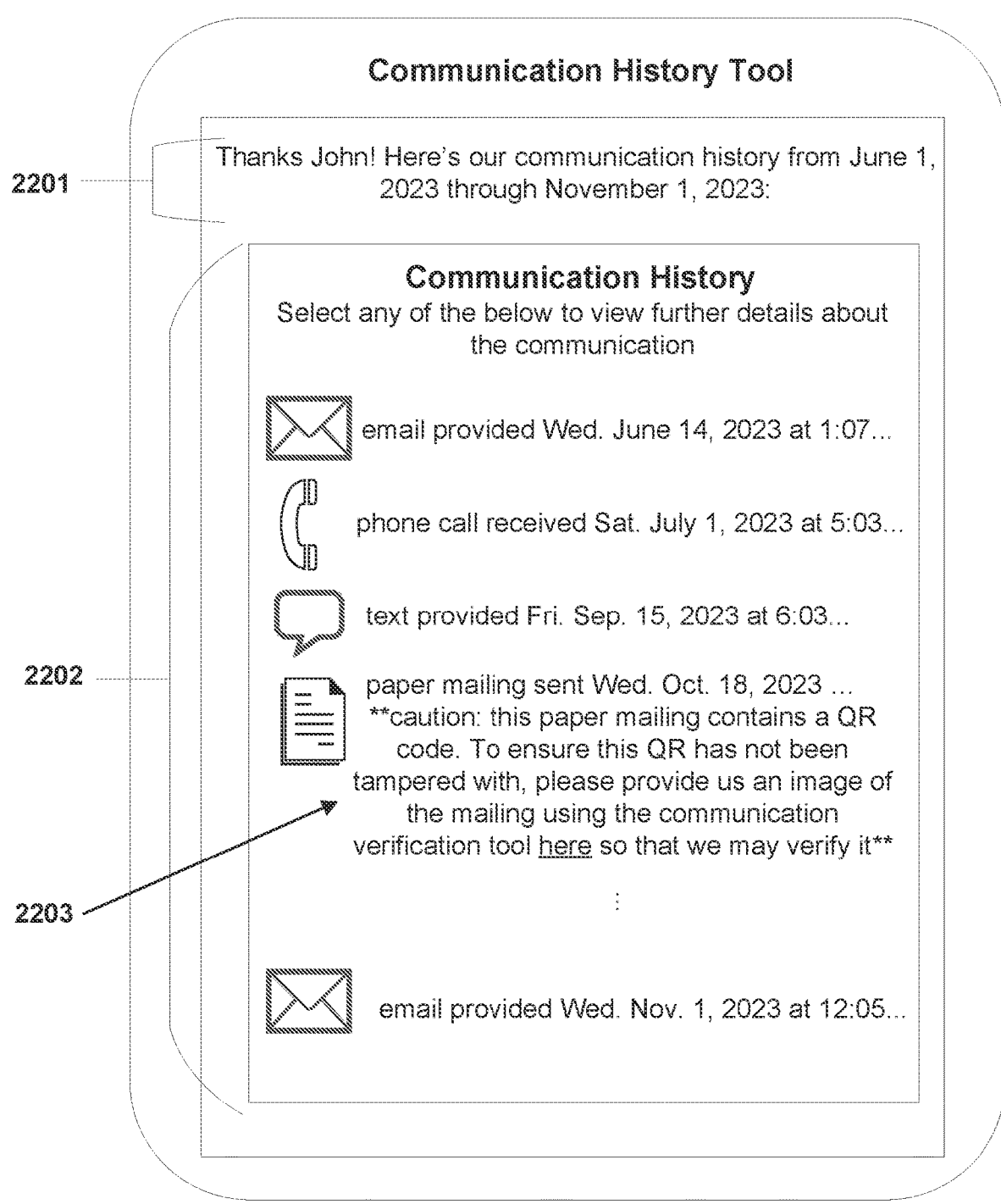
FIG. 22 illustrates an example user interface of a communication history response in a mobile application as used in some example embodiments described herein.

Turning now to FIG. 22, an example user interface of a communication history response is depicted. The communication history response may include a representation of each of the authentic communications 2202 that occurred during the requested time frame 2201. The representations of the authentic communications 2202 may include intermediate authentic communication feature values such that the user may determine additional information about the authentic communication feature. Each representation of the authentic communication may be interacted with the access the intermediate authentic communication feature values.

In some embodiments, in an instance in which an authentic communication is a paper mailing and is associated with a user interaction element, a warning 2203 may be provided in the communication history response. The warning may indicate that the user should use a communication verification tool to confirm whether the user interaction element is also authentic instead of relying on an image of the paper mailing to verify a communication.

CONCLUSION

As described above, example embodiments provide methods and apparatuses that enable improved communication verification. Example embodiments thus provide tools that overcome the problems faced by conventional methods, which place the burden of communication verification on the user. Example embodiments described herein generate authentic communication records for received authentic communications and may store these authentic communication records in an authentic communication storage repository. Example embodiments may then leverage the authentic communication storage repository to determine whether a candidate communication received from a user or a third-party institution is an authentic communication or a fraudulent communication.

As such, example embodiments contemplated herein remove the burden from the user to verify received candidate communications. Furthermore, embodiments contemplated herein provide a definitive indication of whether a candidate communication is an authentic communication or fraudulent communication. Thus, example embodiments described herein enable improved user security by allowing the user to verify received communications in a manner that has not conventionally been available. Furthermore, example embodiments described herein enable improved user security by proactively verifying candidate communications for a third-party institution prior to the third-party institution provide a recipient user with the candidate communications in a manner that has not conventionally been available.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for verifying a candidate communication, the method comprising:
    receiving, by the communications hardware, a communication verification request comprising a candidate communication from a third-party device;
    determining, by communication analysis circuitry and based on the candidate communication, one or more candidate communication feature values for one or more communication feature types;
    querying, by the communication analysis circuitry, an authentic communication storage repository for an authentic communication record that comprises one or more authentic communication feature values that correspond to the one or more candidate communication features, wherein the authentic communication storage repository comprises a plurality of authentic communication records;
    determining, by the communication analysis circuitry, a communication classification for the candidate communication based on a query result, wherein (a) in an instance the query returns an authentic communication record, the communication classification is indicative of an authentic communication or (b) in an instance the query does not return an authentic communication record, the communication classification is indicative of a fraudulent communication; and
    providing, by the communications hardware, a communication verification response comprising the communication classification to the third-party device.

2. The method of claim 1, further comprising:
    in an instance the communication classification is indicative of a fraudulent communication, providing, by the communications hardware, a fraud warning, wherein the fraud warning comprises an indication of one or more intermediate candidate communication feature values of the candidate communication.

3. The method of claim 2, further comprising:
    determining, by fraud analysis circuitry, one or more user account features for a user account associated with the candidate communication; and
    determining, by the fraud analysis circuitry, a susceptible user that has at least one common user account feature as compared to the one or more account features for the user account, wherein the fraud warning is provided to the susceptible user.

4. The method of claim 2, further comprising:
    identifying, by fraud analysis circuitry and based on the candidate communication, a communication channel type associated with the candidate communication; and
    determining, by the fraud analysis circuitry, one or more other third-party entities associated with the communication channel type, wherein the fraud warning is provided to the one or more other third-party entities.

5. The method of claim 1, further comprising:
    generating, by the communication analysis circuitry and based on the candidate communication, a candidate communication identifier for the candidate communication, wherein the candidate communication identifier is a candidate communication feature value for a candidate communication identifier communication feature type.

6. The method of claim 5, wherein (a) the candidate communication identifier comprises a plurality of characters that each correspond to a particular identifier groups, (b) each identifier group is associated with a predefined number of characters at a predefined character position within the candidate communication identifier, and (c) each identifier group corresponds to a communication feature type.

7. The method of claim 1, further comprising:
    establishing, by the communications hardware, an authenticated session with an agent using an agent device;
    receiving, by the communications hardware, an authentic communication from the agent device;
    generating, by the communication analysis circuitry and based on the authentic communication, the authentic communication record; and
    storing, by the communications hardware, the authentic communication record in the authentic communication storage repository.

8. The method of claim 7, further comprising:
    determining, by the communication analysis circuitry, a user identifier for the user associated with the authentic communication;
    encrypting, by cryptographic circuitry, the authentic communication using a cryptographic algorithm; and
    storing, by the communications hardware, the encrypted authentic communication in an original authentic communication storage repository, wherein the stored encrypted authentic communication is associated with the user identifier.

9. The method of claim 1, wherein the authentic communication storage repository is a blockchain and the plurality of authentic communication records are stored in one or more blocks on the blockchain.

10. The method of claim 1, wherein the authentic communication storage repository is a federated blockchain and one or more nodes of the federated blockchain are associated with one or more trusted third-party entities.

11. The method of claim 1, wherein the candidate communication is an email, a short-message service message, a phone call, or a physical mailing.

12. An apparatus for verifying a candidate communication, the apparatus comprising:
   communications hardware configured to:
      receive a communication verification request comprising a candidate communication from a third-party device; and
   communication analysis circuitry configured to:
      determine, based on the candidate communication, one or more candidate communication feature values for one or more communication feature types,
      query an authentic communication storage repository for an authentic communication record that comprises one or more authentic communication feature values that correspond to the one or more candidate communication features, wherein the authentic communication storage repository comprises a plurality of authentic communication records,
      determine a communication classification for the candidate communication based on a query result, wherein (a) in an instance the query returns an authentic communication record, the communication classification is indicative of an authentic communication or (b) in an instance the query does not return an authentic communication record, the communication classification is indicative of a fraudulent communication; and
   wherein the communications hardware is further configured to provide a communication verification response comprising the communication classification to the third-party device.

13. The apparatus of claim 12, wherein the communications hardware is further configured to, in an instance the communication classification is indicative of a fraudulent communication, provide a fraud warning, wherein the fraud warning comprises an indication of one or more intermediate candidate communication feature values of the candidate communication.

14. The apparatus of claim 13, further comprising:
   fraud analysis circuitry configured to:
      determine one or more user account features for a user account associated with the candidate communication, and
      determine a susceptible user that has at least one common user account feature as compared to the one or more account features for the user account, wherein the fraud warning is provided to the susceptible user.

15. The apparatus of claim 13, further comprising:
   fraud analysis circuitry configured to:
      identify, based on the candidate communication, a communication channel type associated with the candidate communication; and
      determine one or more other third-party entities associated with the communication channel type, wherein the fraud warning is provided to the one or more other third-party entities.

16. The apparatus of claim 12, wherein the communication analysis circuitry is further configured to generate, based on the candidate communication, a candidate communication identifier for the candidate communication, wherein the candidate communication identifier is a candidate communication feature value for a candidate communication identifier communication feature type.

17. The apparatus of claim 16, wherein (a) the candidate communication identifier comprises a plurality of characters that each correspond to a particular identifier groups, (b) each identifier group is associated with a predefined number of characters at a predefined character position within the candidate communication identifier, and (c) each identifier group corresponds to a communication feature type.

18. The apparatus of claim 12, wherein the communications hardware is further configured to:
   establish an authenticated session with an agent using an agent device, and
   receive an authentic communication from the agent device;
   wherein the communication analysis circuitry is further configured to generate, based on the authentic communication, the authentic communication record; and
   wherein the communications hardware is further configured to store the authentic communication record in the authentic communication storage repository.

19. The apparatus of claim 12, wherein the candidate communication is an email, a short-message service message, a phone call, or a physical mailing.

20. A computer program product for verifying a candidate communication, the computer program product comprising at least one non-transitory computer-readable storage medium storing software instructions that, when executed, cause an apparatus to:
   receive a communication verification request comprising a candidate communication from a third-party device;
   determine, based on the candidate communication, one or more candidate communication feature values for one or more communication feature types;
   query an authentic communication storage repository for an authentic communication record that comprises one or more authentic communication feature values that correspond to the one or more candidate communication features, wherein the authentic communication storage repository comprises a plurality of authentic communication records;
   determine a communication classification for the candidate communication based on a query result, wherein (a) in an instance the query returns an authentic communication record, the communication classification is indicative of an authentic communication or (b) in an instance the query does not return an authentic communication record, the communication classification is indicative of a fraudulent communication; and
   provide a communication verification response comprising the communication classification to the third-party device.

* * * * *